(12) United States Patent
Mizuhashi et al.

(10) Patent No.: US 9,727,163 B2
(45) Date of Patent: Aug. 8, 2017

(54) TOUCH DETECTION DEVICE, DISPLAY DEVICE WITH TOUCH DETECTION FUNCTION, AND ELECTRONIC APPARATUS

(71) Applicant: Japan Display Inc., Tokyo (JP)

(72) Inventors: Hiroshi Mizuhashi, Tokyo (JP); Tadayoshi Katsuta, Tokyo (JP); Kohei Azumi, Tokyo (JP); Daisuke Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 172 days.

(21) Appl. No.: 14/598,514

(22) Filed: Jan. 16, 2015

(65) Prior Publication Data

US 2015/0205433 A1 Jul. 23, 2015

(30) Foreign Application Priority Data

Jan. 17, 2014 (JP) .................................. 2014-007113

(51) Int. Cl.
*G06F 3/044* (2006.01)
*G06F 3/041* (2006.01)

(52) U.S. Cl.
CPC .......... *G06F 3/0416* (2013.01); *G06F 3/044* (2013.01); *G06F 3/0412* (2013.01); *G06F 3/0418* (2013.01)

(58) Field of Classification Search
CPC .... G06F 3/0416; G06F 3/0418; G06F 3/0412; G06F 3/044; G06F 3/03547; G06F 2203/04101
See application file for complete search history.

(56) References Cited

U.S. PATENT DOCUMENTS

| | | | | |
|---|---|---|---|---|
| 7,378,856 B2 * | 5/2008 | Peine | ..................... | A61B 5/037 324/605 |
| 8,547,114 B2 * | 10/2013 | Kremin | ................... | G06F 3/044 324/678 |

(Continued)

FOREIGN PATENT DOCUMENTS

| CN | 101820267 A | * | 9/2010 |
|---|---|---|---|
| CN | 102156594 A | | 8/2011 |

(Continued)

OTHER PUBLICATIONS

Chinese Office Action issued Apr. 20, 2017 for corresponding Chinese Patent Application No. 201510023527.0.

*Primary Examiner* — Julie Anne Watko
(74) *Attorney, Agent, or Firm* — Michael Best & Friedrich LLP

(57) ABSTRACT

According to an aspect, a touch detection device includes drive electrodes, touch detection electrodes, a signal generation unit that generates direct-current signals having voltages different from one another, a first drive unit that selectively supplies one of the direct-current signals to the drive electrodes, an element, a second drive unit that selectively supplies one of the direct-current signals to one end of the element in synchronization with the first drive unit, and a detection unit that acquires output values from the touch detection electrodes and an output value from the element at the same time, and detects proximity or contact of a target object based on values obtained by correcting the output values from the touch detection electrodes using the output value from the element.

15 Claims, 46 Drawing Sheets

(56) References Cited

U.S. PATENT DOCUMENTS

| | | | |
|---|---|---|---|
| 8,780,074 B2* | 7/2014 | Castillo | G06F 3/044 345/174 |
| 2005/0068044 A1* | 3/2005 | Peine | A61B 5/037 324/658 |
| 2008/0150905 A1* | 6/2008 | Grivna | G06F 3/016 345/173 |
| 2011/0157070 A1* | 6/2011 | Martin | G06F 3/0416 345/174 |
| 2012/0044013 A1 | 2/2012 | Muranaka | |
| 2012/0075220 A1* | 3/2012 | Matsui | G06F 3/044 345/173 |

FOREIGN PATENT DOCUMENTS

| | | | | |
|---|---|---|---|---|
| CN | 102200869 A | 9/2011 | | |
| JP | 2012-043275 | 3/2012 | | |
| KR | 101117328 B1 * | 3/2012 | ........... | G06F 3/0418 |
| TW | M383780 U1 * | 7/2010 | | |

* cited by examiner

FIG.43

| DI4 | DI3 | DI2 | DI1 | DI0 | DRIVE ELECTRODE BLOCK B |
|---|---|---|---|---|---|
| 0 | 0 | 0 | 0 | 0 | B1 |
| 0 | 0 | 0 | 0 | 1 | B2 |
| 0 | 0 | 0 | 1 | 0 | B3 |
| 0 | 0 | 0 | 1 | 1 | B4 |
| 0 | 0 | 1 | 0 | 0 | B5 |
| 0 | 0 | 1 | 0 | 1 | B6 |
| 0 | 0 | 1 | 1 | 0 | B7 |
| 0 | 0 | 1 | 1 | 1 | B8 |
| 0 | 1 | 0 | 0 | 0 | B9 |
| 0 | 1 | 0 | 0 | 1 | B10 |
| 0 | 1 | 0 | 1 | 0 | B11 |
| 0 | 1 | 0 | 1 | 1 | B12 |
| 0 | 1 | 1 | 0 | 0 | B13 |
| 0 | 1 | 1 | 0 | 1 | B14 |
| 0 | 1 | 1 | 1 | 0 | B15 |
| 0 | 1 | 1 | 1 | 1 | B16 |
| 1 | 0 | 0 | 0 | 0 | B17 |
| 1 | 0 | 0 | 0 | 1 | B18 |
| 1 | 0 | 0 | 1 | 0 | B19 |
| 1 | 0 | 0 | 1 | 1 | B20 |

FIG.46

| DI4 | DI3 | DI2 | DI1 | DI0 | DRIVE ELECTRODE BLOCK B |
|---|---|---|---|---|---|
| 0 | 0 | 0 | 0 | 0 | B1, B2 |
| 0 | 0 | 0 | 0 | 1 | B1, B2 |
| 0 | 0 | 0 | 1 | 0 | B3, B4 |
| 0 | 0 | 0 | 1 | 1 | B3, B4 |
| 0 | 0 | 1 | 0 | 0 | B5, B6 |
| 0 | 0 | 1 | 0 | 1 | B5, B6 |
| 0 | 0 | 1 | 1 | 0 | B7, B8 |
| 0 | 0 | 1 | 1 | 1 | B7, B8 |
| 0 | 1 | 0 | 0 | 0 | B9, B10 |
| 0 | 1 | 0 | 0 | 1 | B9, B10 |
| 0 | 1 | 0 | 1 | 0 | B11, B12 |
| 0 | 1 | 0 | 1 | 1 | B11, B12 |
| 0 | 1 | 1 | 0 | 0 | B13, B14 |
| 0 | 1 | 1 | 0 | 1 | B13, B14 |
| 0 | 1 | 1 | 1 | 0 | B15, B16 |
| 0 | 1 | 1 | 1 | 1 | B15, B16 |
| 1 | 0 | 0 | 0 | 0 | B17, B18 |
| 1 | 0 | 0 | 0 | 1 | B17, B18 |
| 1 | 0 | 0 | 1 | 0 | B19, B20 |
| 1 | 0 | 0 | 1 | 1 | B19, B20 |

512 FILTER GLASS
510 VIDEO DISPLAY SCREEN UNIT
511 FRONT PANEL

SHUTTER BUTTON 524
LIGHT-EMITTING UNIT 521
525 LENS COVER

UPPER HOUSING 551

552 LOWER HOUSING

552 LOWER HOUSING

551 UPPER HOUSING

LOWER HOUSING 552
553 CONNECTION UNIT
551 UPPER HOUSING

UPPER HOUSING 551
552 LOWER HOUSING 562
561

TOUCH DETECTION DEVICE, DISPLAY DEVICE WITH TOUCH DETECTION FUNCTION, AND ELECTRONIC APPARATUS

CROSS-REFERENCE TO RELATED APPLICATIONS

This application claims priority from Japanese Application No. 2014-007113, filed on Jan. 17, 2014, the contents of which are incorporated by reference herein in its entirety.

BACKGROUND

1. Technical Field

The present invention relates to a touch detection device that can detect a target object approaching from the outside, a display device with a touch detection function including the touch detection device, and an electronic apparatus including the same.

2. Description of the Related Art

In these years, attention is paid to a touch detection device, commonly called a touch panel, which can detect a physical body approaching from the outside as a target object. The touch detection device is combined with, for example, a display device, and is used as a device for inputting information by displaying various images and the like for input on the display device. By combining the touch detection device with the display device in this manner, information can be input without using an input device, such as a keyboard, a mouse, or a keypad.

Types of the touch detection device include, for example, an optical type, a resistance type, and an electrostatic capacitance type. An electrostatic capacitance type touch detection device has a relatively simple structure, and can achieve low power consumption. The touch detection device is required to detect proximity or contact of a target object as surely as possible. For example, Japanese Patent Application Laid-open Publication No. 2012-43275 (JP-A-2012-43275) discloses a technology for correcting fluctuations in an input detection signal by providing a correction electrode and a correction detection electrode in a position where a finger in contact with an operation surface does not affect the electrodes.

In the technology disclosed in JP-A-2012-43275, a drive voltage is applied to the correction electrode after sequentially applying the drive voltage to a plurality of drive lines. This process may not allow sure detection of the target object as a result of a time difference occurring between the detection of the target object and the correction of the input detection signal.

For the foregoing reasons, there is a need for a touch detection device, a display device with a touch detection function, and an electronic apparatus that can suppress a decrease in accuracy of detecting proximity or contact of a target object, and that can shorten a touch detection time.

SUMMARY

According to an aspect, a touch detection device includes a plurality of drive electrodes, a plurality of touch detection electrodes that form electrostatic capacitance between themselves and the drive electrodes, a signal generation unit that generates a plurality of direct-current signals having voltages different from one another, a first drive unit that selectively supplies one of the direct-current signals to the drive electrodes, an element having a predetermined electrostatic capacitance, a second drive unit that selectively supplies one of the direct-current signals to one end of the element in synchronization with the first drive unit, and a detection unit that acquires output values from the touch detection electrodes and an output value from the element at the same time, and detects proximity or contact of a target object based on corrected values obtained by correcting the output values from the touch detection electrodes using the output value from the element.

BRIEF DESCRIPTION OF THE DRAWINGS

FIG. 43 is a diagram illustrating a truth table of a decoder of FIG. 42;

FIG. 46 is a diagram illustrating a truth table of a decoder of FIG. 45;

DETAILED DESCRIPTION

The following describes embodiments of the present invention with reference to the accompanying drawings. The disclosure is merely an example, and the scope of the present invention naturally includes appropriate modifications easily envisaged by those skilled in the art while maintaining the gist of the invention. In order to make the description clearer, the drawings may more schematically illustrate, for example, widths, thicknesses, and shapes of various parts than those in the actual state. However, those are mere examples, and do not limit interpretation of the present invention. In this specification and the accompanying drawings, the same numerals will be given to the same elements as those described in relation to an already mentioned drawing, and detailed description thereof may be omitted where appropriate. Components to be described below can be combined as appropriate. The description will be made in the following order.

1. First embodiment
2. Second embodiment
3. Application examples (electronic apparatuses)

Figure 1:
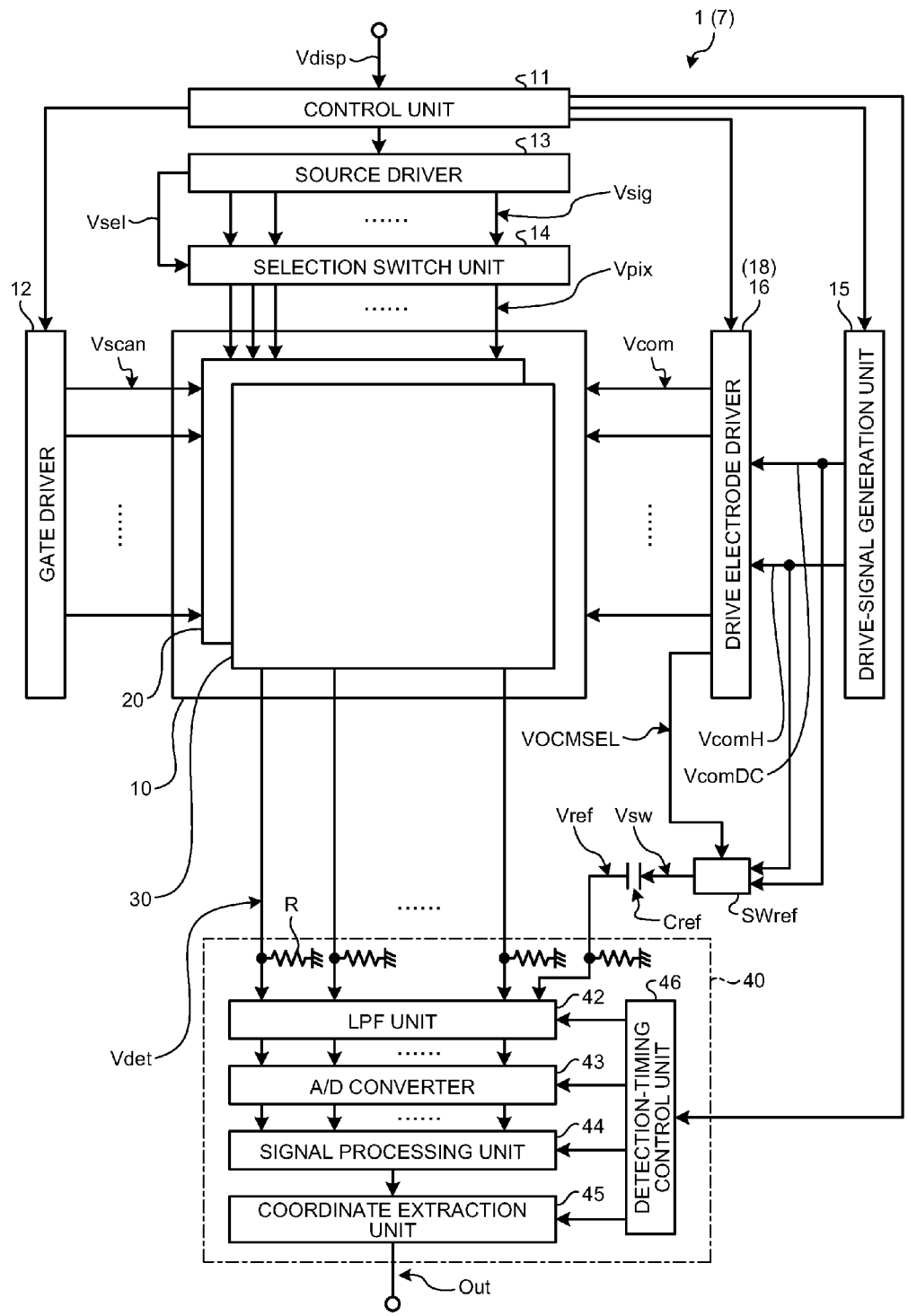
FIG. 1 is a diagram illustrating a configuration example of a display device with a touch detection function according to a first embodiment.

Examples in each of which a display device with a touch detection function according to either of the above-mentioned embodiments is used in an electronic apparatus 1. First Embodiment Configuration Examples FIG. 1 is a diagram illustrating a configuration example of a display device with a touch detection function according to a first embodiment. This display device with a touch detection function 1 includes a display unit with a touch detection function 10, a control unit 11, a gate driver 12, a source driver 13, a selection switch unit 14, a drive-signal generation unit 15, a drive electrode driver 16, a touch detection unit 40, a switching circuit SWref, and a capacitor Cref serving as a capacitive element.

Display Unit with Touch Detection Function

A configuration example of the display unit with the touch detection function 10 will be first described in detail. The display unit with the touch detection function 10 is a display unit with a touch detection function built therein. The display unit with the touch detection function 10 includes a liquid crystal display unit 20 and a touch detection device 30. The liquid crystal display unit 20 is a device that performs display by sequentially scanning one horizontal line at a time according to scan signals Vscan supplied from the gate driver 12, as will be described later. The touch detection device 30 outputs touch detection signals Vdet. The touch detection device 30 performs the touch detection by performing sequential scanning according to drive signals Vcom supplied from the drive electrode driver 16, as will be described later.

Figure 2:
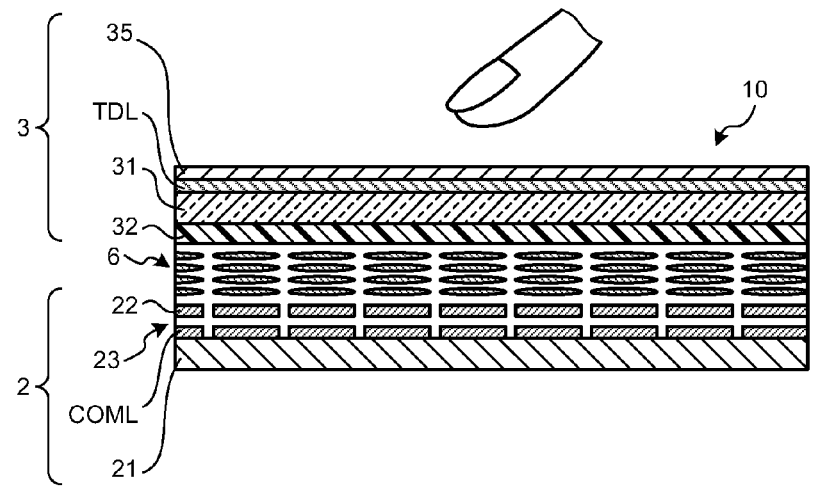
FIG. 2 is a diagram illustrating an example of a cross-sectional structure of an essential part of a display unit with a touch detection function.

FIG. 2 is a diagram illustrating an example of a cross-sectional structure of an essential part of the display unit with the touch detection function. The display unit with the touch detection function 10 includes a pixel substrate 2, a counter substrate 3 arranged facing the pixel substrate 2, and a liquid crystal layer 6 interposed between the pixel substrate 2 and the counter substrate 3.

The pixel substrate 2 includes a TFT substrate 21 serving as a circuit substrate, drive electrodes COML, and pixel electrodes 22. The TFT substrate 21 serves as a circuit substrate on which various electrodes, wiring (such as pixel signal lines SGL and scan signal lines GCL to be described later), thin-film transistors (TFT), and the like are provided. The TFT substrate 21 is made of, for example, glass. The drive electrodes COML are provided on the TFT substrate 21. The drive electrodes COML are electrodes for supplying a common voltage to a plurality of pixels Pix (to be described later). The drive electrodes COML serve as a common drive electrode for liquid crystal display operations, and as drive electrodes for touch detection operations. An insulation layer 23 is provided on the drive electrodes COML. The pixel electrodes 22 are provided on the insulation layer 23. The pixel electrodes 22 are electrodes for supplying pixel signals for displaying images, and are translucent. The drive electrodes COML and the pixel electrodes 22 are made of, for example, indium tin oxide (ITO).

The counter substrate 3 includes a glass substrate 31, a color filter 32 and touch detection electrodes TDL. The color filter 32 is provided on one surface of the glass substrate 31. The color filter 32 is formed, for example, by periodically arranging color filter layers of three colors of red (R), green (G), and blue (B), and the three colors of R, G, and B are associated with respective display pixels as one set. The touch detection electrodes TDL are provided on the other surface of the glass substrate 31. The touch detection electrodes TDL are electrodes that are made of, for example, ITO, and are translucent. A polarizing plate 35 is provided on the touch detection electrodes TDL.

The liquid crystal layer 6 serves as a display function layer, and modulates light passing therethrough according to the state of an electric field. The electric field is generated by electric potential differences between voltages of the drive electrodes COML and voltages of the pixel electrodes 22. Liquid crystals of a horizontal electric field mode, such as a fringe field switching (FFS) mode or an in-plane switching (IPS) mode, are used for the liquid crystal layer 6.

While omitted from the illustration in FIG. 2, an orientation film is interposed between the liquid crystal layer 6 and the pixel substrate 2 and between the liquid crystal layer 6 and the counter substrate 3, and an incident-side polarizing plate is disposed on the lower surface of the pixel substrate 2.

Figure 3:
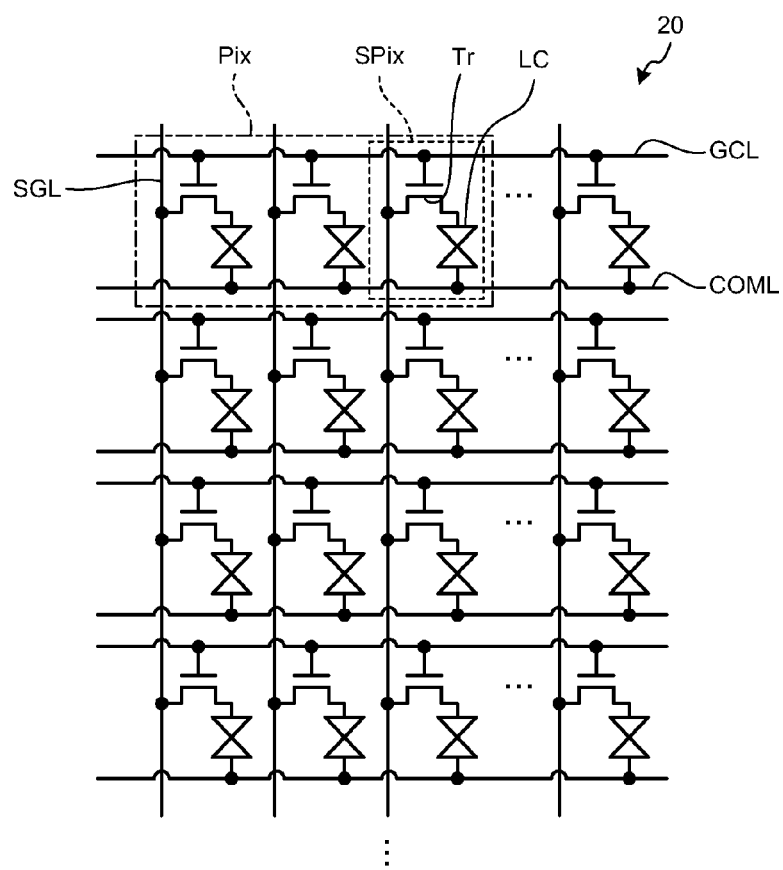
FIG. 3 is a diagram illustrating a configuration example of a pixel structure in a liquid crystal display unit.

FIG. 3 is a diagram illustrating a configuration example of a pixel structure in the liquid crystal display unit. The liquid crystal display unit 20 includes the pixels Pix arranged in a matrix. Each of the pixels Pix is constituted by three sub-pixels SPix. The three sub-pixels SPix are arranged so as to correspond to the three colors (R, G, and B) of the color filter 32 illustrated in FIG. 2. Each of the sub-pixels SPix includes a TFT element Tr and a liquid crystal element LC. The TFT element Tr is constituted by a thin-film transistor, and in the present example, constituted by an n-channel metal oxide semiconductor (MOS) TFT. The source of the TFT element Tr is coupled with one of the pixel signal lines SGL; the gate thereof is coupled with one of the scan signal lines GCL; and the drain thereof is coupled with one end of the liquid crystal element LC. One end of the liquid crystal element LC is coupled with the drain of the TFT element Tr, and the other end of the liquid crystal element LC is coupled with one of the drive electrodes COML.

The sub-pixel SPix is coupled, by the scan signal line GCL, with another sub-pixel SPix belonging to the same row of the liquid crystal display unit 20. The scan signal lines GCL are coupled with the gate driver 12, and are supplied with the scan signals Vscan from the gate driver 12. The sub-pixel SPix is also coupled, by the pixel signal line SGL, with another sub-pixel SPix belonging to the same column of the liquid crystal display unit 20. The pixel signal lines SGL are coupled with the selection switch unit 14, and are supplied with pixel signals Vpix from the selection switch unit 14.

The sub-pixel SPix is further coupled, by the drive electrode COML, with another sub-pixel SPix belonging to the same row of the liquid crystal display unit 20. The drive electrodes COML are coupled with the drive electrode driver 16, and are supplied with the drive signals Vcom from the drive electrode driver 16.

With this configuration, the gate driver 12 drives the scan signal lines GCL so as to perform line-sequential scanning in a time-division manner so that one horizontal line is sequentially selected in the liquid crystal display unit 20, and the source driver 13 and the selection switch unit 14 supply the pixel signals Vpix to the pixels Pix belonging to the selected horizontal line so as to perform display on a horizontal line by horizontal line basis.

Figure 4:
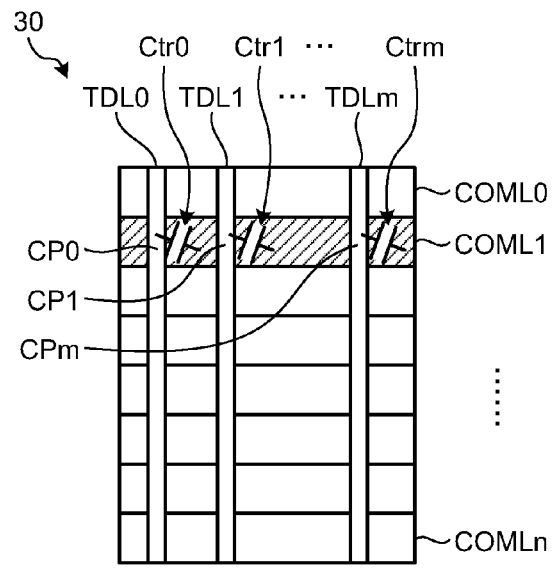
FIG. 4 is a diagram illustrating a configuration example of a touch detection device.

FIG. 4 is a diagram illustrating a configuration example of the touch detection device. The touch detection device 30 includes drive electrodes COML0, COML1, . . . , and COMLn serving as first electrodes, and touch detection electrodes TDL0, TDL1, . . . , and TDLm serving as second electrodes.

As the drive electrodes COML0, COML1, . . . , and COMLn, a plurality (n+1) of stripe-like electrode patterns extending in a predetermined direction (in this description, the X-direction of an arbitrarily defined XY-coordinate system) are arranged in a direction (in the present example, in the Y-direction) orthogonal to the predetermined direction. The number of the drive electrodes COML0, COML1, . . . , and COMLn is not particularly limited in the embodiment. To detect proximity or contact (hereinafter, called "touch operation" as appropriate) of a target object (such as a finger or a stylus), the drive electrode driver 16 sequentially supplies the drive signals Vcom to the respective drive electrodes COML0, COML1, . . . , and COMLn.

The drive signals Vcom are excitation signals that fluctuate at least in magnitude at a predetermined cycle. The drive signals Vcom are signals for detecting proximity or contact of the target object to/with the touch detection device 30. The drive signals Vcom may change in direction, in addition to changing in magnitude. Hereinafter, where the drive electrodes COML0, COML1, . . . , and COMLn need not be distinguished from one another, each of them will be called a drive electrode COML as appropriate.

The touch detection electrodes TDL0, TDL1, . . . , and TDLm are stripe-like electrode patterns extending in a direction orthogonal to the extending direction of the respective drive electrodes COML, that is, in the Y-direction. The touch detection electrodes TDL0, TDL1, . . . , and TDLm need not be orthogonal to, but only need to intersect with, the respective drive electrodes COML. The respective patterns of the touch detection electrodes TDL0, TDL1, . . . , and TDLm are electrically coupled with the touch detection unit 40. Hereinafter, where the touch detection electrodes TDL0, TDL1, . . . , and TDLm need not be distinguished from one another, each of them will be called a touch detection electrode TDL as appropriate.

Portions (intersecting portions) CP0, CP1, . . . , and CPm where the drive electrodes COML intersect with the touch detection electrodes TDL generate respective electrostatic capacitance Ctr0, Ctr1, . . . , and Ctrm. The intersecting portions CP0, CP1, . . . , and CPm are present at m places for each of the drive electrodes COML, so that m such electrostatic capacitance Ctr0, Ctr1, . . . , and Ctrm are present for each of the drive electrodes COML. Hereinafter, where the electrostatic capacitance Ctr0, Ctr1, . . . , and Ctrm need not be distinguished from one another, each of them will be called an electrostatic capacitance Ctr as appropriate. Where the intersecting portions CP0, CP1, . . . , and CPm need not be distinguished from one another, each of them will be called an intersecting portion CP as appropriate.

Basic Principle of Electrostatic Capacitance Type Touch Detection

Figure 5:
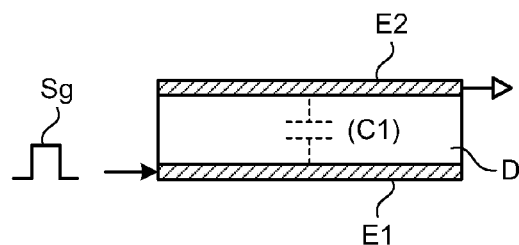
FIG. 5 is an explanatory diagram illustrating a state in which a finger is neither in contact with nor in proximity of the touch detection device, for explaining the basic principle of an electrostatic capacitance type touch detection system.

The following describes the basic principle of touch detection in the display unit with the touch detection function, with reference to FIGS. 5 to 9. This touch detection system is implemented as an electrostatic capacitance touch sensor, in which, for example, as illustrated in FIG. 5, a capacitive element is formed by using a pair of electrodes (a drive electrode E1 and a touch detection electrode E2) that are arranged facing each other with a dielectric body D interposed therebetween. This structure is represented as an equivalent circuit illustrated in FIG. 6. The drive electrode E1, the touch detection electrode E2, and the dielectric body D constitute a capacitive element C1. One end of the capacitive element C1 is coupled with an alternating-current signal source (drive signal source) S, and the other end P thereof is grounded via a resistor R and coupled with a voltage detector (touch detection circuit) DET. Supplying an alternating-current rectangular wave Sg (FIG. 5) having a predetermined frequency (such as approximately several kilohertz to several tens of kilohertz) from the alternating-current signal source S to the drive electrode E1 (one end of the capacitive element C1) generates an output waveform (touch detection signal Vdet), such as that illustrated in FIG. 9, at the touch detection electrode E2 (the other end P of the capacitive element C1).

Figure 6:
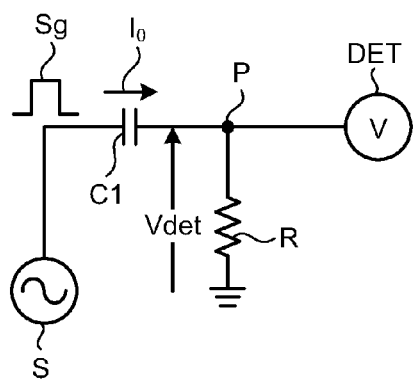
FIG. 6 is an explanatory diagram illustrating an example of an equivalent circuit in the state illustrated in FIG. 5 in which the finger is neither in contact with nor in proximity of the touch detection device.

When the finger is not in contact with (nor in proximity of) the touch detection device, a current I0 corresponding to the capacitance value of the capacitive element C1 flows in association with charge and discharge of the capacitive element C1, as illustrated in FIGS. 5 and 6. At this time, the potential at the other end P of the capacitive element C1 has, for example, a waveform V0 of FIG. 9, which is detected by the voltage detector DET.

Figure 7:
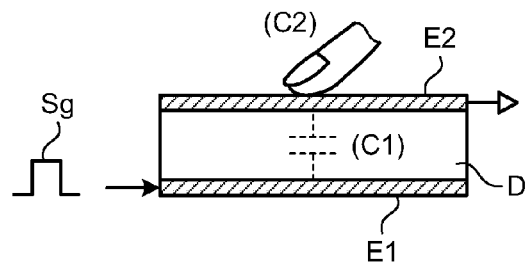
FIG. 7 is an explanatory diagram illustrating a state in which the finger is in contact with or in proximity of the touch detection device, for explaining the basic principle of the electrostatic capacitance type touch detection system.
Figure 8:
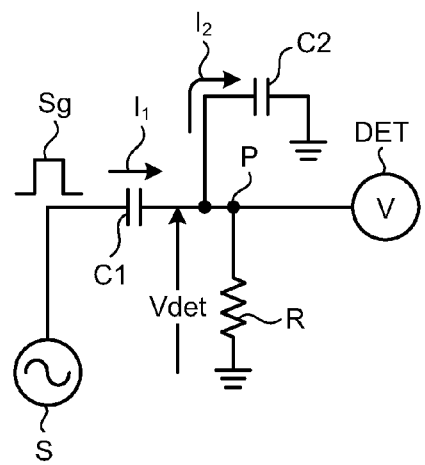
FIG. 8 is an explanatory diagram illustrating an example of the equivalent circuit in the state illustrated in FIG. 7 in which the finger is in contact with or in proximity of the touch detection device.
Figure 9:
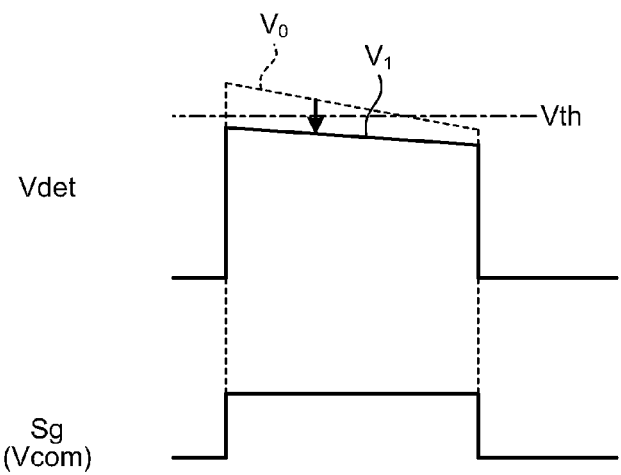
FIG. 9 is a diagram illustrating an example of waveforms of a drive signal and a touch detection signal.

When the finger is in contact with (or in proximity of) the touch detection device, as illustrated in FIGS. 7 and 8, a capacitive element C2 formed by the finger is added in series to the capacitive element C1. In this state, currents I1 and I2 flow in association with charge and discharge of the capacitive elements C1 and C2, respectively. At this time, the potential at the other end P of the capacitive element C1 has, for example, a waveform V1 of FIG. 9, which is detected by the voltage detector DET. At this time, the potential at the point P results in a divided potential determined by the values of the currents I1 and I2 flowing in the capacitive elements C1 and C2. This result causes the waveform V1 to have a smaller value than that of the waveform V0 in the non-contact state. The voltage detector DET compares the detected voltage with a predetermined threshold voltage Vth, and determines that the current state corresponds to the non-contact state if the detected voltage is the threshold voltage Vth or higher, or to the contact state if the detected voltage is lower than the threshold voltage Vth. Thus, the touch detection can be made.

Figure 10:
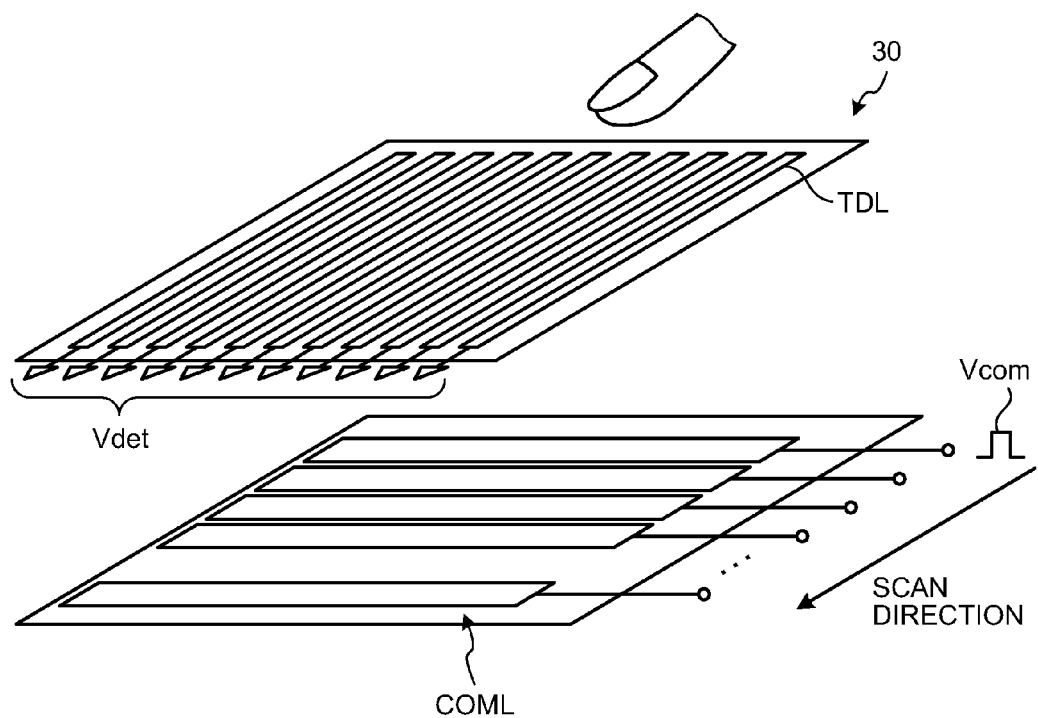
FIG. 10 is a diagram illustrating the configuration example of the touch detection device in a perspective manner.

FIG. 10 is a diagram illustrating the configuration example of the touch detection device in a perspective manner. The drive electrodes COML provided on the pixel substrate 2 and the touch detection electrodes TDL provided on the counter substrate 3 constitute the touch detection device 30. The drive electrodes COML have strip-like electrode patterns that extend in the right-left direction in FIG. 10. To perform a touch detection operation for each of the electrode patterns, pulse signals of the drive signals Vcom are sequentially supplied on a block-by-block basis, each block (drive electrode block B to be described later) consisting of a predetermined number of drive electrodes COML, and thus sequential scan drive is performed in a time-division manner, as will be described later. The touch detection electrodes TDL have strip-like electrode patterns that extend in the direction orthogonal to the extending direction of the electrode patterns of the drive electrodes COML. The respective electrode patterns of the touch detection electrodes TDL are coupled with the touch detection unit 40. The electrode patterns of the drive electrodes COML and the touch detection electrodes TDL intersecting with each other form the electrostatic capacitance at the intersecting portions therebetween.

With this configuration, the drive electrode driver 16 supplies the drive signals Vcom to the drive electrodes COML so as to output the touch detection signals Vdet from the touch detection electrodes TDL so that the touch detection is performed in the touch detection device 30. Specifically, each of the drive electrodes COML corresponds to the drive electrode E1 in the basic principle of the touch detection illustrated in FIGS. 5 to 9; each of the touch detection electrodes TDL corresponds to the touch detection electrode E2 in the basic principle; and the touch detection device 30 detects the touch according to the basic principle. As illustrated in FIG. 10, the electrode patterns intersecting with each other form the electrostatic capacitance touch sensor in a matrix. This formation also enables detection of a position where an externally approaching physical body is in contact with or in proximity of the touch detection device by scanning the entire touch detection surface of the touch detection device 30.

Overall Configuration

Referring back to FIG. 1, the control unit 11 is a circuit that supplies, based on a video signal Vdisp, a control signal to each of the gate driver 12, the source driver 13, the drive-signal generation unit 15, the drive electrode driver 16, and the touch detection unit 40, and controls these drivers and units so as to operate them in synchronization with each other.

The gate driver 12 has a function of sequentially selecting, based on the control signal supplied from the control unit 11, one horizontal line as a target of display drive of the display unit with the touch detection function 10. Specifically, the gate driver 12 generates a scan signal Vscan based on the control signal supplied from the control unit 11, and supplies the scan signal Vscan via one of the scan signal lines GCL to the gates of the TFT elements Tr of the pixels Pix so as to sequentially select, as the target of the display drive, one row (one horizontal line) of the pixels Pix that are formed in a matrix in the liquid crystal display unit 20 of the display unit with the touch detection function 10.

The source driver 13 generates and outputs pixel signals Vsig based on video signals and control signals supplied from the control unit 11. Specifically, the source driver 13 generates, from a video signal for one horizontal line, the pixel signals Vsig obtained by time-division multiplexing the pixel signals Vpix of the (three, in the present example) sub-pixels SPix in the liquid crystal display unit 20 of the display unit with the touch detection function 10, and supplies the pixel signals Vsig to the selection switch unit 14, as will be described later. The source driver 13 also has a function of generating switch control signals Vsel (VselR, VselG, and VselB) necessary for separating the multiplexed pixel signals Vsig into the pixel signals Vpix, and supplying the switch control signals Vsel together with the pixel signals Vsig to the selection switch unit 14. The multiplexing is performed to reduce the number of wires between the source driver 13 and the selection switch unit 14.

Based on the pixel signals Vsig and the switch control signals Vsel supplied from the source driver 13, the selection switch unit 14 separates the multiplexed pixel signals Vsig into the pixel signals Vpix, and supplies the pixel signals Vpix to the liquid crystal display unit 20 of the display unit with the touch detection function 10.

Figure 11:
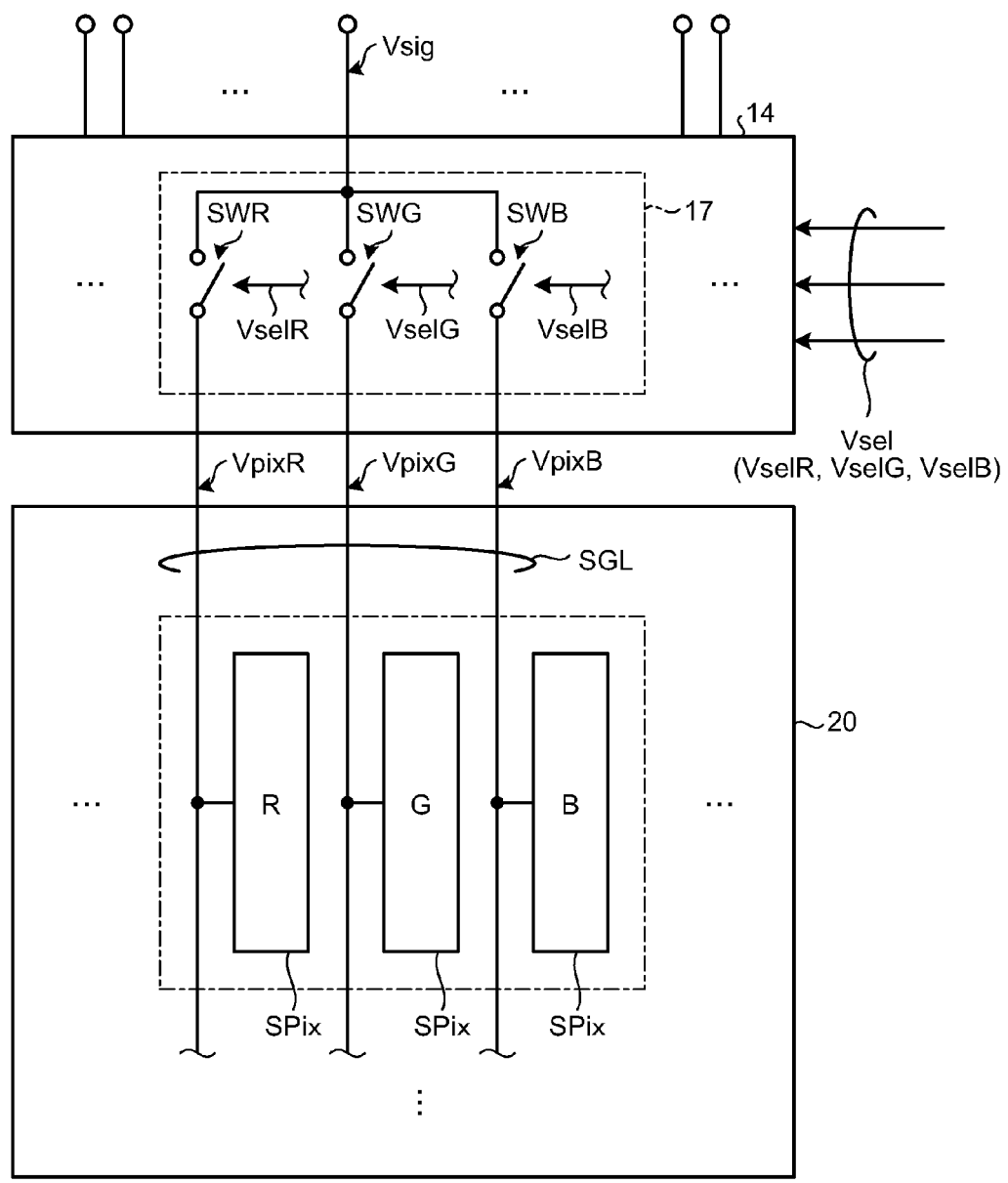
FIG. 11 is a block diagram illustrating a configuration example of a selection switch unit.

FIG. 11 is a diagram illustrating a configuration example of the selection switch unit. The selection switch unit 14 includes a plurality of switch groups 17. In this example, each of the switch groups 17 includes three switches SWR, SWG, and SWB, ends on one side of which being coupled with one another and supplied with each of the pixel signals Vsig from the source driver 13, and ends on the other side of which being coupled with the three sub-pixels SPix (R, G, and B) in a pixel Pix via the pixel signal lines SGL in the liquid crystal display unit 20 of the display unit with the touch detection function 10. The switch control signals Vsel (VselR, VselG, and VselB) supplied from the source driver 13 control on and off of the three switches SWR, SWG, and SWB, respectively. With this configuration, the selection switch unit 14 functions so as to separate the multiplexed pixel signal Vsig into the pixel signals Vpix (VpixR, VpixG, and VpixB) by sequentially turning on the three switches SWR, SWG, and SWB according to the switch control signals Vsel in a time-division manner. The selection switch unit 14 supplies the pixel signals Vpix to the three sub-pixels SPix.

Based on the control signal supplied from the control unit 11, the drive-signal generation unit 15 generates two direct-current drive signals VcomDC and VcomH (TSVCOM), and supplies them to the drive electrode driver 16. In the present example, the direct-current drive signal VcomDC is a direct-current signal having a potential of 0 V, and the direct-current drive signal VcomH is a direct-current signal having a potential VH higher than 0 V.

The drive electrode driver 16 is a circuit that supplies, based on the control signal supplied from the control unit 11, the drive signals Vcom to the drive electrodes COML of the display unit with the touch detection function 10. Specifically, in the display operation, the drive electrode driver 16 supplies the direct-current drive signal VcomDC to the drive electrodes COML. In the touch detection operation, the drive electrode driver 16 generates pulse signals from the direct-current drive signals VcomDC and VcomH, and supplies the generated pulse signals to drive electrodes COML related to the touch detection operation while supplying the direct-current drive signal VcomDC to the other drive electrodes COML. In that operation, the drive electrode driver 16 drives the drive electrodes COML on a block-by-block basis, each block (the drive electrode block B to be described later) consisting of the predetermined number of drive electrodes COML, as will be described later.

The touch detection unit 40 is a circuit that detects, based on the control signal supplied from the control unit 11, the touch detection signal Vdet supplied from the touch detection device 30 of the display unit with the touch detection function 10, and an output value (correction output value) Vref supplied from the capacitor Cref, whether the touch detection device 30 is touched, and, if so, obtains, for example, coordinates of the touch in a touch detection region. The touch detection unit 40 includes a low-pass filter (LPF) unit 42, an analog-digital (A/D) converter 43, a signal processing unit 44, a coordinate extraction unit 45, and a detection-timing control unit 46.

The LPF unit 42 is a low-pass analog filter that removes high-frequency components (noise components) included in the touch detection signals Vdet supplied from the touch detection device 30 and the output value (correction output value) Vref supplied from the capacitor Cref to extract touch components, and outputs each of the touch components. A resistor R for giving a direct-current potential (such as 0 V) is coupled between each input terminal of the LPF unit 42 and the ground. For example, a switch may be provided instead of the resistor R, and may be turned on at a predetermined time to give the direct-current potential (0 V). The LPF unit 42 may have a signal amplification function. The A/D converter 43 is a circuit that samples analog signals output from the LPF unit 42 in synchronization with the pulse signals of the drive signals Vcom, and converts the sampled analog signals into digital signals. The signal processing unit 44 is a logic circuit that detects, based on the output signals of the A/D converter 43, whether the touch detection device 30 is touched. The coordinate extraction unit 45 is a logic circuit that obtains touch panel coordinates of a touch when the touch is detected by the signal processing unit 44. The detection-timing control unit 46 performs control so as to operate these circuits in synchronization with each other.

Figure 12:
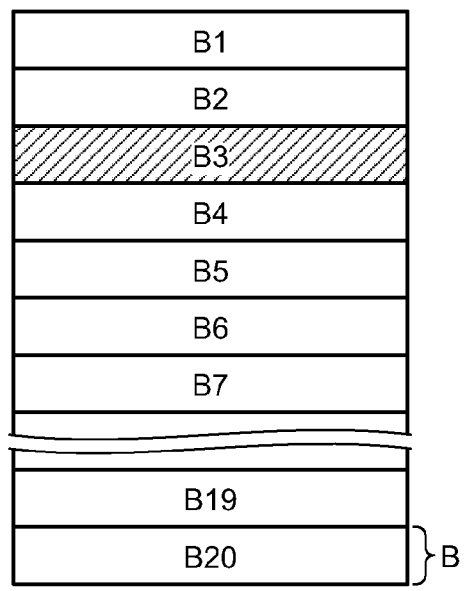
FIG. 12 is a diagram schematically illustrating touch detection scanning.
Figure 13:
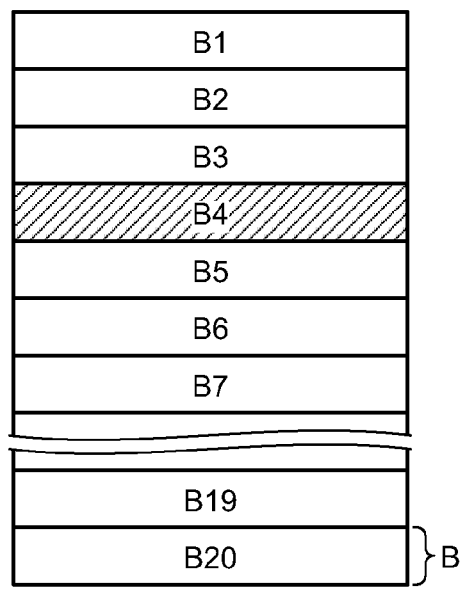
FIG. 13 is a diagram schematically illustrating the touch detection scanning.
Figure 14:
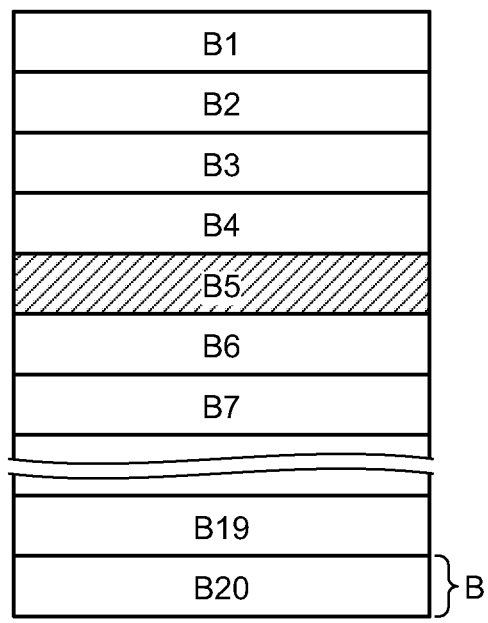
FIG. 14 is a diagram schematically illustrating the touch detection scanning.

FIGS. 12 to 14 are diagrams schematically illustrating the touch detection scanning. FIGS. 12 to 14 illustrate the operation of supplying the drive signals Vcom to 20 blocks B1 to B20 when the blocks B1 to B20 constitute the touch detection surface. In each of FIGS. 12 to 14, the drive electrode block B shaded by diagonal lines indicates that the block is supplied with the pulse signals generated from the direct-current drive signals VcomDC and VcomH, and the other drive electrode blocks B indicate that the blocks are supplied with the direct-current drive signal VcomDC.

The drive electrode driver 16 supplies the drive signals Vcom to the drive electrodes COML in units of drive electrode blocks B. The drive electrode block B is set to have a width (such as 5 mm) corresponding to, for example, the size of a finger of a user. As illustrated in FIGS. 12 to 14, the drive electrode driver 16 sequentially selects the drive electrode block B as a target of the touch detection operation, and supplies one of the drive signals Vcom to the drive electrodes COML belonging to the drive electrode block B, thus scanning all the drive electrode blocks B. While the present example assumes the number of the drive electrode blocks B to be 20 for convenience of explanation, the number is not limited to 20.

Figure 15:
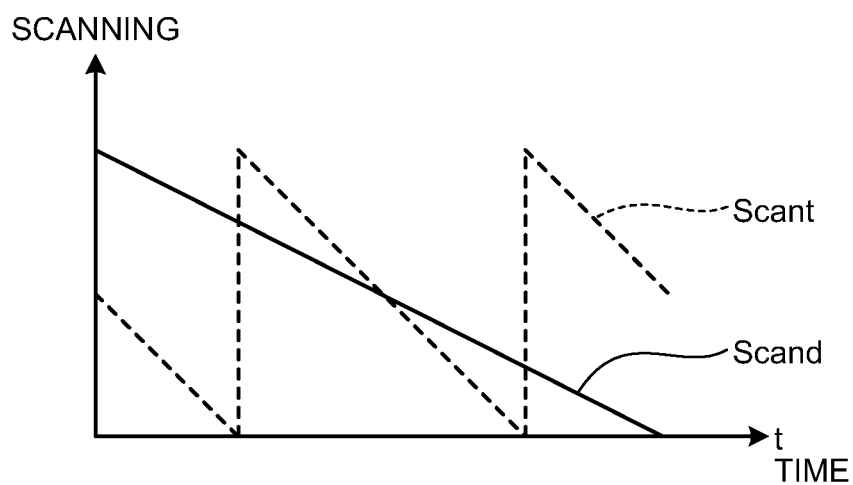
FIG. 15 is a diagram schematically illustrating display scanning and the touch detection scanning.

FIG. 15 is a diagram schematically illustrating the display scanning and the touch detection scanning. In the display device with the touch detection function 1, the gate driver 12 performs display scanning Scand by driving the scan signal lines GCL so as to perform the line-sequential scanning in a time-division manner, and the drive electrode driver 16 performs touch detection scanning Scant by sequentially selecting and driving the drive electrode blocks B. In the present example, the touch detection scanning Scant is performed at a scanning rate twice as high as that of the display scanning Scand. In this manner, the display device with the touch detection function 1 can quickly respond to the touch by the externally approaching physical body by setting the scanning rate for the touch detection higher than that for the display scanning, and thus, the response characteristics for the touch detection can be improved. The touch detection scanning Scant is not limited to be performed at this scanning rate, but may be performed, for example, at a scanning rate twice or more higher than that of the display scanning Scand, or at a scanning rate twice or less higher than that of the display scanning Scand.

Figure 16:
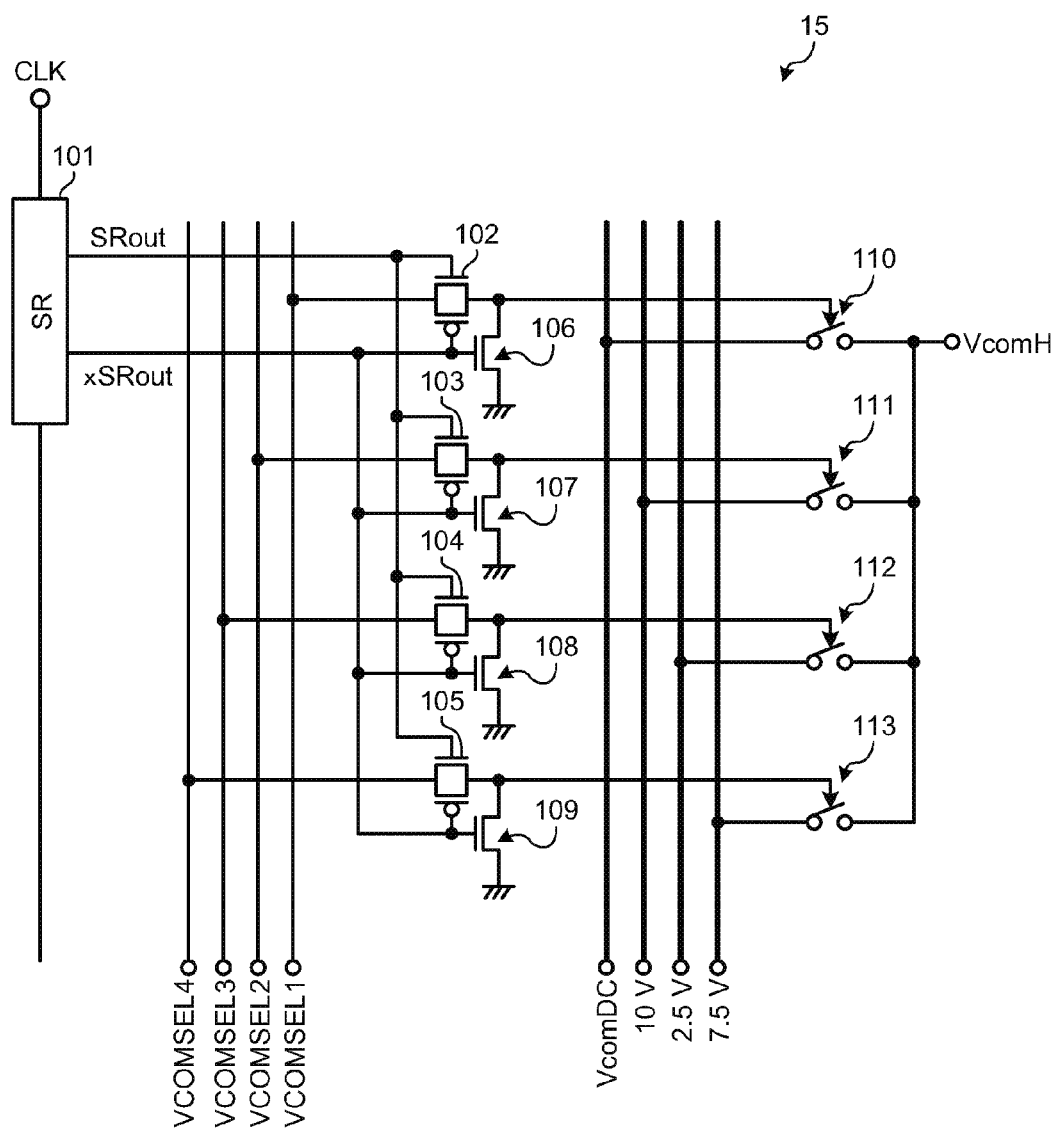
FIG. 16 is a diagram illustrating a configuration example of a drive-signal generation unit.

FIG. 16 is a diagram illustrating a configuration example of the drive-signal generation unit. The drive-signal generation unit 15 includes a shift register 101, transfer gates 102 to 105, transistors 106 to 109, and switches 110 to 113.

The shift register 101 is supplied with a clock (CLK) signal, and a non-inverted output signal SRout and an inverted output signal xSRout of the shift register 101 are inverted in synchronization with the clock signal. The non-inverted output signal SRout and the inverted output signal xSRout are supplied to a non-inverted control input terminal and an inverted control input terminal, respectively, of each of the transfer gates 102 to 105. The transfer gates 102 to 105 are turned on when the non-inverted output signal SRout is at a high level and the inverted output signal xSRout is at a low level, and turned off when the non-inverted output signal SRout is at a low level and the inverted output signal xSRout is at a high level.

While the transfer gate 102 is held on, a control signal VCOMSEL1 supplied from the control unit 11 is input to the control input terminal of the switch 110 via the transfer gate 102, and the inverted output signal xSRout is input to the gate of the transistor 106. The source-drain path of the transistor 106 is coupled between the ground potential and the control input terminal of the switch 110. Specifically, when (1) the non-inverted output signal SRout is at the high level, (2) the inverted output signal xSRout is at the low level, and (3) the control signal VCOMSEL1 is at a high level, the switch 110 is turned on, and the direct-current potential VcomDC (0 V) supplied from a power supply circuit located inside or outside the display device with the touch detection function 1 is output as the direct-current drive signal VcomH. When (1) the non-inverted output signal SRout is at the high level, (2) the inverted output signal xSRout is at the low level, and (3) the control signal VCOMSEL1 is at a low level, or when the inverted output signal xSRout is at the high level, the switch 110 is turned off.

While the transfer gate 103 is held on, a control signal VCOMSEL2 supplied from the control unit 11 is input to the control input terminal of the switch 111 via the transfer gate 103, and the inverted output signal xSRout is input to the gate of the transistor 107. The source-drain path of the transistor 107 is coupled between the ground potential and the control input terminal of the switch 111. Specifically, when (1) the non-inverted output signal SRout is at the high level, (2) the inverted output signal xSRout is at the low level, and (3) the control signal VCOMSEL2 is at a high level, the switch 111 is turned on, and a direct-current potential 10 V supplied from the power supply circuit located inside or outside the display device with the touch detection function 1 is output as the direct-current drive signal VcomH. When (1) the non-inverted output signal SRout is at the high level, (2) the inverted output signal xSRout is at the low level, and (3) the control signal VCOMSEL2 is at a low level, or when the inverted output signal xSRout is at the high level, the switch 111 is turned off.

While the transfer gate 104 is held on, a control signal VCOMSEL3 supplied from the control unit 11 is input to the control input terminal of the switch 112 via the transfer gate 104, and the inverted output signal xSRout is input to the gate of the transistor 108. The source-drain path of the transistor 108 is coupled between the ground potential and the control input terminal of the switch 112. Specifically, when (1) the non-inverted output signal SRout is at the high level, (2) the inverted output signal xSRout is at the low level, and (3) the control signal VCOMSEL3 is at a high level, the switch 112 is turned on, and a direct-current potential 2.5 V supplied from the power supply circuit located inside or outside the display device with the touch detection function 1 is output as the direct-current drive signal VcomH. When (1) the non-inverted output signal SRout is at the high level, (2) the inverted output signal xSRout is at the low level, and (3) the control signal VCOMSEL3 is at a low level, or when the inverted output signal xSRout is at the high level, the switch 112 is turned off.

While the transfer gate 105 is held on, a control signal VCOMSEL4 supplied from the control unit 11 is input to the control input terminal of the switch 113 via the transfer gate 105, and the inverted output signal xSRout is input to the gate of the transistor 109. The source-drain path of the transistor 109 is coupled between the ground potential and the control input terminal of the switch 113. Specifically, when (1) the non-inverted output signal SRout is at the high level, (2) the inverted output signal xSRout is at the low level, and (3) the control signal VCOMSEL4 is at a high level, the switch 113 is turned on, and a direct-current potential 7.5 V supplied from the power supply circuit located inside or outside the display device with the touch detection function 1 is output as the direct-current drive signal VcomH. When (1) the non-inverted output signal SRout is at the high level, (2) the inverted output signal xSRout is at the low level, and (3) the control signal VCOMSEL4 is at a low level, or when the inverted output signal xSRout is at the high level, the switch 113 is turned off.

The configuration described above allows the control unit 11 to control the control signals VCOMSEL1 to VCOMSEL4 so as to control the drive-signal generation unit 15 to output the direct-current potential VcomDC (0 V), 2.5 V, 7.5 V, or 10 V as the direct-current drive signal VcomH. The direct-current potential VcomDC (0 V), 2.5 V, 7.5 V, and 10 V are merely examples of the potential, which is not limited to these values, but may be, for example, 3.3 V, 5 V, or a negative potential. The control unit 11 can preferably detect the contact or proximity of the physical body with or to the touch surface of the touch detection device 30 by controlling the drive-signal generation unit 15 to output the direct-current drive signal VcomH of approximately 0 V to 5 V, and can preferably detect what is called hovering, in which the physical body lies above the touch surface of the touch detection device 30, by controlling the drive-signal generation unit 15 to output the direct-current drive signal VcomH of approximately 10 V.

When the direct-current drive signal VcomH rises, in order to control the direct-current drive signal VcomH to quickly reach a target potential so as to enhance the response of the touch detection by accelerating the rise of the touch detection signals Vdet, the control unit 11 may perform overdrive driving control of temporarily controlling the direct-current drive signal VcomH to be at a higher potential than the target potential when the direct-current drive signal VcomH rises. In the same manner, when the direct-current drive signal VcomH falls, in order to control the direct-current drive signal VcomH to quickly reach a target potential so as to enhance the response of the touch detection by accelerating the fall of the touch detection signals Vdet, the control unit 11 may perform the overdrive driving control of temporarily controlling the direct-current drive signal VcomH to be at a lower potential than the target potential when the direct-current drive signal VcomH falls.

Figure 17:
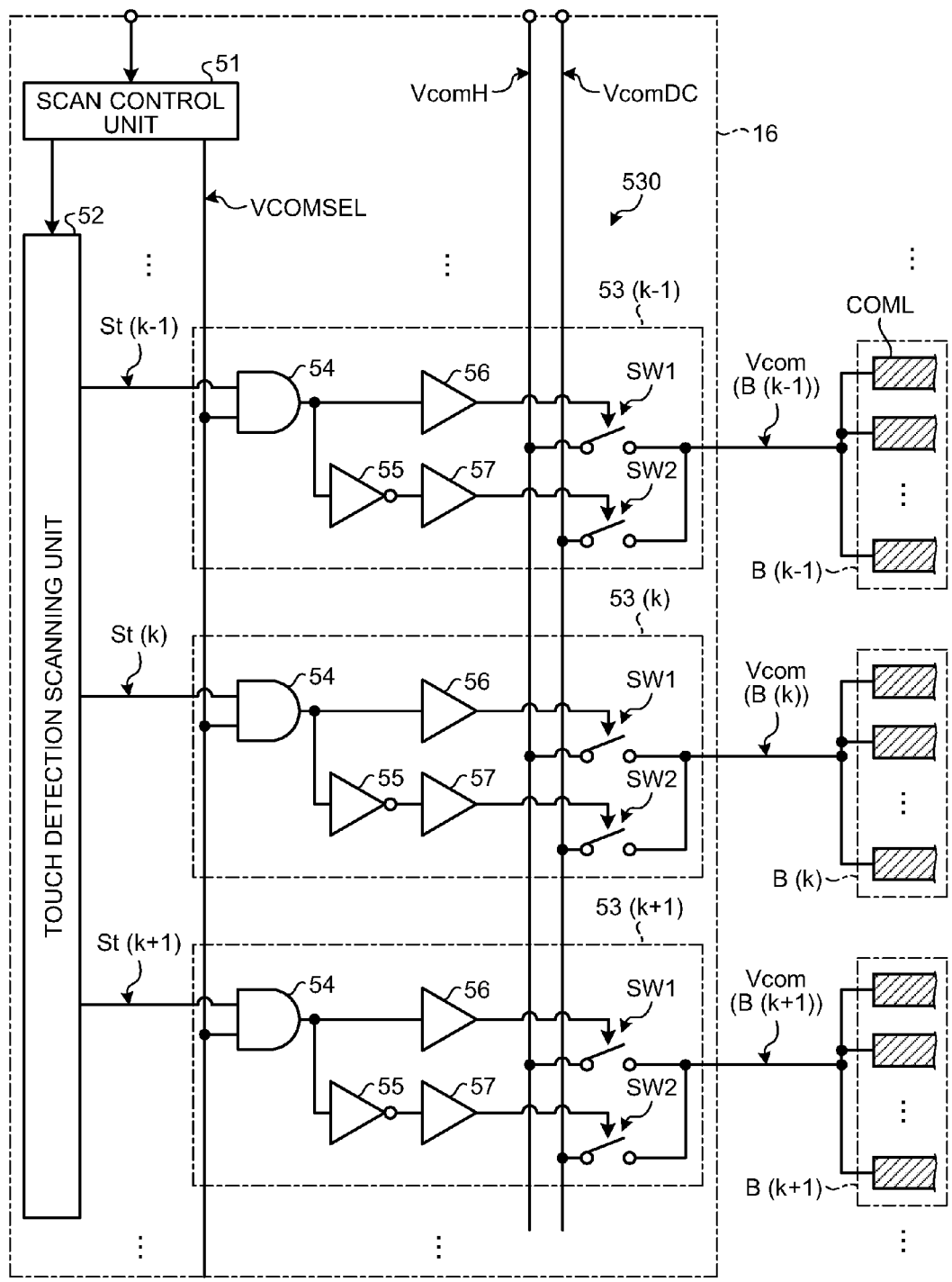
FIG. 17 is a diagram illustrating a configuration example of a drive electrode driver.

FIG. 17 is a diagram illustrating a configuration example of the drive electrode driver. The drive electrode driver 16 includes a scan control unit 51, a touch detection scanning unit 52, and a drive unit 530. The drive unit 530 includes 20 drivers 53(1) to 53(20). Hereinafter, any one of the 20 drivers 53(1) to 53(20) will be indicated simply using a term "driver 53".

Based on the control signal supplied from the control unit 11, the scan control unit 51 supplies a control signal to the touch detection scanning unit 52. The scan control unit 51 also has a function of supplying, to the drive unit 530, a Vcom-selection signal VCOMSEL for instructing which of the direct-current drive signal VcomDC and the direct-current drive signal VcomH is to be supplied to the drive electrodes COML.

The touch detection scanning unit 52 includes a shift register, and generates a scan signal St for selecting drive electrodes COML to which the direct-current drive signal VcomH is to be supplied. Specifically, based on the control signal supplied from the scan control unit 51, the touch detection scanning unit 52 generates a plurality of such scan signals St corresponding to the respective drive electrode blocks B, as will be described later. When the touch detection scanning unit 52 has supplied, for example, a high-level signal as a k-th scan signal St(k) to a k-th driver 53(k), the driver 53(k) supplies the direct-current drive signal VcomH to drive electrodes COML belonging to a k-th drive electrode block B(k).

Based on the scan signals St supplied from the touch detection scanning unit 52 and the Vcom-selection signal VCOMSEL supplied from the scan control unit 51, the drive unit 530 supplies the direct-current drive signal VcomDC or the direct-current drive signal VcomH supplied from the drive-signal generation unit 15 to the drive electrodes COML. The drivers 53 are provided in a one-to-one correspondence to the output signals of the touch detection scanning unit 52, and each driver 53 supplies the drive signal Vcom to the corresponding drive electrode block B.

The driver 53 includes an AND circuit 54, an inverter 55, buffers 56 and 57, and switches SW1 and SW2. The AND circuit 54 generates and outputs a logical product (AND) of the scan signal St supplied from the touch detection scanning unit 52 and the Vcom-selection signal VCOMSEL supplied from the scan control unit 51. The inverter 55 generates and outputs a logical inversion of the output signal of the AND circuit 54. The buffer 56 has a function of amplifying the signal supplied from the AND circuit 54 to an amplitude level that allows on-off control of the switch SW1. The switch SW1 is on-off controlled based on the signal supplied from the buffer 56. One end of the switch SW1 is supplied with the direct-current drive signal VcomH, and the other end of the switch SW1 is coupled to the drive electrodes COML constituting the drive electrode block B. The buffer 57 has a function of amplifying the signal supplied from the inverter 55 to an amplitude level that allows on-off control of the switch SW2. The switch SW2 is on-off controlled based on the signal supplied from the buffer 57. One end of the switch SW2 is supplied with the direct-current drive signal VcomDC, and the other end of the switch SW2 is coupled to the other end of the switch SW1.

With this configuration, if the scan signal St is at a high level, the driver 53 outputs the direct-current drive signal VcomH as the drive signal Vcom when the Vcom-selection signal VCOMSEL is at the high level, and outputs the direct-current drive signal VcomDC as the drive signal Vcom when the Vcom-selection signal VCOMSEL is at the low level; and if the scan signal St is at a low level, the driver 53 outputs the direct-current drive signal VcomDC as the drive signal Vcom. The driver 53 supplies the thus-output drive signal Vcom to the drive electrodes COML constituting the drive electrode block B corresponding to the driver 53.

Figure 18:
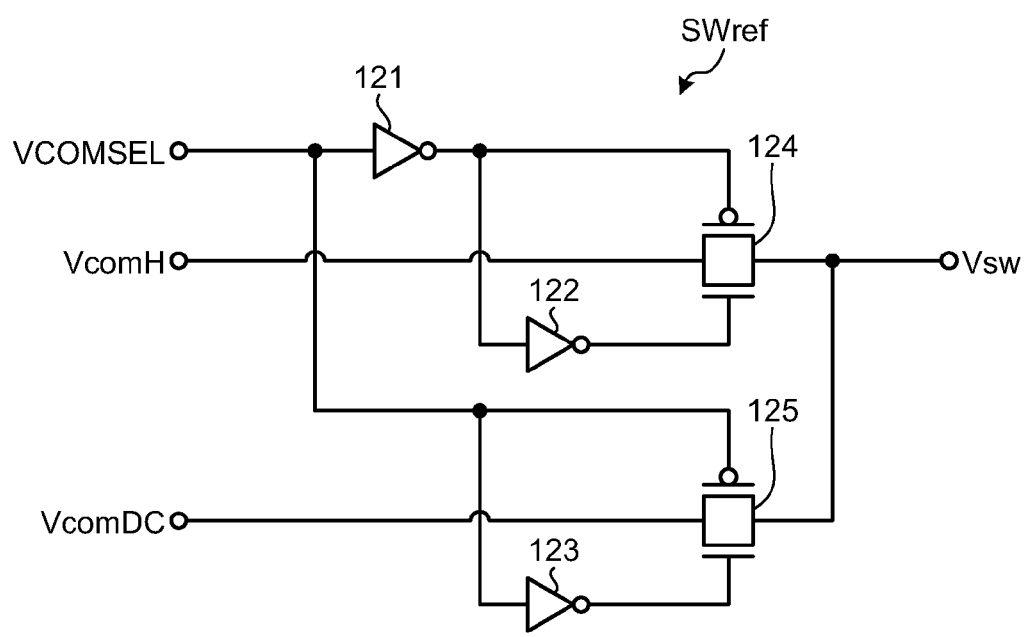
FIG. 18 is a diagram illustrating a configuration example of a switching circuit.

FIG. 18 is a diagram illustrating a configuration example of the switching circuit. The switching circuit SWref includes inverters 121 to 123 and transfer gates 124 and 125. The inverter 121 inverts the Vcom-selection signal VCOMSEL supplied from the scan control unit 51 in the drive electrode driver 16 (refer to FIG. 17), and outputs the result to the inverted control input terminal of the transfer gate 124. The inverter 122 inverts the output signal of the inverter 121, and outputs the result to the non-inverted control input terminal of the transfer gate 124. This operation causes the transfer gate 124 to be turned on when the Vcom-selection signal VCOMSEL is at the high level, and turned off when the Vcom-selection signal VCOMSEL is at the low level. When the transfer gate 124 is held on, the direct-current drive signal VcomH passes through the transfer gate 124, and is output as a drive signal Vsw to the capacitor Cref.

The Vcom-selection signal VCOMSEL is supplied to the inverted control input terminal of the transfer gate 125. The inverter 123 inverts the Vcom-selection signal VCOMSEL, and outputs the result to the non-inverted control input terminal of the transfer gate 125. This operation causes the transfer gate 125 to be turned on when the Vcom-selection signal VCOMSEL is at the low level, and turned off when the Vcom-selection signal VCOMSEL is at the high level. When the transfer gate 125 is held on, the direct-current drive signal VcomDC passes through the transfer gate 125, and is output as the drive signal Vsw to the capacitor Cref.

As a result, the drive signal Vsw as the output signal of the switching circuit SWref has the same phase as that of the drive signal Vcom, and changes in synchronization with the drive signal Vcom.

The capacitor Cref has a predetermined electrostatic capacitance, and is placed between the switching circuit SWref and the touch detection unit 40. Specifically, one end of the capacitor Cref is electrically coupled with the output terminal of the switching circuit SWref, and the other end of the capacitor Cref is coupled with the input terminal of the LPF unit 42 included in the touch detection unit 40. The capacitor Cref receives from the switching circuit SWref an excitation signal, that is, the drive signal Vsw that has the same phase as that of the drive signal Vcom and is synchronized with the drive signal Vcom. Specifically, the drive signal Vsw having the same phase as that of the drive signal Vcom is supplied to the capacitor Cref at the same time as the input of the drive signal Vcom into the drive electrode block B1; then, the drive signal Vsw having the same phase as that of the drive signal Vcom is supplied to the capacitor Cref at the same time as the input of the drive signal Vcom into the drive electrode block B2; and the same input operation is sequentially repeated up to the drive electrode block B20. The electrostatic capacitance of the capacitor Cref can be, for example, equal to the electrostatic capacitance Ctr of the intersecting portions CP in the touch detection device 30.

One end of the capacitor Cref receives the drive signal Vsw from the switching circuit SWref, and the output value Vref according to the drive signal Vsw is output from the other end of the capacitor. Hereinafter, the output value Vref from the capacitor Cref will be called the correction output value Vref as appropriate.

In the present embodiment, the capacitor Cref is disposed in a position different from an area for detecting the target object, more specifically, in a position different from an area in which the drive electrodes COML and the touch detection electrodes TDL are arranged, in the display device with the touch detection function 1. The capacitor Cref is disposed, for example, in an area corresponding to the above-described position near the touch detection unit 40. In the present embodiment, the capacitor Cref is mounted on a substrate on which the touch detection unit 40 is mounted. The substrate is, for example, a flexible printed circuit (FPC) board.

Mounting Example of Display Device with Touch Detection Function

Figure 19:
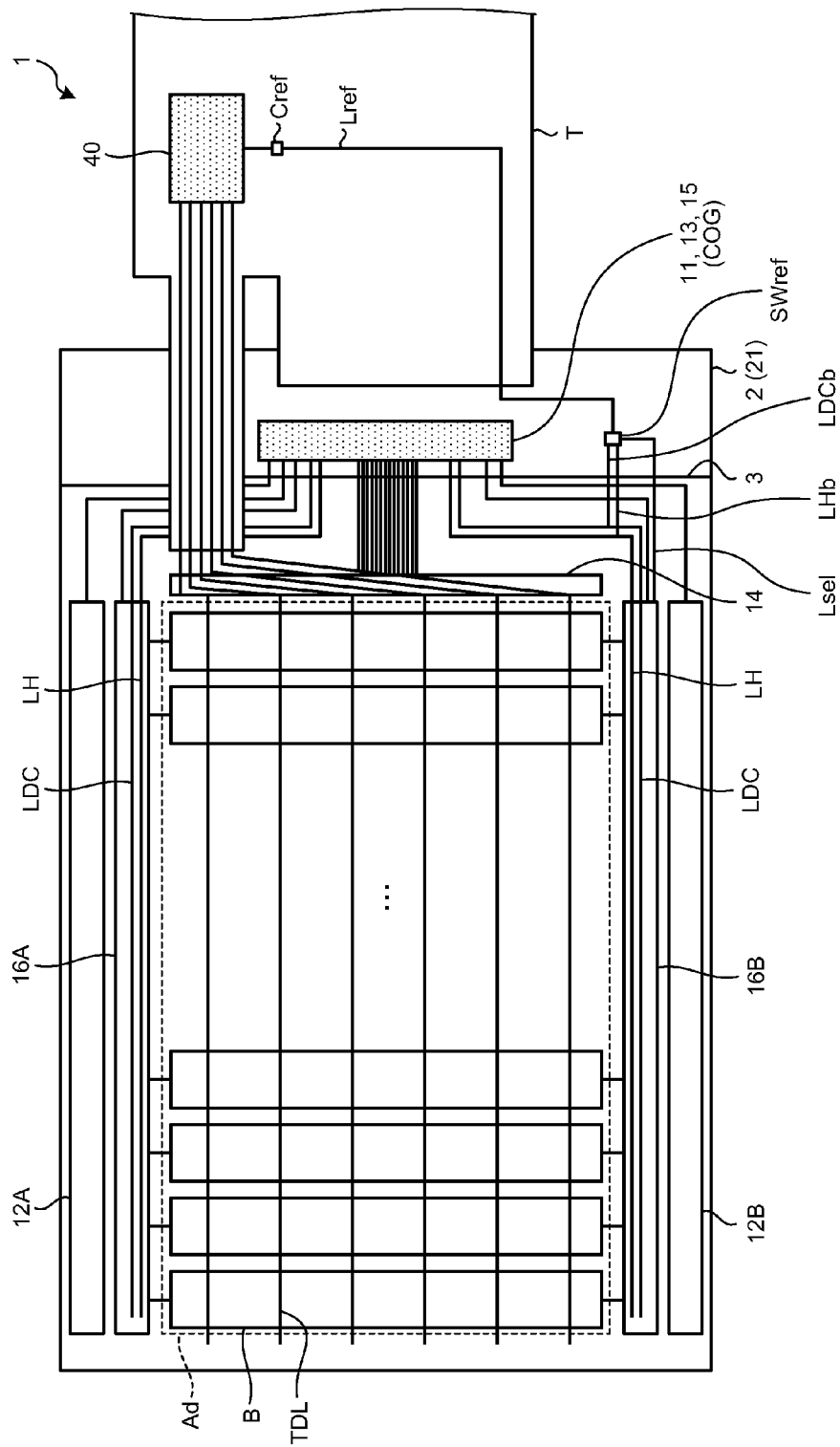
FIG. 19 is a diagram schematically illustrating a mounting example of the display device with the touch detection function.

FIG. 19 is a diagram schematically illustrating a mounting example of the display device with the touch detection function. The control unit 11, the source driver 13, and the drive-signal generation unit 15 are each mounted as a chip on glass (COG) on the pixel substrate 2. The selection switch unit 14 is provided using TFT elements near a display area Ad on the TFT substrate 21.

The gate driver 12 (12A and 12B) is provided using TFT elements on the TFT substrate 21. In the present example, the gate driver 12 is disposed on the upper side (12A) and the lower side (12B) in FIG. 19 of the pixel substrate 2, and drives the pixels Pix (not illustrated) arranged in a matrix in the display area Ad from both sides thereof.

The drive electrode driver 16 (16A and 16B) is provided using TFT elements on the TFT substrate 21. In the present example, the drive electrode driver 16 is disposed on the upper side (16A) and the lower side (16B) in FIG. 19 of the pixel substrate 2. The drive electrode driver 16 is supplied, from the drive-signal generation unit 15, with the direct-current drive signal VcomDC via wiring LDC having thick patterns and the direct-current drive signal VcomH via wiring LH having thick patterns in the same manner. The drive electrode drivers 16A and 16B drive each of the drive electrode blocks B provided side by side from both sides thereof.

The touch detection unit 40 is mounted on a flexible printed circuit board T, and is coupled with each of the touch detection electrodes TDL provided side by side.

The switching circuit SWref is provided on the TFT substrate 21, and is supplied with the direct-current drive signal VcomH via wiring LHb branching from the wiring LH, the direct-current drive signal VcomDC via wiring LDCb branching from the wiring LDC, and the Vcom-selection signal VCOMSEL from the drive electrode driver 16B via wiring Lsel. The capacitor Cref is disposed near the touch detection unit 40 on the flexible printed circuit board T, and is supplied with the drive signal Vsw from the switching circuit SWref via wiring Lref.

Correction of Output Value from Touch Detection Electrode

The display device with the touch detection function 1 supplies, to the drive electrodes COML, the drive signals Vcom for touch detection based on the direct-current drive signal VcomH and the direct-current drive signal VcomDC generated by the drive-signal generation unit 15, and detects, with the touch detection unit 40, a change in the touch detection signal Vdet as an output value from the touch detection electrode TDL so as to detect the touch operation. In such a device, fluctuations in the power supply or temperature changes may cause an unexpected change in the touch detection signal Vdet while no target object is present near the display device with the touch detection function 1.

A conventional method corrects the touch detection signal Vdet by detecting and analyzing the magnitude and the speed of the change in the touch detection signal Vdet, and then supplying the result back to the touch detection unit 40. This method can produce a delay or a shift in the correction of the touch detection signal Vdet, and can thus reduce the accuracy of the correction. A method can be considered in which electrodes for correction are arranged in the area for detecting the proximity or contact of the target object to/with the touch detection device. However, this method can hardly distinguish the change in the touch detection signal Vdet due to the proximity of the target object from changes due to other causes. Another method can be considered in which a common power supply is used for the touch detection unit 40 and the drive-signal generation unit 15. However, this method can hardly reduce noise due to, for example, temperature characteristics of transistors, or the common power supply is difficult to be employed, for example, due to layout problems.

To solve these problems, the present embodiment interposes the capacitor Cref between the drive-signal generation unit 15 and the touch detection unit 40, and after acquiring the output value (correction output value Vref) from the capacitor Cref and the output value (touch detection signal Vdet) from the touch detection electrode TDL at the same time, corrects the output value of the touch detection electrode TDL using the acquired output values. In this case, the correction output value Vref and the touch detection signal Vdet are supplied to the same touch detection unit 40.

The change in the correction output value Vref as the output value from the capacitor Cref corresponds to a change in the power supply included in the display device with the touch detection function 1, a temperature change, or another change. These changes are independent of whether the target object is present, and include many unexpected changes to be subjected to the correction. The output value (correction output value) Vref of the capacitor Cref can be detected at the same time as the detection of the target object in the display device with the touch detection function 1. The display device with the touch detection function 1 can reduce the delay or the shift in the correction by using the correction output value Vref, thereby accurately correcting the touch detection signal Vdet from the touch detection electrode TDL. The correction will be described below in detail.

Figure 20:
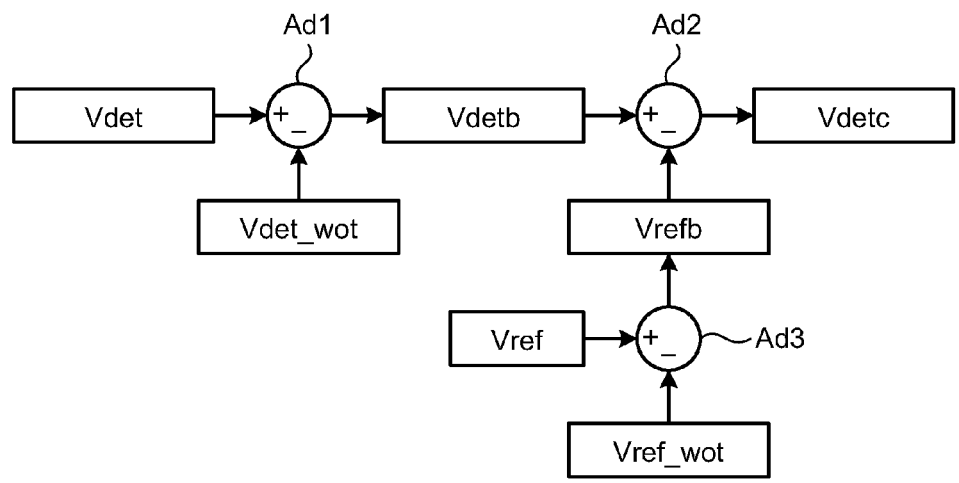
FIG. 20 is a schematic diagram illustrating processing of correcting an output value from a touch detection electrode.
Figure 21:
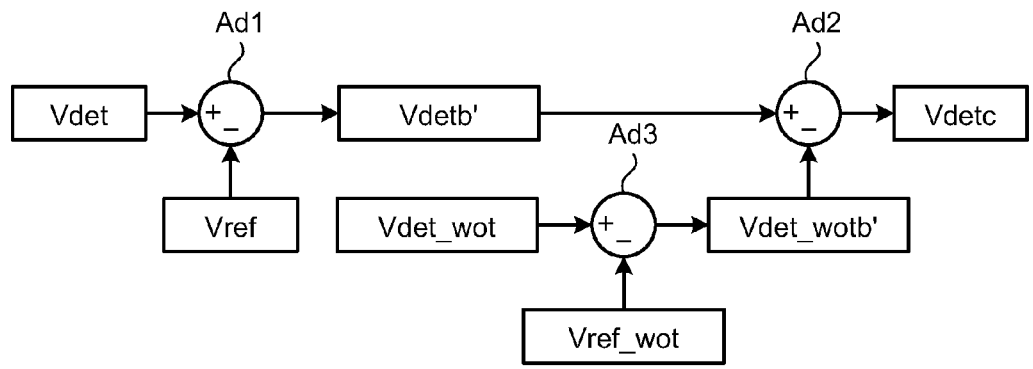
FIG. 21 is a schematic diagram illustrating the processing of correcting the output value from the touch detection electrode.
Figure 22:
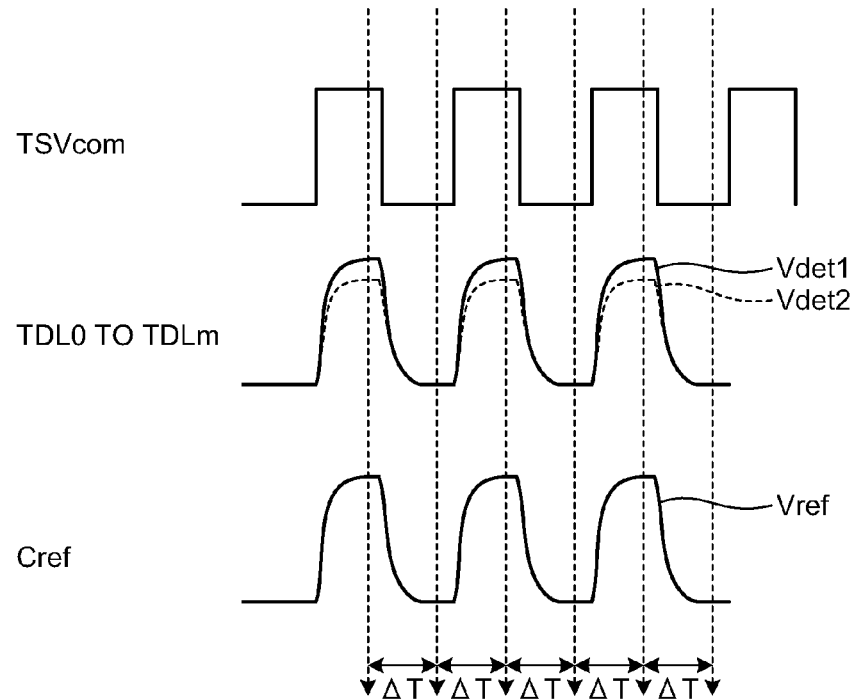
FIG. 22 is a diagram illustrating timing of acquiring output values from the touch detection electrode and a capacitor.

FIGS. 20 and 21 are schematic diagrams illustrating the processing of correcting the output value from the touch detection electrode. FIG. 22 is a diagram illustrating timing of acquiring output values from the touch detection electrode and the capacitor. FIG. 22 illustrates touch detection signals Vdet1 and Vdet2 from each of the touch detection electrodes TDL0 to TDLm, and the correction output value Vref from the capacitor Cref. The touch detection signal Vdet1 is a signal when the touch operation is not detected, and the touch detection signal Vdet2 is a signal when the touch operation is detected. The horizontal axis of FIG. 22 represents time, and the dotted straight lines indicate times at which the touch detection unit 40 acquires the data at intervals of ΔT.

The display device with the touch detection function 1, more specifically, the touch detection unit 40 performs the processing illustrated in FIG. 20. As illustrated in FIG. 20, an adder Ad1 adds the touch detection signal Vdet as the output value from the touch detection electrode TDL to a touch detection signal Vdet_wot that is an output value output from the touch detection electrode TDL when the touch operation is not detected. In the present embodiment, the adder Ad1 adds the touch detection signal Vdet to a value obtained by multiplying the touch detection signal Vdet_wot by −1, and, as a result, outputs the difference therebetween as an output value Vdetb. For example, a value acquired in advance and stored in a storing unit of the touch detection unit 40 is used as the touch detection signal Vdet_wot of when the touch operation is not detected.

An adder Ad2 adds the output value Vdetb from the adder Ad1 to an output value Vrefb from an adder Ad3. In the present embodiment, the adder Ad2 adds the output value Vdetb to a value obtained by multiplying the output value Vrefb by −1, and, as a result, outputs the difference therebetween as an output value (corrected touch detection signal) Vdetc. The output value Vrefb from the adder Ad3 is a difference between the correction output value Vref as the output value from the capacitor Cref and an output value Vref_wot that is output from the capacitor Cref when the touch operation is not detected. In the present embodiment, the adder Ad3 adds the correction output value Vref to a value obtained by multiplying the output value Vref_wot by −1, and, as a result, outputs the difference therebetween as the output value Vrefb. The touch detection unit 40 compares the output value Vdetc with the predetermined threshold voltage Vth, and detects, according to the result, whether the touch operation has occurred.

The processing illustrated in FIG. 21 will be described below. The display device with the touch detection function 1, more specifically, the touch detection unit 40 also performs this processing. As illustrated in FIG. 21, the adder Ad1 adds the touch detection signal Vdet as the output value from the touch detection electrode TDL to the correction output value Vref as the output value from the capacitor Cref. In the present embodiment, the adder Ad1 adds the touch detection signal Vdet to a value obtained by multiplying the correction output value Vref by −1, and, as a result, outputs the difference therebetween as an output value Vdetb'.

The adder Ad2 adds the output value Vdetb' from the adder Ad1 to an output value Vdet_wotb' from the adder Ad3. In the present embodiment, the adder Ad2 adds the output value Vdetb' to a value obtained by multiplying the output value Vdet_wotb' by −1, and, as a result, outputs the difference therebetween as the output value (corrected touch detection signal) Vdetc. The output value Vdet_wotb' from the adder Ad3 is a difference between the touch detection signal Vdet_wot as the output value output from the touch detection electrode TDL and the output value Vref_wot that is output from the capacitor Cref, both of the output values being output when the touch operation is not detected. In the present embodiment, the adder Ad3 adds the touch detection signal Vdet_wot to a value obtained by multiplying the output value Vref_wot by −1, and, as a result, outputs the difference therebetween as the output value Vdet_wotb'.

The touch detection signal Vdet from the touch detection electrode TDL includes information on the proximity or contact of the target object, such as the finger, to/with the display device with the touch detection function 1. The touch detection signal Vdet changes, for example, when the drive signal Vcom for touch detection varies in amplitude due to fluctuations in the power supply or the like of the display device with the touch detection function 1. The cause of this change cannot, however, be distinguished between the target object and noise. The electrostatic capacitance, however, is not changed by approaching of the target object to the area for detecting the target object because the capacitor Cref is disposed in the area different from the area for detecting the target object, as described above. As a result, unlike the touch detection signals Vdet1 and Vdet2 from each of the touch detection electrodes TDL0 to TDLm, the correction output value Vref as the output value from the capacitor Cref does not change with the approaching of the target object, as illustrated in FIG. 22. Therefore, the change in the correction output value Vref indicates a change (shift) in characteristics between the drive-signal generation unit 15 and the touch detection unit 40, such as the variation in amplitude of the drive signal Vcom for touch detection.

In the present embodiment, the portion where the drive electrode COML intersects with the touch detection electrode TDL is electrically identical to the capacitor Cref, and the outputs from the touch detection electrode TDL and the capacitor Cref are acquired at the same time. Then, as described above, the correction output value Vref from the capacitor Cref or the output value Vrefb based thereon is subtracted from the touch detection signal Vdet output from the touch detection electrode TDL (or a value obtained by subtracting therefrom the touch detection signal Vdet_wot). Using the corrected touch detection signal Vdetc thus obtained, the touch detection unit 40 can eliminate the fluctuations in the touch detection signal Vdet caused by the change in the characteristics of the drive-signal generation unit 15 and the touch detection unit 40. As a result, the touch detection unit 40 can more surely detect the touch operation by suppressing a decrease in detection accuracy of the touch operation on the display device with the touch detection function 1, that is, a decrease in accuracy of detecting the target object.

Figure 23:
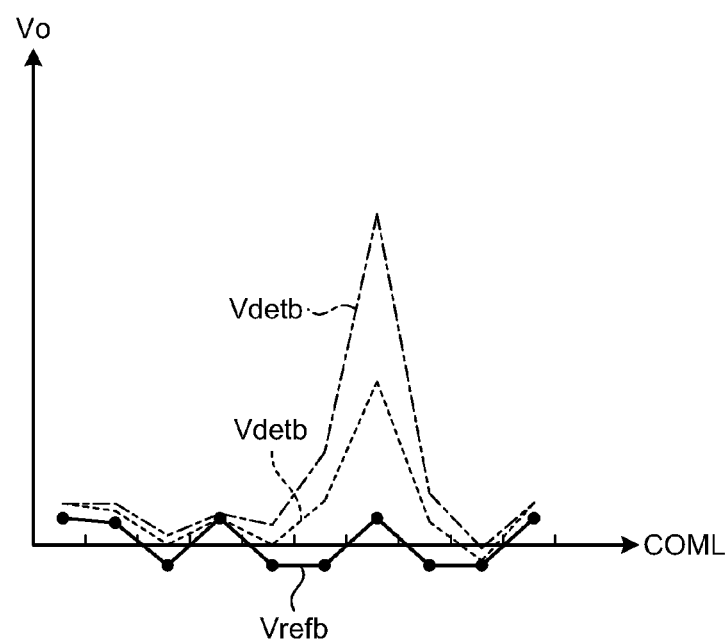
FIG. 23 is a diagram illustrating an example of touch detection signals in the case in which the output value from the touch detection electrode is not corrected.
Figure 24:
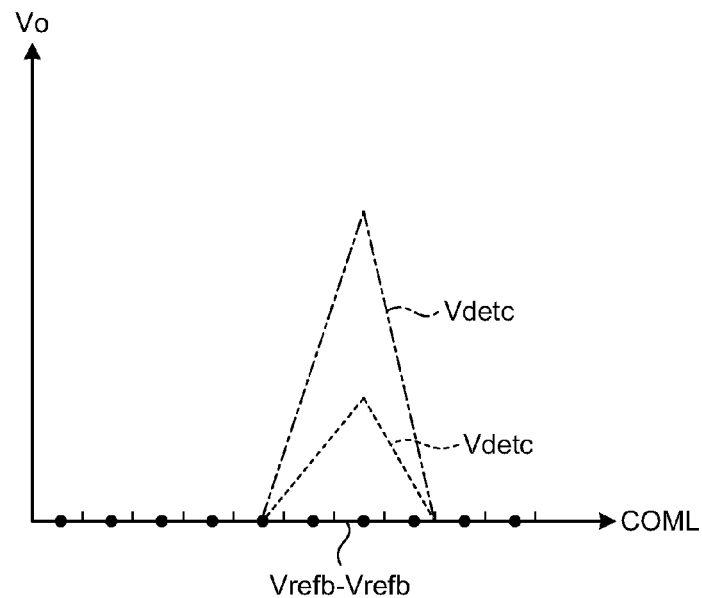
FIG. 24 is a diagram illustrating an example of the touch detection signals in the case in which the output value from the touch detection electrode is corrected.

FIG. 23 is a diagram illustrating an example of touch detection signals in the case in which the output value from the touch detection electrode is not corrected. FIG. 24 is a diagram illustrating an example of the touch detection signals in the case in which the output value from the touch detection electrode is corrected. The horizontal axis of each of FIGS. 23 and 24 corresponds to the drive electrodes COML0, COML1, . . . illustrated in FIG. 4, and the vertical axis thereof represents output values Vo from the touch detection electrode TDL and the capacitor Cref. The solid line in FIG. 23 represents the output value Vrefb as the difference between the correction output value Vref and the output value Vref_wot. The dotted line indicated in FIG. 23 represents the output value Vdetb as the difference between the touch detection signal Vdet and the touch detection signal Vdet_wot from the touch detection electrode TDL4. The chain line indicated in FIG. 23 represents the output value Vdetb as the difference between the touch detection signal Vdet and the touch detection signal Vdet_wot from the touch detection electrode TDL5. The dotted line indicated in FIG. 24 represents the corrected touch detection signal Vdetc from the adder Ad2 obtained by subtracting Vrefb from the output value Vdetb output from the adder Ad1 with respect to the touch detection electrode TDL4. The chain line indicated in FIG. 24 represents the corrected touch detection signal Vdetc from the adder Ad2 obtained by subtracting Vrefb from the output value Vdetb output from the adder Ad1 with respect to the touch detection electrode TDL5. The solid line in FIG. 24 represents a value obtained by subtracting Vrefb from the output value Vrefb indicated by the solid line in FIG. 23, which is logically zero.

When the touch detection signal Vdet from the touch detection electrode TDL is not corrected, an influence of noise in the device or external noise not caused by touching appears in the touch detection signal Vdet, as illustrated in FIG. 23, so that, depending on the case, the touch detection unit 40 may falsely detect the target object, that is, may falsely detect the touch operation. By correcting the touch detection signal Vdet from the touch detection electrode TDL using the correction output value Vref from the capacitor Cref, the influence of the noise can be reduced from the touch detection signal Vdet, as illustrated in FIG. 24, resulting in improvement in the accuracy of the detection of the touch operation by the touch detection unit 40.

Figure 25:
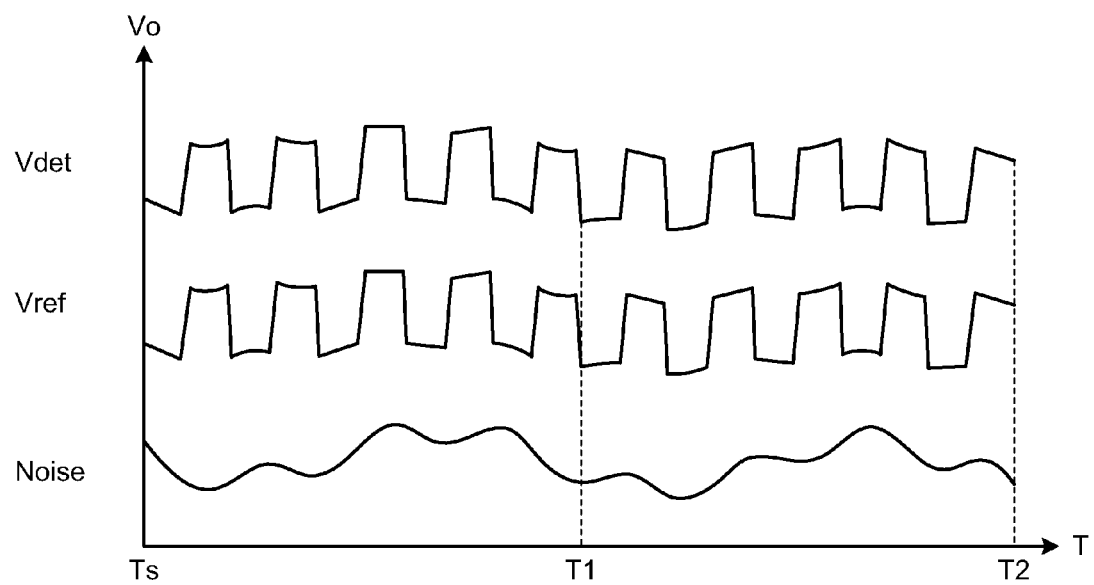
FIG. 25 is a diagram for explaining timing of correcting the output value from the touch detection electrode.
Figure 26:
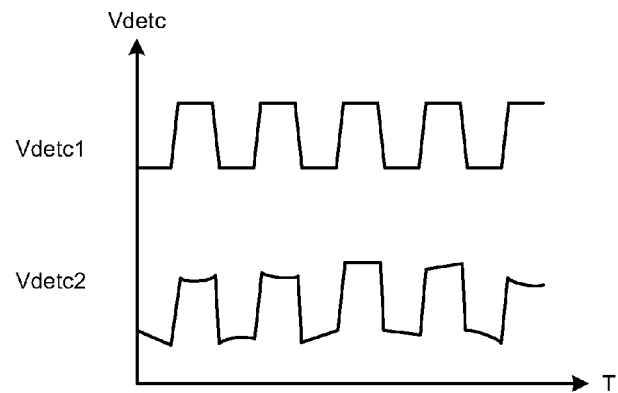
FIG. 26 is a diagram illustrating corrected touch detection signals.

FIG. 25 is a diagram for explaining timing of correcting the output value from the touch detection electrode. FIG. 26 is a diagram illustrating the corrected touch detection signals. The horizontal axis of each of FIGS. 25 and 26 represents time T. The vertical axis in FIG. 25 represents values Vo corresponding to the output values from the touch detection electrode TDL and the capacitor Cref, and the noise. The vertical axis in FIG. 26 represents the corrected touch detection signal Vdetc. Two methods for timing the correction are possible. In a first method, in an example illustrated in FIG. 25, for example, the correction output value Vref is acquired during a period from time Ts to time T1, and the touch detection signal Vdet is acquired and corrected during a period from time T1 to time T2. In other words, the touch detection signal Vdet is corrected by the correction output value Vref acquired at the time different from the time of acquiring the touch detection signal Vdet. In a second method, in the example illustrated in FIG. 25, the correction output value Vref and the touch detection signal Vdet are acquired and the correction is performed during the period from time Ts to time T1. In other words, the touch detection signal Vdet is corrected by the correction output value Vref acquired at the same time as the acquisition of the touch detection signal Vdet.

As illustrated in FIG. 25, different times give different noise states. Hence, the influence of the noise cannot be eliminated by using the touch detection signal Vdet and the correction output value Vref acquired at different times as in the case of the first method, resulting in the decrease in the accuracy of detecting the proximity or contact of the target object with the touch detection unit 40. For the reason described above, as in the case of, for example, a corrected touch detection signal Vdetc2 illustrated in FIG. 26, the influence of the noise cannot be eliminated by correcting the touch detection signal Vdet after the drive-signal generation unit 15 has sequentially supplied the drive signals Vcom for touch detection to the respective drive electrodes COML0, COML1, . . . , and COMLn. As a result, the accuracy of detecting the proximity or contact of the target object to/with the touch detection unit 40 decreases.

The present embodiment uses the second method. As illustrated in FIG. 22, in the second method, the correction output value Vref from the capacitor Cref and the touch detection signal Vdet from each of the touch detection electrodes TDL0 to TDLm are acquired at the same time. The correction output value Vref acquired at the same time as the acquisition of the touch detection signal Vdet immediately corrects the touch detection signal Vdet in real time. In the example illustrated in FIG. 25, the correction output value Vref acquired at the same time as the acquisition of the touch detection signal Vdet corrects the touch detection signal Vdet, for example, during the period from time Ts to time T1. Thus, the touch detection signal Vdet and the correction output value Vref have exactly the same shape because they are affected by the same noise. Hence, as in the case of a corrected touch detection signal Vdetc1 illustrated in FIG. 26, the touch detection unit 40 can eliminate the influence of the noise by using the touch detection signal Vdet and the correction output value Vref acquired at the same time, and can thus more surely detect the touch operation by suppressing the decrease in the accuracy of detecting the proximity or contact of the target object.

As described above, fluctuations in the power supply included in the display device with the touch detection function 1 or temperature changes may cause an unexpected change in the touch detection signal Vdet while no target object is present near the display device with the touch detection function 1, resulting in the false detection of the touch operation. This false detection is greatly affected by noise caused by differences in the power supply and the ground between the touch detection unit 40 and the drive-signal generation unit 15. Accordingly, the correction of the touch detection signal Vdet according to the present embodiment is preferable, in particular when the touch detection unit 40 and the drive-signal generation unit 15 are separated as individual electronic components, and differ from each other in the power supply and the ground. Examples of the electronic components include, but are not limited to, ICs and IC packages. Thus, the correction of the touch detection signal Vdet according to the present embodiment allows differences in the power supply and the ground, and thereby increases the degree of freedom of the layout of the display device with the touch detection function 1. For example, in a touch panel or the like in which drive electrodes for touch detection are also used as common electrodes for a display device, a touch detection unit and a drive unit may be difficult to share the same electrical and temperature characteristics for layout reasons. Hence, applying the present embodiment can significantly improve noise resistance, resulting in significant improvement in the touch detection accuracy.

An influence of temperature can produce an unexpected change in the touch detection signal Vdet. Hence, also when the touch detection unit 40 and the drive-signal generation unit 15 are obtained using the same ICs and the like, and can have the common power supply and the common ground, the correction of the touch detection signal Vdet according to the present embodiment can accurately correct the touch detection signal Vdet by reducing the influence of temperature. Thus, the correction of the touch detection signal Vdet according to the present embodiment is also preferable when the touch detection unit 40 and the drive-signal generation unit 15 are obtained using the same ICs and the like.

The present embodiment uses the capacitor Cref that is an external component as an element for correction, not through the touch detection electrodes TDL, and the capacitor Cref is disposed in the position different from those of touch detection electrodes TDL and the drive electrodes COML. This structure allows the distinction between the change in the touch detection signal Vdet due to the proximity of the target object and changes due to other causes. The capacitor Cref can be used under a relatively stable environment, so that the touch detection signal Vdet is stably corrected. Thus, the touch operation can be more surely detected by suppressing the decrease in the accuracy of detecting the proximity or contact of the target object. The following describes examples of a circuit for correction used for correcting the touch detection signal Vdet using the correction output value Vref.

Examples of Circuit for Correction

FIGS. 27 to 30 are diagrams illustrating the examples of the circuit for correction. FIG. 31 is a timing chart of the circuit for correction illustrated in FIG. 30. The horizontal axis in FIG. 31 represents time T. The following describes the circuit examples in the following order: a first circuit example illustrated in FIG. 27, a second circuit example illustrated in FIG. 28, a third circuit example illustrated in FIG. 29, and a fourth circuit example illustrated in FIG. 30. The circuits according to the following examples may include some parts of the touch detection unit 40, such as the LPF unit 42, the A/D converter 43, and signal processing unit 44.

First Circuit Example

Figure 27:
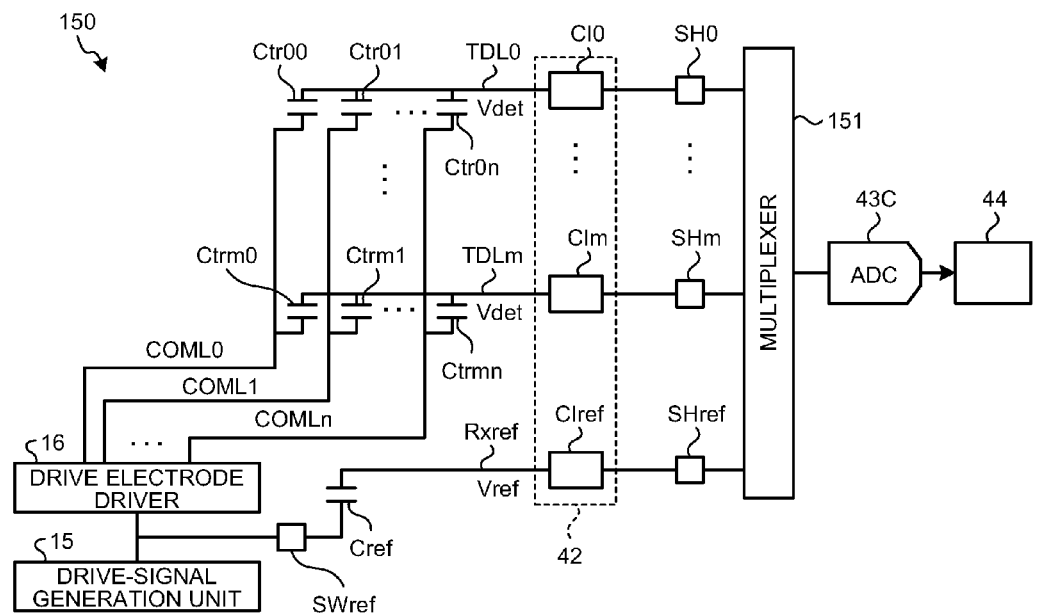
FIG. 27 is a diagram illustrating an example of a circuit for correction.

A circuit for correction (correction circuit) 150 illustrated in FIG. 27 is an example of a circuit that performs the processing of the correction illustrated in FIG. 20. The correction circuit 150 is provided with electrostatic capacitance Ctr00, . . . , Ctr0n, . . . , Ctrm0, . . . , Ctrmn at portions where the touch detection electrodes TDL0, . . . , TDLm intersect with the drive electrodes COML0, COML1, . . . , and COMLn. In the correction circuit 150, the drive signals Vcom for touch detection are supplied from the drive-signal generation unit 15 via the drive electrode driver 16 to the respective drive electrodes COML0, COML1, . . . , and COMLn. The suffixes m and n attached to the symbols TDL, COM, and Ctr are integers of 0 or larger, (m+1) representing the number of the touch detection electrodes TDL, and (n+1) representing the number of the drive electrodes COML (the same applies below).

The output values from the touch detection electrodes TDL0, . . . , TDLm are input to signal amplifiers CI0, . . . , CIm. In the correction circuit 150, the drive signal Vsw is input from the drive-signal generation unit 15 via the switching circuit SWref to the capacitor Cref. The output value Vref from the capacitor Cref is input to a signal amplifier CIref. Outputs from the signal amplifiers CI0, . . . , CIm, and CIref (corresponding to the LPF unit 42) are input to sample-hold circuits SH0, . . . , SHm, and SHref, and then input from the sample-hold circuits SH0, . . . , SHm, and SHref via a multiplexer 151 to an analog-digital converter (ADC) 43C. The ADC 43C corresponds to the A/D converter 43 of the touch detection unit 40. The signal amplifiers CI0, . . . , CIm, and CIref are, for example, integration circuits each having an operational amplifier combined with a capacitor.

In the correction circuit 150, the drive electrode driver 16 sequentially switches the drive electrodes COML0, COML1, . . . , and COMLn. In actuality, as described with reference to FIG. 17, the drive electrode driver 16 sequentially switches the drive electrode block B from one block to another. The multiplexer 151 sequentially switches the touch detection electrodes TDL0, . . . , TDLm. For example, if the drive electrode driver 16 selects the drive electrode COML0, the touch detection signals Vdet from the touch detection electrodes TDL0, . . . , TDLm are amplified by the signal amplifiers CI0, . . . , CIm, and then input to the sample-hold circuits SH0, . . . , SHm, respectively. The correction output value Vref as the output value from the capacitor Cref is amplified by the signal amplifier CIref, and then input to the sample-hold circuit SHref.

The multiplexer 151 then sequentially switches the sample-hold circuits SH0, . . . , SHm, and SHref, and transmits the respective outputs thereof to the ADC 43C.

After acquiring the outputs of the ADC 43C, the signal processing unit 44 obtains the difference between the outputs of the respective sample-hold circuits SH0, . . . , SHm (corresponding to the touch detection signals Vdet) and the output of the sample-hold circuit SHref (corresponding to the correction output value Vref). The differences correspond to the corrected touch detection signals Vdetc because the outputs of the respective sample-hold circuits SH0, . . . , SHm correspond to the touch detection signals Vdet and the output of the sample-hold circuit SHref corresponds to the correction output value Vref. After the corrected touch detection signals Vdetc are obtained for the drive electrode COML0, the drive electrode driver 16 sequentially switches the drive electrodes from the drive electrode COML1 to the drive electrode COMLn. In actuality, as described with reference to FIG. 17, the drive electrode driver 16 sequentially switches the drive electrode block B from one block to another. The drive electrode driver 16 and the signal processing unit 44 obtain the corrected touch detection signals Vdetc corresponding to the touch detection electrodes TDL0, . . . , TDLm for the drive electrodes COML1 to COMLn in the same manner as in the case of the drive electrode COML0. By doing the above, the touch detection unit 40 can acquire the corrected touch detection signals Vdetc corresponding to all the touch detection electrodes TDL, and can thereby eliminate the influence of the noise, thus more surely detecting the touch operation by suppressing the decrease in the accuracy of detecting the proximity or contact of the target object.

If the correction circuit 150 does not include the multiplexer 151, the correction circuit 150 can include (m+2) ADCs 43C, where (m+2) is obtained by adding the number of a wire Rxref for the capacitor Cref to the number of the touch detection electrodes TDL0, . . . , TDLm (the same applies to the following examples).

Second Circuit Example

Figure 28:
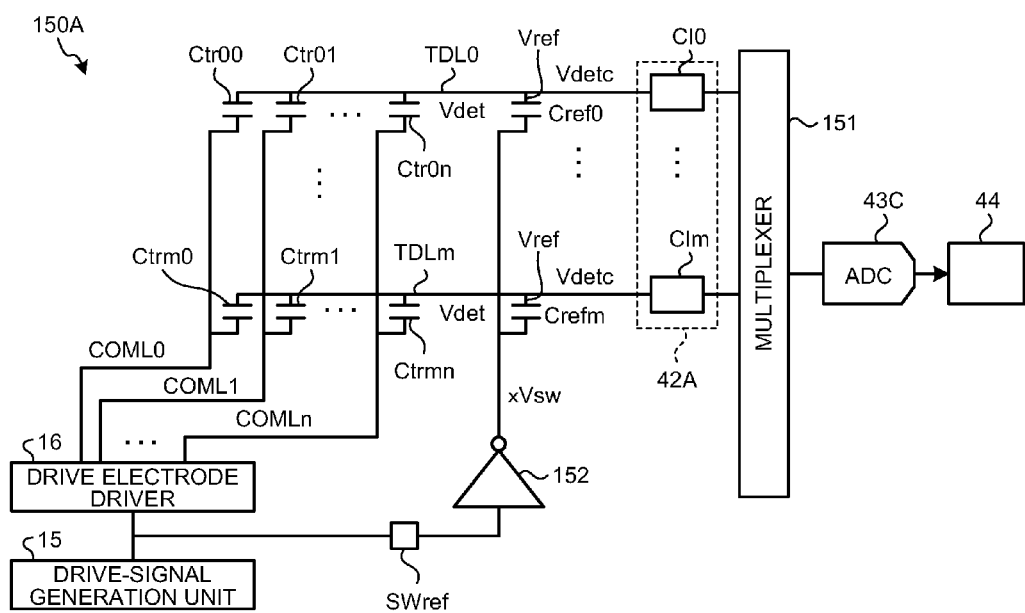
FIG. 28 is a diagram illustrating another example of the circuit for correction.

A correction circuit 150A illustrated in FIG. 28 is the example that performs the processing of the correction illustrated in FIG. 21. The correction circuit 150A includes the capacitor Cref for each of the touch detection electrodes TDL0, . . . , TDLm. Specifically, the correction circuit 150A includes (m+1) capacitors Cref0, . . . , Crefm. The drive signal Vsw from the switching circuit SWref is inverted by an inverter 152, and then input to the respective capacitors Cref0, . . . , Crefm. The inverted drive signal is denoted as xVsw.

The sums obtained by adding the touch detection signals Vdet as the output values from the touch detection electrodes TDL0, . . . , TDLm to correction output values Vref as output values from the capacitors Cref0, . . . , Crefm result in the corrected touch detection signals Vdetc that are corrected values of the output values from the touch detection electrodes TDL. The above operation can acquire, from the respective touch detection electrodes TDL0, . . . , TDLm, the corrected touch detection signals Vdetc obtained by subtracting the correction output value Vref from the touch detection signals Vdet.

The corrected touch detection signals Vdetc from the respective touch detection electrodes TDL0, . . . , TDLm are amplified by the signal amplifiers CI0, . . . , CIm (corresponding to an LPF unit 42A), and then input to the multiplexer 151. The multiplexer 151 outputs the amplified corrected touch detection signals Vdetc to the signal processing unit 44 via the ADC 43C by sequentially switching the touch detection electrodes TDL0, . . . , TDLm. Using the correction circuit 150A as described above, the touch detection unit 40 can acquire the corrected touch detection signals Vdetc corresponding to all the touch detection electrodes TDL, and can thereby eliminate the influence of the noise, thus more surely detecting the touch operation by suppressing the decrease in the accuracy of detecting the proximity or contact of the target object.

Third Circuit Example

Figure 29:
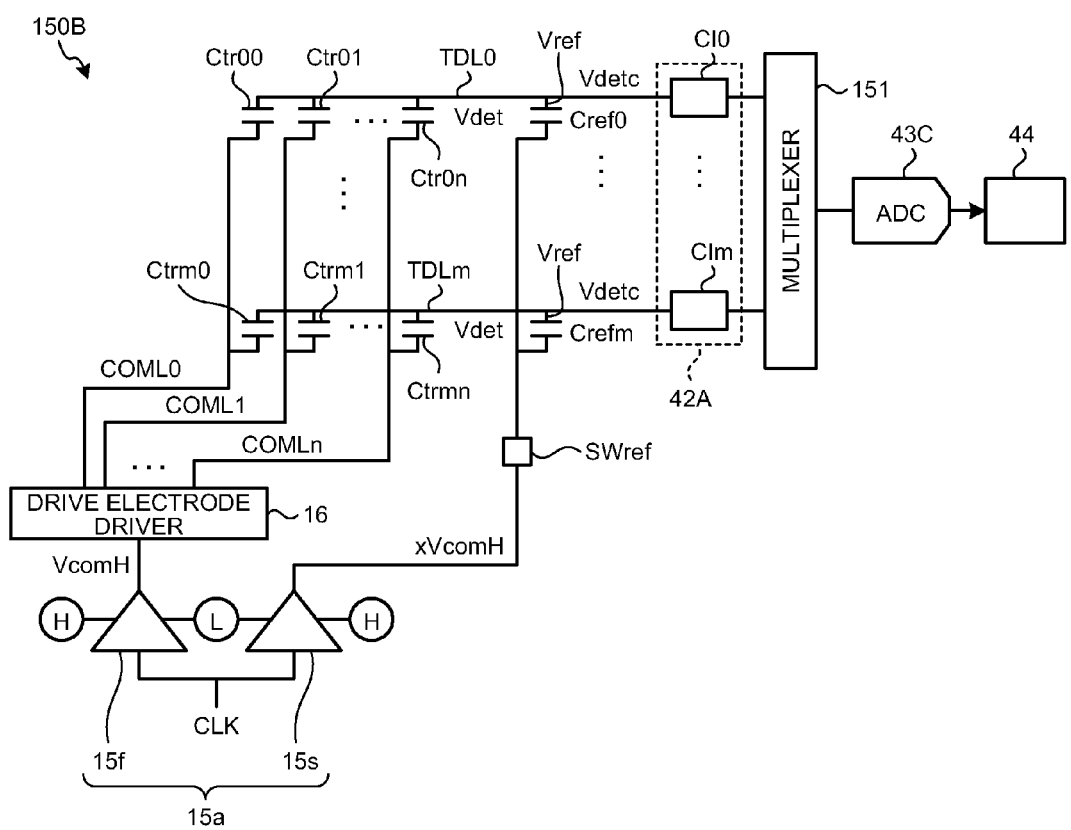
FIG. 29 is a diagram illustrating still another example of the circuit for correction.

A correction circuit 150B illustrated in FIG. 29 is the same as the correction circuit 150A illustrated in FIG. 28 except for the difference in the method for generating the inverted drive signal xVsw for touch detection that is input to the capacitors Cref. A drive-signal generation unit 15a includes a first drive unit 15f that generates the direct-current drive signal VcomH and a second drive unit 15s serving as a circuit that inverts the phase of the direct-current drive signal VcomH generated by the first drive unit 15f by 180 degrees. The first and the second drive units 15f and 15s are circuits each using, for example, an operational amplifier. The first drive unit 15f and the second drive unit 15s input a high (H) signal and a low (L) signal opposite to each other. By supplying a clock signal CLK to the first and the second drive units 15f and 15s in this manner, the direct-current drive signal VcomH and an inverted direct-current drive signal xVcomH with a phase inverted therefrom by 180 degrees are obtained. Doing the above can acquire the corrected touch detection signals Vdetc obtained by subtracting the correction output value Vref from the touch detection signals Vdet. Other units, such as the LPF unit 42A and the ADC 43C, have the same structures as those in the correction circuit 150A, so that the description thereof is omitted.

Fourth Circuit Example

Figure 30:
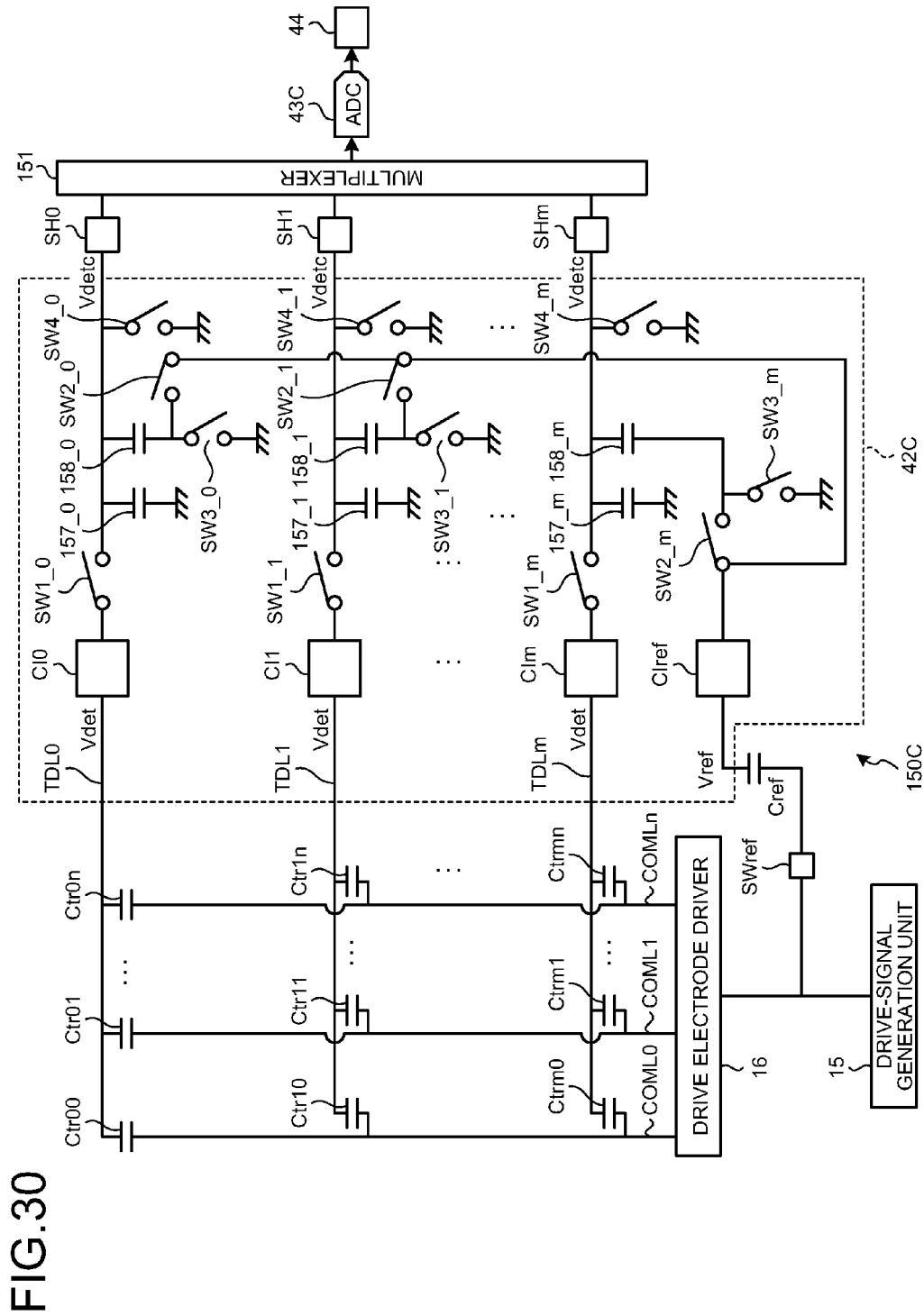
FIG. 30 is a diagram illustrating still another example of the circuit for correction.
Figure 31:
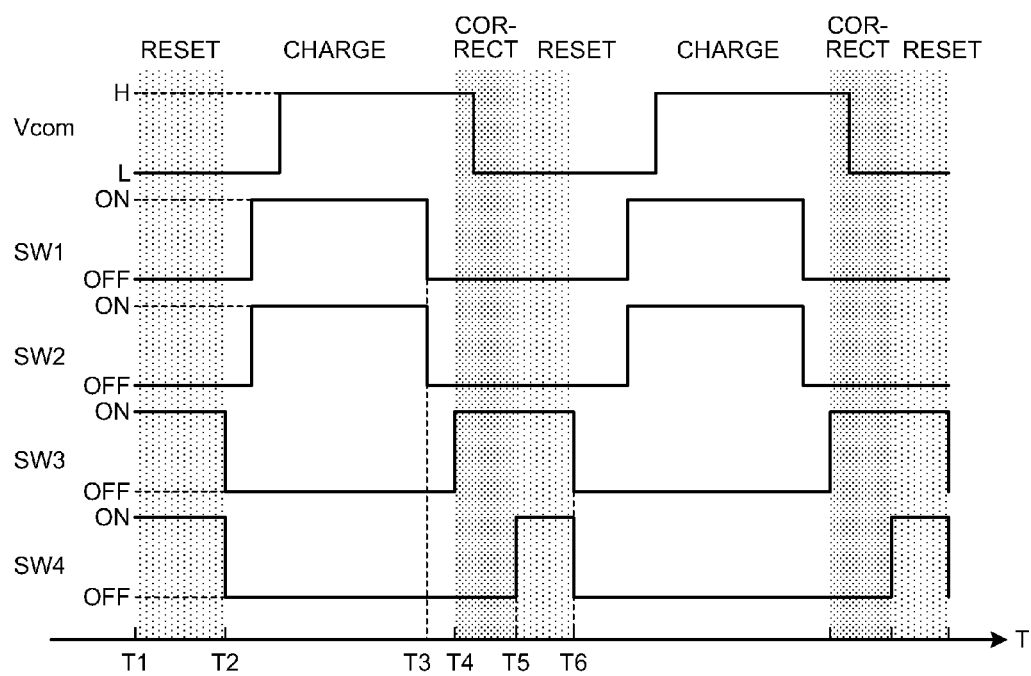
FIG. 31 is a timing chart of the circuit for correction illustrated in FIG. 30.

A correction circuit 150C illustrated in FIG. 30 corrects the touch detection signals Vdet using hold circuits. In the correction circuit 150C, the drive signals Vcom for touch detection from the drive electrode driver 16 and the drive signal Vsw from the switching circuit SWref are input to the drive electrodes COML0, COML1, . . . , and COMLn, and the capacitor Cref, respectively, at the same phase as and in synchronization with each other. The electric charges from the touch detection electrodes TDL and the electric charge charged in the capacitor Cref are temporarily charged in first electric storage devices 157_0, 157_1, . . . , and 157_m, and second electric storage devices 158_0, 158_1, . . . , and 158_m, respectively. Thereafter, the differences between the electric charge charged in the capacitor Cref and the electric charges from the touch detection electrodes TDL are obtained, and the obtained differences are determined to be the corrected touch detection signals Vdetc serving as the corrected values of the output values from the touch detection electrodes TDL. In the present embodiment, both the first electric storage devices 157_0, 157_1, . . . , and 157_m, and the second electric storage devices 158_0, 158_1, . . . , and 158_m are capacitors, but are not limited to the capacitors, as long as the electric storage devices have a function of storing electricity. In the present embodiment, the electrostatic capacitance is equal between the first electric storage devices 157_0, 157_1, . . . , and 157_m, and the second electric storage devices 158_0, 158_1, . . . , and 158_m.

An LPF unit 42C includes the signal amplifiers CI0, . . . , CIm corresponding to the touch detection electrodes TDL0, TDL1, . . . , and TDLm, respectively. Each of the signal amplifiers CI0, . . . , CIm includes, for example, an integration circuit including an operational amplifier and a capacitor. The correction output value Vref as the output of the capacitor Cref is input to the signal amplifier CIref. The signal amplifiers CI0, . . . , CIm, and CIref correspond to the LPF unit 42C.

The first switches SW1_0, SW1_1, . . . , and SW1_*m* are electrically coupled with output portions of the signal amplifiers CI0, . . . , CIm. The first switches SW1_0, SW1_1, . . . , and SW1_*m* are electrically coupled with input portions of the sample-hold circuits SH0, . . . , SH*m*, respectively. In other words, the signal amplifiers CI0, . . . , CIm are electrically coupled with the sample-hold circuits SH0, . . . , SH*m* via the first switches SW1_0, SW1_1, . . . , and SW1_*m*.

Second switches SW2_0, SW2_1, . . . , and SW2_*m* are electrically coupled in a parallel manner to the output portion of the signal amplifier CIref that receives the correction output value Vref as the output of the capacitor Cref. The respective second switches SW2_0, SW2_1, . . . , and SW2_*m* are electrically coupled with portions between the first switches SW1_0, SW1_1, . . . , and SW1_*m*, and the sample-hold circuits SH0, . . . , SH*m* via the second electric storage devices 158_0, 158_1, . . . , and 158_*m*.

Portions between the second switches SW2_0, SW2_1, . . . , and SW2_*m*, and the second electric storage devices 158_0, 158_1, . . . , and 158_*m* are grounded via third switches SW3_0, SW3_1, . . . , and SW3_*m*. Portions between the second electric storage devices 158_0, 158_1, . . . , and 158_*m*, and the sample-hold circuits SH0, . . . , SH*m* are grounded via fourth switches SW4_0, SW4_1, . . . , and SW4_*m*. Moreover, portions between the first switches SW1_0, SW1_1, . . . , and SW1_*m*, and the second electric storage devices 158_0, 158_1, . . . , and 158_*m* are grounded via the first electric storage devices 157_0, 157_1, . . . , and 157_*m*. The following describes an operation of the correction circuit 150C with reference to FIG. 31.

In the correction circuit 150C, turning on the third switches SW3_0, SW3_1, . . . , and SW3_*m* causes the correction output value Vref to correct the touch detection signals Vdet. As illustrated in FIG. 30, turning on the fourth switches SW4_0, SW4_1, . . . , and SW4_*m* causes the electric charges charged in the first electric storage devices 157_0, 157_1, . . . , and 157_*m*, and the second electric storage devices 158_0, 158_1, . . . , and 158_*m* to flow toward the ground, so that the electric charges therein become zero. In other words, turning on the fourth switches SW4_0, SW4_1, . . . , and SW4_*m* resets the correction circuit 150C.

The drive signals Vcom for touch detection that are input from the drive electrode driver 16 to the drive electrodes COML0, COML1, . . . , and COMLn repeat to be high (H) and low (L) at a predetermined cycle, as illustrated in FIG. 31. While time T=T1 to T2, the fourth switches SW4_0, SW4_1, . . . , and SW4_*m* are held on, so that the correction circuit 150C is held reset. When time T=T2, the fourth switches SW4_0, SW4_1, . . . , and SW4_*m*, and the third switches SW3_0, SW3_1, . . . , and SW3_*m* are turned off. In this state, simultaneous turning on of the first switches SW1_0, SW1_1, . . . , and SW1_*m*, and the second switches SW2_0, SW2_1, . . . , and SW2_*m* starts charging the first electric storage devices 157_0, 157_1, . . . , and 157_*m*, and the second electric storage devices 158_0, 158_1, . . . , and 158_*m*. At this time, the first electric storage devices 157_0, 157_1, . . . , and 157_*m* are charged with electric charges according to voltages of the touch detection signals Vdet that are output from the touch detection electrodes TDL0, TDL1, . . . , and TDL*m* and processed by the signal amplifiers CI0, . . . , CI*m*, and to the electrostatic capacitance of the first electric storage devices 157_0, 157_1, . . . , and 157_*m*. The second electric storage devices 158_0, 158_1, . . . , and 158_*m* are charged with electric charges according to the voltage of the correction output value Vref that is output from the capacitor Cref and processed by the signal amplifier CIref, and to the electrostatic capacitance of the second electric storage devices 158_0, 158_1, . . . , and 158_*m*.

When time T=T3, the first switches SW1_0, SW1_1, . . . , and SW1_*m*, and the second switches SW2_0, SW2_1, . . . , and SW2_*m* are simultaneously turned off, so that the first electric storage devices 157_0, 157_1, . . . , and 157_*m*, and the second electric storage devices 158_0, 158_1, . . . , and 158_*m* stop being charged. When time T=T4, the third switches SW3_0, SW3_1, . . . , and SW3_*m* are turned on. This operation causes the electric charges charged in the second electric storage devices 158_0, 158_1, . . . , and 158_*m* to partially flow toward the ground through the third switches SW3_0, SW3_1, . . . , and SW3_*m*. As a result, voltages corresponding to differences in the electric charges between the first electric storage devices 157_0, 157_1, . . . , and 157_*m*, and the second electric storage devices 158_0, 158_1, . . . , and 158_*m* are supplied to the input portions of the sample-hold circuits SH0, . . . , SH*m*. In this manner, the correction circuit 150C can correct the touch detection signals Vdet from the touch detection electrodes TDL using the correction output value Vref from the capacitor Cref acquired at the same time as the acquisition of the touch detection signals Vdet. More specifically, the correction circuit 150C can obtain the corrected touch detection signals Vdetc corresponding to the differences between the touch detection signals Vdet and the correction output value Vref. The corrected touch detection signals Vdetc are input to the sample-hold circuits SH0, . . . , SH*m*. The corrected touch detection signals Vdetc thus input are sequentially output by the multiplexer 151 to the signal processing unit 44 via the ADC 43C.

When time T=T5, the fourth switches SW4_0, SW4_1, . . . , and SW4_*m* are turned on, so that the correction circuit 150C is reset. When time T=T6, the third switches SW3_0, SW3_1, . . . , and SW3_*m*, and the fourth switches SW4_0, SW4_1, . . . , and SW4_*m* are turned off, and a preparation is completed for recharging the first electric storage devices 157_0, 157_1, . . . , and 157_*m*, and the second electric storage devices 158_0, 158_1, . . . , and 158_*m*. Thereafter, the charge, the correction, and the reset are repeated.

The correction circuit 150C corrects the touch detection signals Vdet from the touch detection electrodes TDL with the circuit for holding the electric charges that uses the first electric storage devices 157_0, 157_1, . . . , and 157_*m*, and the second electric storage devices 158_0, 158_1, . . . , and 158_*m*. Such a circuit configuration makes the correction circuit 150C advantageous in needing only one capacitor Cref.

While the four examples of the correction circuits 150, 150A, 150B and 150C have been described, the correction circuit in the present embodiment is not limited to these examples. For example, the touch detection unit 40 may obtain the corrected touch detection signals Vdetc by performing arithmetic processing using digital values obtained by digitizing the touch detection signal Vdet and the correction output value Vref with the ADC 43C.

Disposition of Capacitor

As described above, the capacitor Cref is disposed in the position different from the area for detecting the target object, more specifically, the area in which the drive electrodes COML and the touch detection electrodes TDL are arranged, in the display device with the touch detection function 1. This disposition reduces the change in the electrostatic capacitance of the capacitor Cref caused by approaching of the target object, such as the finger, to the touch detection electrodes TDL. As a result, the accuracy of the correction of the touch detection signals Vdet is improved.

The capacitor Cref is preferably disposed near the touch detection unit 40. Doing so can reduce the influence of the noise externally entering the display device with the touch detection function 1 as much as possible. If the touch detection unit 40 is built from, for example, an assembly of electronic components obtained by integrating ICs or a plurality of electronic components, the capacitor Cref may be disposed in the touch detection unit 40. Doing so can reduce the influence of the noise externally entering the display device with the touch detection function 1 as much as possible.

The capacitor Cref may be mounted on the substrate on which the touch detection unit 40 is mounted. Doing so facilitates layout of wiring that couples the touch detection unit 40 with the capacitor Cref.

Wiring that electrically couples the capacitor Cref with the drive-signal generation unit 15 is preferably longer than the wiring that electrically couples the capacitor Cref with the touch detection unit 40. This preference is because the drive-signal generation unit 15 is relatively little affected by the noise externally entering the display device with the touch detection function 1 because of low impedance. Hence, the wiring that electrically couples the capacitor Cref with the drive-signal generation unit 15 can be longer, and the wiring that electrically couples the capacitor Cref with the touch detection unit 40 can be shorter. As a result, the capacitor Cref can be disposed nearer to the touch detection unit 40, so that the influence of the noise externally entering the display device with the touch detection function 1 can be reduced as much as possible.

The drive-signal generation unit 15 corresponds to a specific example of a "signal generation unit" in the present disclosure. The direct-current drive signals VcomDC and VcomH correspond to specific examples of "direct-current signals" in the present disclosure. The drive electrode driver 16 corresponds to a specific example of a "first drive unit" in the present disclosure. The switching circuit SWref corresponds to a specific example of a "second drive unit" in the present disclosure. The direct-current drive signal VcomDC corresponds to a specific example of a "first direct-current signal" in the present disclosure, and the direct-current drive signal VcomH corresponds to a specific example of a "second direct-current signal" in the present disclosure. The capacitor Cref corresponds to a specific example of an "element" in the present disclosure. The touch detection unit 40 corresponds to a specific example of a "detection unit" in the present disclosure. The sub-pixels SPix correspond to a specific example of "display elements" in the present disclosure. The source driver 13 and the selection switch unit 14 correspond to a specific example of a "pixel signal generation unit" in the present disclosure. The pixel signal lines SGL correspond to a specific example of "signal lines" in the present disclosure.

Operations and Advantages

The following describes operations and advantages of the display device with the touch detection function 1 in the present embodiment.

Overall Operation Overview

An overview of the overall operation of the display device with the touch detection function 1 will first be described with reference to FIG. 1. Based on the video signal Vdisp, the control unit 11 supplies the control signal to each of the gate driver 12, the source driver 13, the drive electrode driver 16, and the touch detection unit 40, and controls the drivers and the unit so as to operate them in synchronization with each other.

The gate driver 12 supplies the scan signal Vscan to the liquid crystal display unit 20 to sequentially select one horizontal line as the target of the display drive. The source driver 13 generates the pixel signals Vsig obtained by multiplexing the pixel signals Vpix, and the switch control signals Vsel corresponding thereto, and supplies the generated signals to the selection switch unit 14. Based on the pixel signals Vsig and the switch control signals Vsel, the selection switch unit 14 produces the pixel signals Vpix by separation, and supplies the pixel signals Vpix to the respective sub-pixels SPix constituting the one horizontal line. The drive-signal generation unit 15 generates the direct-current drive signals VcomDC and VcomH. The drive electrode driver 16 supplies the drive signals Vcom in units of drive electrode blocks B. Specifically, in the display operation, the drive electrode driver 16 supplies the direct-current drive signal VcomDC to the drive electrodes COML. In the touch detection operation, the drive electrode driver 16 generates pulse signals from the direct-current drive signals VcomDC and VcomH, and supplies the generated pulse signals to the drive electrodes COML related to the touch detection operation while supplying the direct-current drive signal VcomDC to the other drive electrodes COML. The display unit with the touch detection function 10 performs the display operation and the touch detection operation, and outputs the touch detection signals Vdet from the touch detection electrodes TDL.

The touch detection unit 40 detects the touch based on the touch detection signals Vdet. Specifically, the LPF unit 42 removes the high-frequency components (noise components) included in the touch detection signals Vdet, and extracts and outputs the touch components. The A/D converter 43 converts the analog signals output from the LPF unit 42 into the digital signals. Based on the output signals of the A/D converter 43, the signal processing unit 44 detects whether the display unit with the touch detection function 10 is touched. The coordinate extraction unit 45 obtains the touch panel coordinates of a touch when the touch is detected by the signal processing unit 44. The detection-timing control unit 46 performs control so as to operate the LPF unit 42, the A/D converter 43, the signal processing unit 44, and the coordinate extraction unit 45 in synchronization with each other. The following describes detailed operations of the display device with the touch detection function 1.

Detailed Operations

Figure 32:
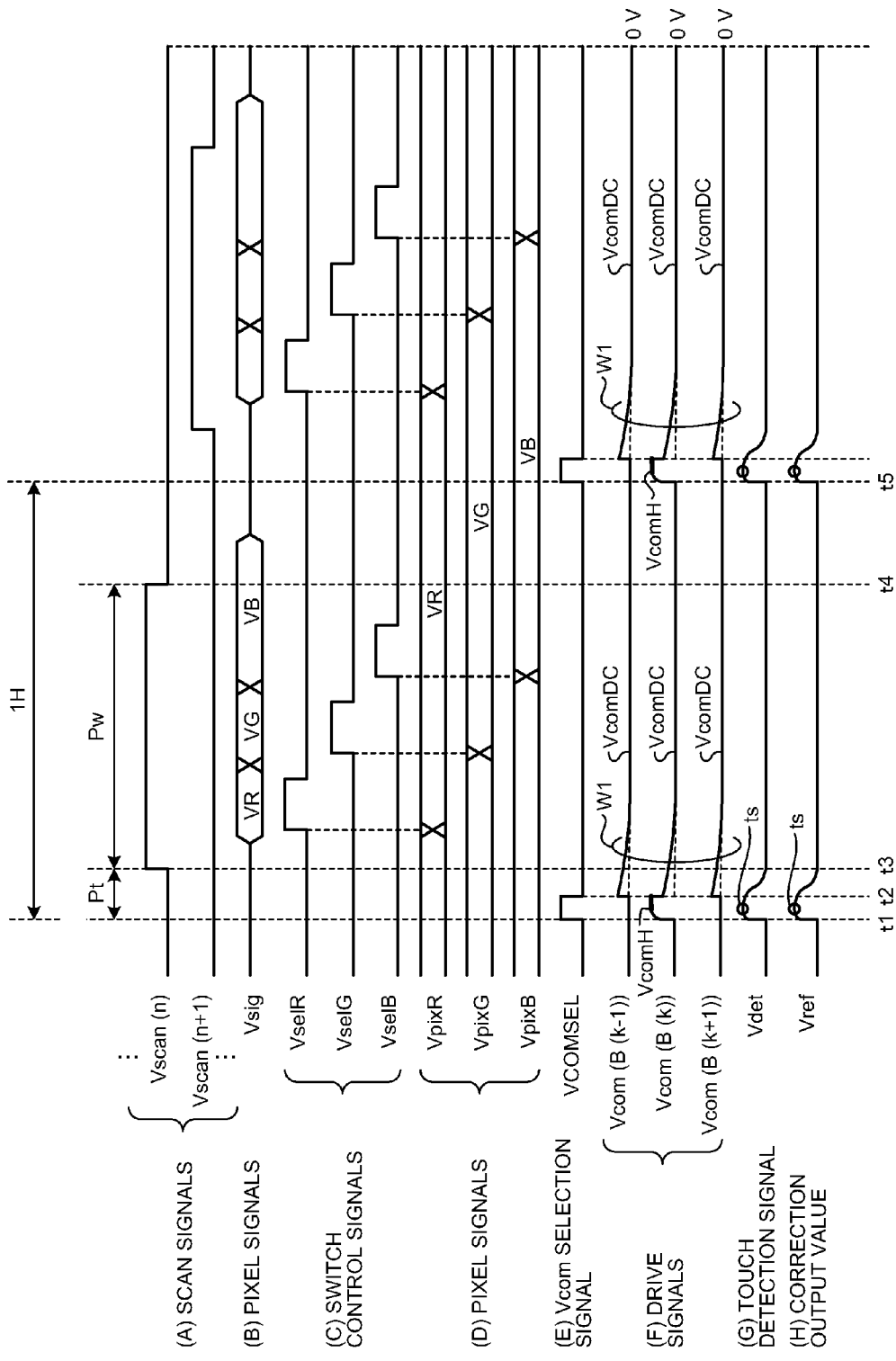
FIG. 32 is a diagram illustrating a timing waveform example of the display device with the touch detection function.

FIG. 32 is a diagram illustrating a timing waveform example of the display device with the touch detection function, where (A) representing waveforms of some of the scan signals Vscan, (B) representing waveforms of the pixel signals Vsig, (C) representing waveforms of the switch control signals Vsel, (D) representing waveforms of the pixel signals Vpix, (E) representing a waveform of the Vcom-selection signal VCOMSEL, (F) representing waveforms of some of the drive signals Vcom, (G) representing a waveform of the touch detection signal Vdet, and (H) representing a waveform of the correction output value Vref.

Each horizontal scanning period (1H) of the display device with the touch detection function 1 includes a touch detection period Pt for performing the touch detection operation and a writing period Pw for writing the pixel signals Vpix during the display operation. In the touch detection operation, the drive electrode driver 16 performs the touch detection scanning by sequentially supplying the pulse signals generated from the direct-current drive signals VcomDC and VcomH to the drive electrodes COML related to the touch detection operation in units of drive electrode blocks B, and the touch detection unit 40 detects the touch based on the touch detection signal Vdet output from each of the touch detection electrodes TDL. In the display operation, the gate driver 12 sequentially supplies the scan signals Vscan to the scan signal lines GCL, and the source driver 13 and the selection switch unit 14 write the pixel signals Vpix to the respective sub-pixels SPix constituting a selected horizontal line. The following describes the details of the operations.

First, at time t1, one horizontal scanning period (1H) begins, and the touch detection period Pt begins.

At time t1, the scan control unit 51 of the drive electrode driver 16 changes the voltage of the Vcom-selection signal VCOMSEL from the low level to the high level ((E) in FIG. 32). This change causes, in the k-th driver 53(k) of the drive electrode driver 16 related to the touch detection operation, the switch SW1 to be turned on and the switch SW2 to be turned off, so that the direct-current drive signal VcomH is supplied as a drive signal Vcom(B(k)) to the drive electrodes COML constituting the corresponding k-th drive electrode block B(k) via the switch SW1 ((F) in FIG. 32). This operation changes the drive signal Vcom(B(k)) from the low level (0 V) to the high level (potential VH). The changed drive signal Vcom(B(k)) is transmitted to each of the touch detection electrodes TDL via the electrostatic capacitance, and the touch detection signal Vdet changes ((G) in FIG. 32). The change in the Vcom-selection signal VCOMSEL from the low level to the high level causes the switching circuit SWref to output the direct-current drive signal VcomH as the drive signal Vsw to the capacitor Cref. This operation changes the correction output value Vref as the output signal of the capacitor Cref at the same phase as and in synchronization with the touch detection signal Vdet ((H) in FIG. 32).

Next, at a sampling time ts, the A/D converter 43 of the touch detection unit 40 A/D-converts the output signal of the LPF unit 42 that receives the touch detection signal Vdet and the correction output value Vref ((G) and (H) in FIG. 32). The signal processing unit 44 of the touch detection unit 40 performs the touch detection based on the results of the A/D conversion collected during a plurality of horizontal scanning periods.

In each driver 53 other than the driver 53(k), the switch SW1 is held off and the switch SW2 is held on during a period from time t1 to time t2, so that the direct-current drive signal VcomDC is supplied to drive electrodes COML constituting the corresponding drive electrode block B via the switch SW2 ((F) in FIG. 32). This operation maintains, for example, a drive signal Vcom(B(k−1)) and a drive signal Vcom(B(k+1)) at the low level (VcomDC).

Next, at time t2, the scan control unit 51 of the drive electrode driver 16 changes the voltage of the Vcom-selection signal VCOMSEL from the high level to the low level ((E) in FIG. 32). This change causes, in the driver 53(k) of the drive electrode driver 16, the switch SW1 to be turned off and the switch SW2 to be turned on, so that the direct-current drive signal VcomDC is supplied as the drive signal Vcom(B(k)) to the drive electrodes COML constituting the corresponding drive electrode block B(k) via the switch SW2 ((F) in FIG. 32).

At this time, the electric charges charged in the drive electrodes COML of the drive electrode block B(k) move to another drive electrode block B via the switch SW2 of the driver 53(k) at time t2 and later, so that the drive signals Vcom (such as Vcom(B(k−1)), Vcom(B(k)), and Vcom(B(k+1))) slightly rise (waveform portions W1) as illustrated in (F) in FIG. 32. The drive-signal generation unit 15 then sinks the electric charges, so that the drive signals Vcom converge to the potential level (0 V) of the direct-current drive signal VcomDC.

Next, at time t3, the touch detection period Pt ends, and the writing period Pw begins.

At time t3, the gate driver 12 supplies the scan signal Vscan to a scan signal line GCL(n) in the n-th row related to the display operation, so that a scan signal Vscan(n) changes from the low level to the high level ((A) in FIG. 32). In this manner, the gate driver 12 selects one horizontal line as the target of the display operation.

The source driver 13 supplies a pixel potential VR for a red sub-pixel SPix as the pixel signal Vsig to the selection switch unit 14 ((B) in FIG. 32), and generates the switch control signal VselR that is held at a high level during a period in which the pixel potential VR is supplied ((C) in FIG. 32). The selection switch unit 14 holds the switch SWR on while the switch control signal VselR is at the high level so as to separate the pixel potential VR supplied from the source driver 13 from the pixel signal Vsig, and supplies the pixel potential VR as the pixel signal VpixR to the red sub-pixel SPix via the pixel signal line SGL ((D) in FIG. 32). After the switch SWR is turned off, the pixel signal line SGL is made to be in a floating state, so that the potential of the pixel signal line SGL is held ((D) in FIG. 32).

In the same manner, the source driver 13 supplies a pixel potential VG for a green sub-pixel SPix together with the corresponding switch control signal VselG to the selection switch unit 14 ((B) and (C) in FIG. 32); and, based on the switch control signal VselG, the selection switch unit 14 separates the pixel potential VG from the pixel signal Vsig, and supplies the pixel potential VG as the pixel signal VpixG to the green sub-pixel SPix via the pixel signal line SGL ((D) in FIG. 32).

Thereafter, in the same manner, the source driver 13 supplies a pixel potential VB for a blue sub-pixel SPix together with the corresponding switch control signal VselB to the selection switch unit 14 ((B) and (C) in FIG. 32); and, based on the switch control signal VselB, the selection switch unit 14 separates the pixel potential VB from the pixel signal Vsig, and supplies the pixel potential VB as the pixel signal VpixB to the blue sub-pixel SPix via the pixel signal line SGL ((D) in FIG. 32).

Next, at time t4, the gate driver 12 changes the scan signal Vscan(n) of the scan signal line GCL in the n-th row from the high level to the low level ((A) in FIG. 32). This change electrically cuts off the sub-pixels SPix in one horizontal line related to the display operation from the pixel signal line SGL. This is the end of the writing period Pw.

At time t5, one horizontal scanning period (1H) ends, and a new horizontal scanning period (1H) begins.

From this point onward, the display device with the touch detection function 1 repeats the above-described operations so as to perform the display operation over the entire display surface by line-sequentially scanning the display surface, and perform the touch detection operation over the entire touch detection surface by scanning the drive electrode blocks B one after another, as will be illustrated below.

Figure 33:
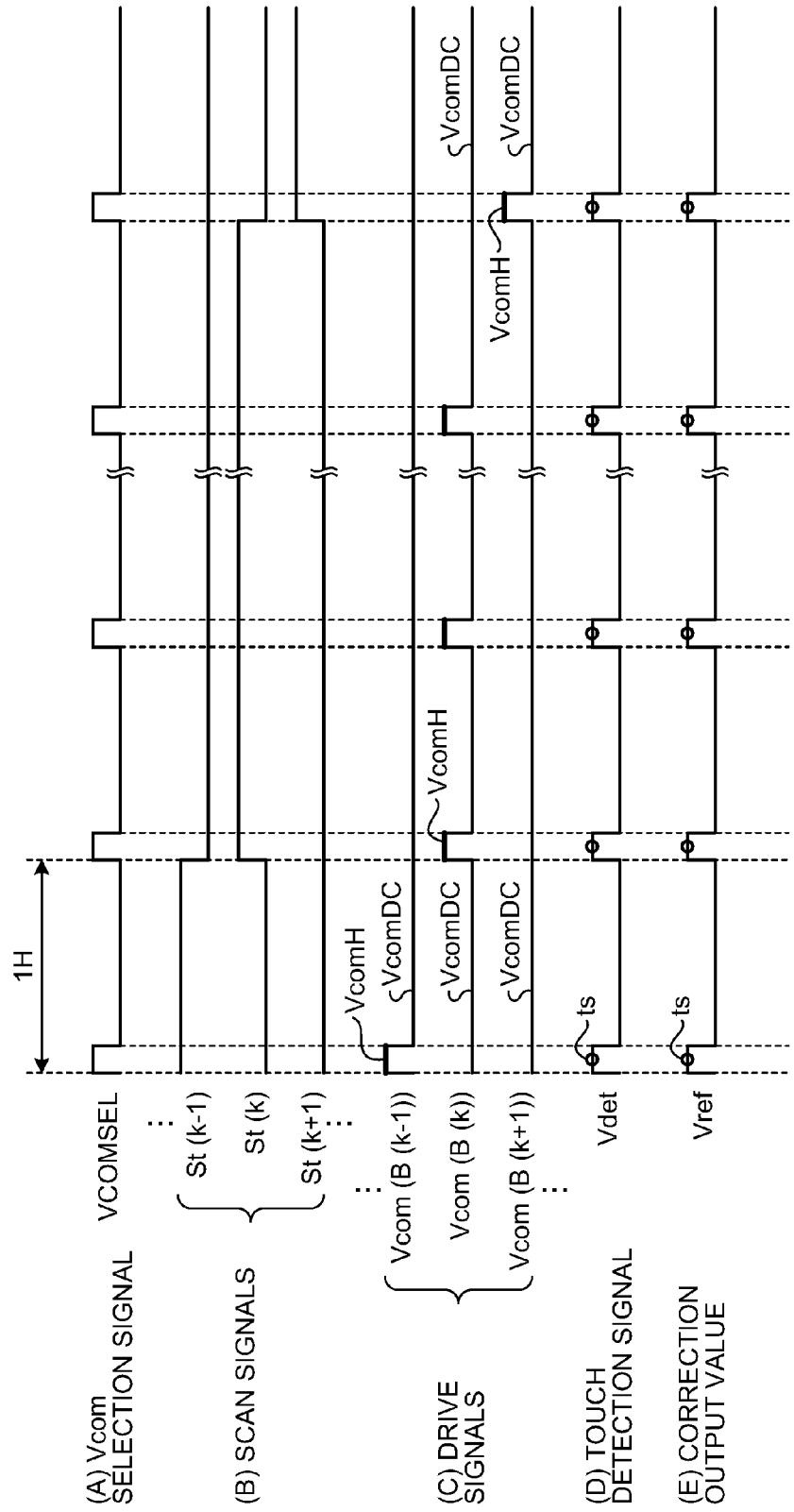
FIG. 33 is a diagram illustrating an operation example of the touch detection scanning.

FIG. 33 is a diagram illustrating an operation example of the touch detection scanning, where (A) representing a waveform of the Vcom-selection signal VCOMSEL, (B) representing waveforms of some of the scan signals St, (C) representing waveforms of some of the drive signals Vcom, (D) representing a waveform of the touch detection signal Vdet, and (E) representing a waveform of the correction output value Vref. For convenience of explanation, FIG. 33 omits transient behavior (such as a rise time tr and a fall time tf) of the signals while potentials thereof change.

As illustrated in FIG. 33, the drive electrode driver 16 performs the touch detection scanning by sequentially supplying the direct-current drive signal VcomH to the corresponding drive electrode blocks B based on the scan signals St ((B) in FIG. 33) generated by the touch detection scanning unit 52 ((C) in FIG. 33). In that operation, the drive electrode driver 16 supplies the pulse signals generated from the direct-current drive signals VcomDC and VcomH to the drive electrode block B that is the target of the touch detection operation over a plurality of predetermined horizontal scanning periods ((C) in FIG. 33). The touch detection unit 40 samples the touch detection signal Vdet based on a pulse signal in each of the horizontal scanning periods, and, after the sampling in the last horizontal scanning period of the predetermined horizontal scanning periods ends, the signal processing unit 44 detects, based on a plurality of results of the sampling, for example, whether an area corresponding to the drive electrode block B has been touched. Performing the touch detection based on a plurality of sampling results in this manner allows statistical analysis of the sampling results, and can thereby suppress a decrease in the S/N ratio caused by variation in the sampling results, thus improving the accuracy of the touch detection.

In the display device with the touch detection function 1, the drive-signal generation unit 15 supplies the direct-current drive signals VcomDC and VcomH to the drive electrode driver 16 via the wiring LDC and LH, and the drive electrode driver 16 generates the drive signal Vcom based on the direct-current drive signals VcomDC and VcomH. Hence, for example, when the drive electrode driver 16 supplies the direct-current drive signal VcomH to a drive electrode block B that is the target of the touch detection operation, the drive-signal generation unit 15 needs to drive only the drive electrode block B because the potential VH has already been supplied to the wiring LH. As a result, the display device with the touch detection function 1 can have shorter transition times (such as the rise time tr) of the drive signal Vcom, as will be described below in comparison with some comparative examples.

Such shorter transition times of the drive signal Vcom allow the display device with the touch detection function 1 to have, for example, a higher definition and/or a larger size. Specifically, for example, increasing the definition of the display device with the touch detection function 1 increases the number of horizontal lines, resulting in an increase in the proportion of the period of writing the pixel signals in one frame period, so that the touch detection period Pt having a long time span is difficult to be ensured. As described above, the transition times of the drive signal Vcom (pulse signal) can be shorter in the display device with the touch detection function 1, so that the touch detection period Pt can be shorter, allowing the display device with the touch detection function 1 to have, for example, a higher definition and/or a larger size. The following describes effects of the present embodiment in comparison with the comparative examples.

Comparative Example 1

A display device with a touch detection function 1Q according to Comparative Example 1 will first be described. Unlike in the case of the present embodiment (FIG. 19), the drive electrode driver 16 is mounted together with, for example, the control unit 11, as a COG on the display device with the touch detection function 1Q.

Figure 34:
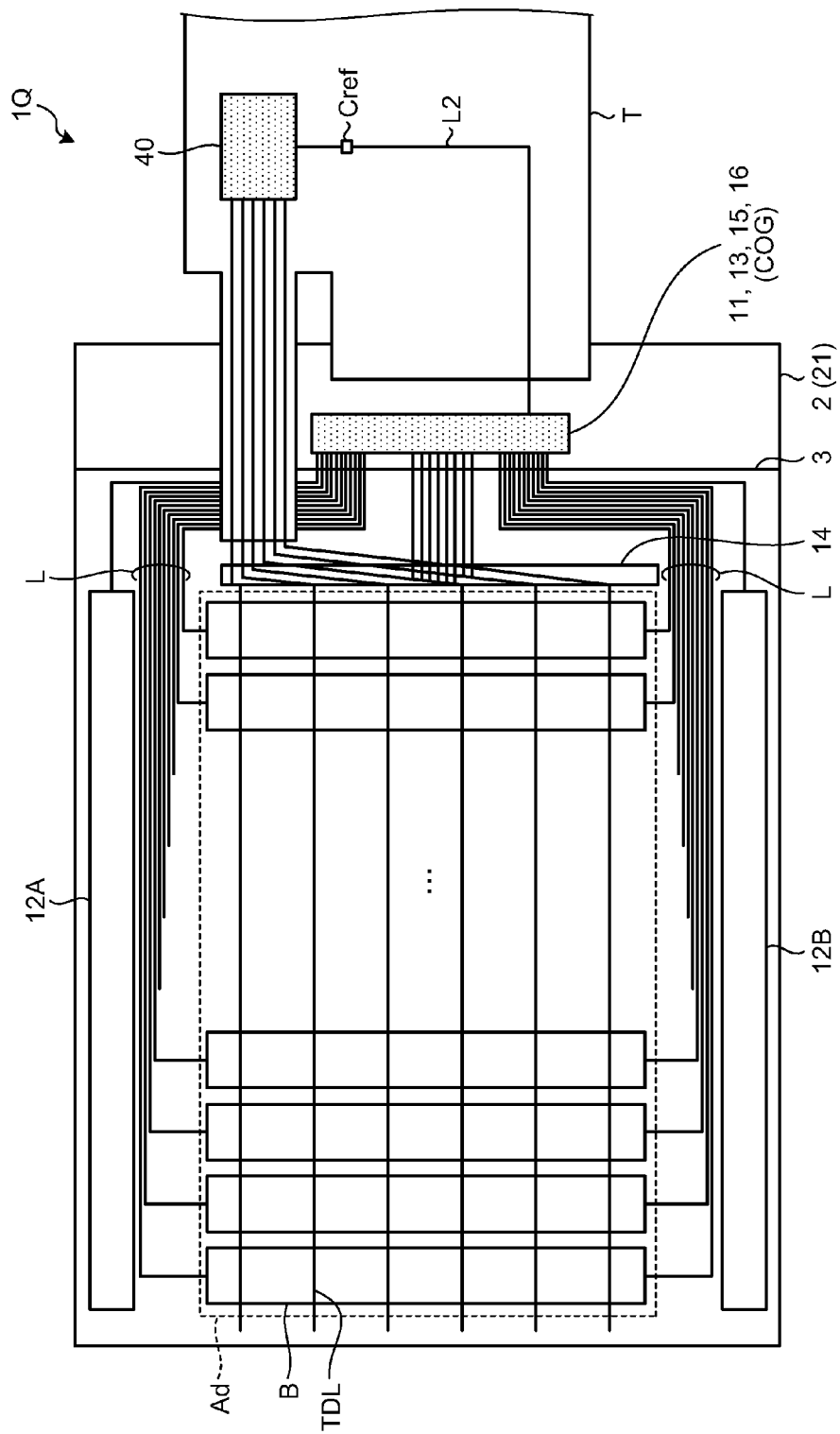
FIG. 34 is a diagram schematically illustrating a mounting example of a display device with a touch detection function according to Comparative Example 1.

FIG. 34 is a diagram schematically illustrating a mounting example of the display device with the touch detection function according to Comparative Example 1. As illustrated in FIG. 34, the drive electrode driver 16 is mounted as the COG together with the control unit 11, the source driver 13, and the drive-signal generation unit 15, and is coupled with each of the drive electrode blocks B provided side by side via long wiring L. The drive electrode driver 16 supplies the drive signal Vcom, such as that illustrated as (C) in FIG. 33, to each of the drive electrode blocks B via the wiring L. The drive electrode driver 16 is coupled with the capacitor Cref disposed near the touch detection unit 40 via wiring L2, and supplies the drive signal Vcom, such as that illustrated as (C) in FIG. 33, to the capacitor Cref.

In the display device with the touch detection function 1Q according to Comparative Example 1, the drive electrode driver 16 mounted as the COG directly drives each of the drive electrode blocks B via the long wiring L. As illustrated in FIG. 34, the wiring L needs the same number of wires as the number of the drive electrode blocks B, so that each wire of the wiring L has a small width, resulting in high wiring resistance. As a result, when the drive electrode driver 16 supplies the drive signal Vcom (pulse signal) as illustrated as (C) in FIG. 33 to each of the drive electrode blocks B, the rise time tr and the fall time tf increase because the wiring L has a large time constant, so that the waveform of the pulse signal may be deformed. In this case, the deformed pulse signal is transmitted to the touch detection electrode TDL, and is output as the touch detection signal Vdet, so that the accuracy of the touch detection may drop.

In the display device with the touch detection function 1 according to the present embodiment, as illustrated in FIG. 19, the drive electrode driver 16 (16A and 16B) is provided using TFT elements on the TFT substrate 21 near the display area Ad. The drive-signal generation unit 15 supplies, to the drive electrode driver 16, the direct-current drive signal VcomDC via the thick wiring LDC, and the direct-current drive signal VcomH via the thick wiring LH. Based on the direct-current drive signals VcomDC and VcomH thus supplied, the drive electrode driver 16 generates the drive signal Vcom (pulse signal) as illustrated as (C) in FIG. 33 and supplies the generated signal Vcom to the drive electrode block B. In other words, in the display device with the touch detection function 1, the pieces of wiring LDC and LH are formed thick, and transmit direct-current signals, and this configuration can reduce the possibility of the pulse waveform of the drive signal Vcom being deformed due to time constants of the wiring LDC and LH.

Comparative Example 2

A display device with a touch detection function 1R according to Comparative Example 2 will be described. Unlike in the case of the present embodiment (FIG. 19), a drive-signal generation unit generates an alternating-current drive signal in the display device with the touch detection function 1R.

Figure 35:
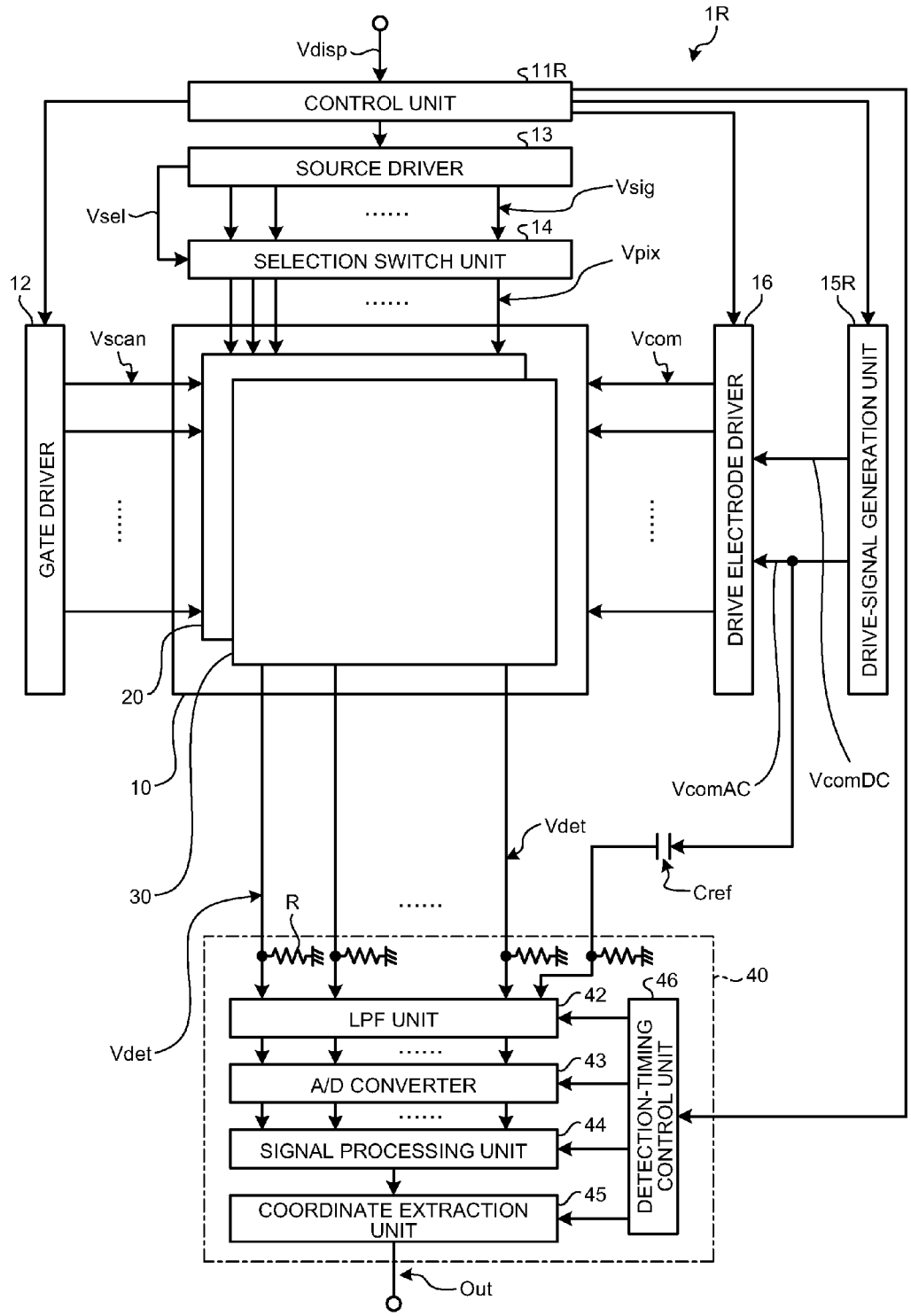
FIG. 35 is a diagram illustrating a configuration example of a display device with a touch detection function according to Comparative Example 2.

FIG. 35 is a diagram illustrating a configuration example of the display device with the touch detection function according to Comparative Example 2. The display device with the touch detection function 1R includes a drive-signal generation unit 15R and a control unit 11R. The drive-signal generation unit 15R generates the direct-current drive signal VcomDC and an alternating-current drive signal VcomAC, and supplies them to the drive electrode driver 16. The drive-signal generation unit 15R also supplies the alternating-current drive signal VcomAC to the capacitor Cref. Based on the direct-current drive signal VcomDC and the alternating-current drive signal VcomAC, the drive electrode driver 16 supplies the drive signals Vcom to the drive electrode blocks B in the same manner as in the case of the embodiment described above. The control unit 11R has, in addition to the function of the control unit 11, a function of supplying a control signal for instructing, for example, transition timing of the alternating-current drive signal VcomAC to the drive-signal generation unit 15R.

Figure 36:
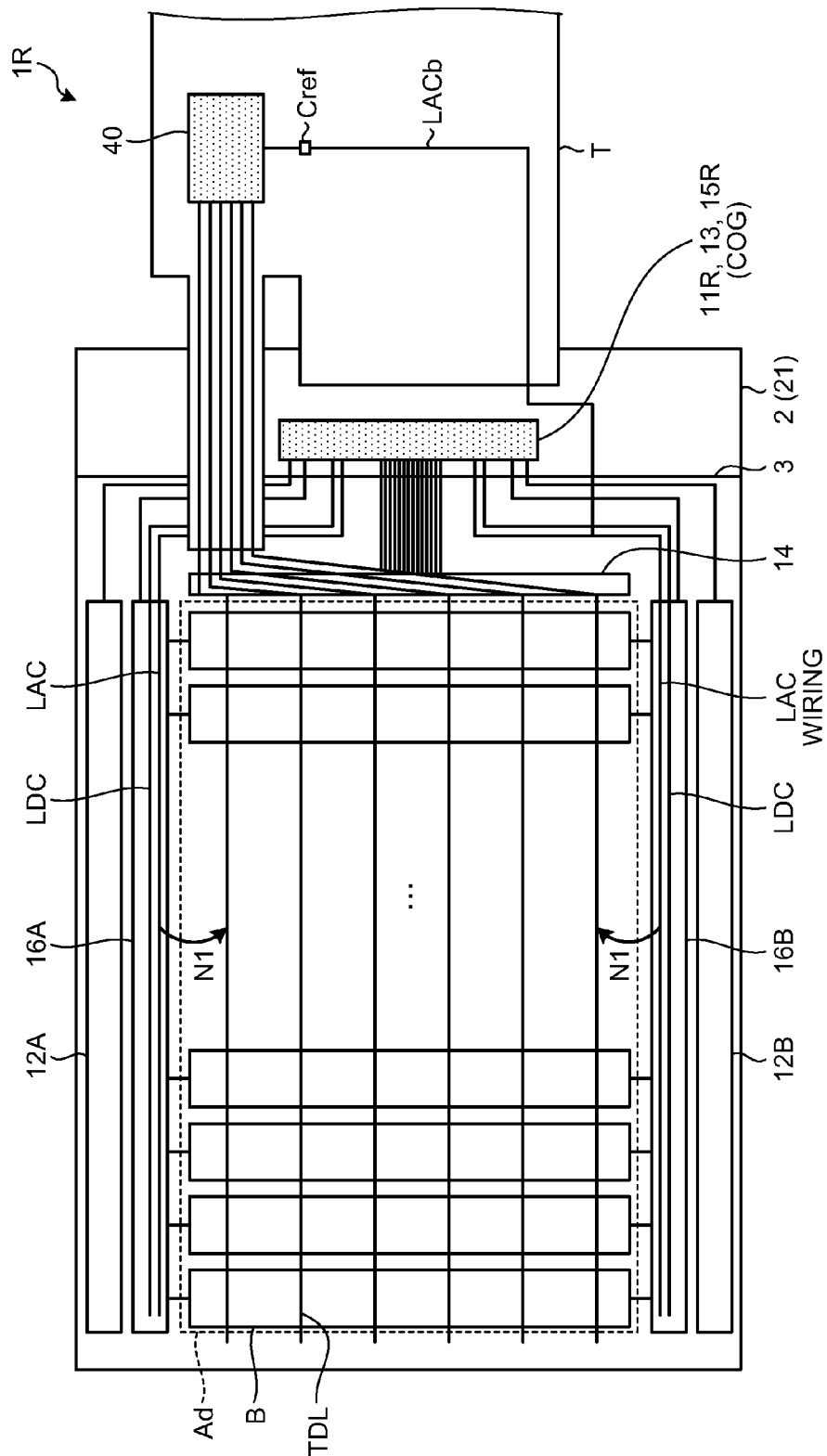
FIG. 36 is a diagram schematically illustrating a mounting example of the display device with the touch detection function according to Comparative Example 2.

FIG. 36 is a diagram schematically illustrating a mounting example of the display device with the touch detection function according to Comparative Example 2. As illustrated in FIG. 36, the drive-signal generation unit 15R is mounted together with the control unit 11R and the source driver 13 as a COG on the pixel substrate 2. The drive electrode driver 16 is supplied from the drive-signal generation unit 15R with the direct-current drive signal VcomDC via the wiring LDC having thick patterns, and the alternating-current drive signal VcomAC via wiring LAC having thick patterns. That is, the time constant of the wiring of the display device with the touch detection function 1R is reduced by forming the wiring LAC thick. Wiring LACb branching from the wiring LAC is coupled with the capacitor Cref disposed near the touch detection unit 40, and the alternating-current drive signal VcomAC is supplied to the capacitor Cref via the wiring LACb.

Figure 37:
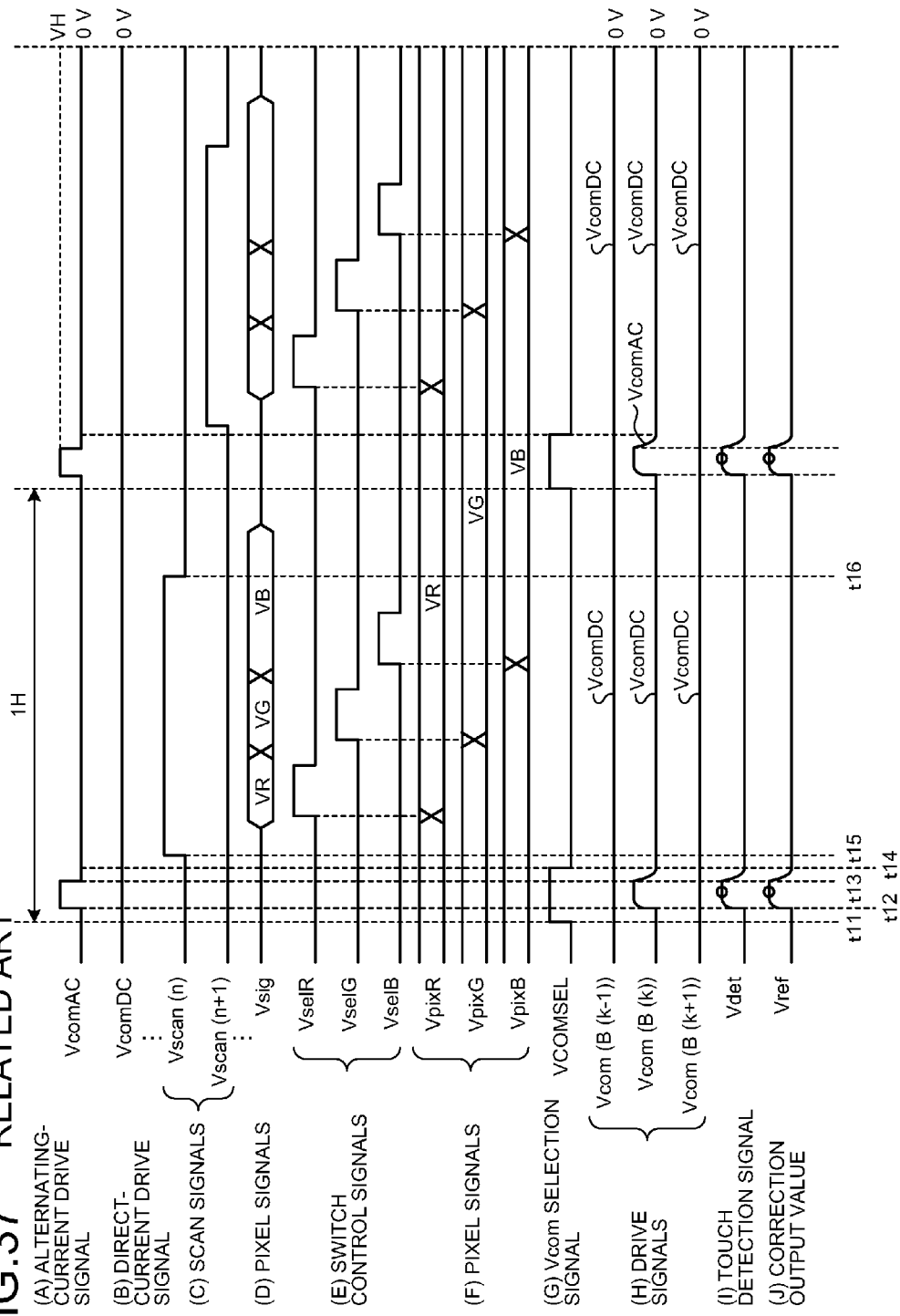
FIG. 37 is a diagram illustrating a timing waveform example of the display device with the touch detection function according to Comparative Example 2.

FIG. 37 is a diagram illustrating a timing waveform example of the display device with the touch detection function according to Comparative Example 2, where (A) representing a waveform of the alternating-current drive signal VcomAC, (B) representing a waveform of the direct-current drive signal VcomDC, (C) representing waveforms of some of the scan signals Vscan, (D) representing waveforms of the pixel signals Vsig, (E) representing waveforms of the switch control signals Vsel, (F) representing waveforms of the pixel signals Vpix, (G) representing a waveform of the Vcom-selection signal VCOMSEL, (H) representing waveforms of some of the drive signals Vcom, (I) representing a waveform of the touch detection signal Vdet, and (J) representing a waveform of the correction output value Vref.

In the drive electrode driver 16 according to Comparative Example 2, as illustrated in FIG. 37, the scan control unit 51 generates the Vcom-selection signal VCOMSEL that has a larger pulse width (time t11 to t14) than the pulse width (time t12 to t13) of the alternating-current drive signal VcomAC. While the Vcom-selection signal VCOMSEL is at the high level, each of the drivers 53 supplies the pulse waveform portion of the alternating-current drive signal VcomAC to the drive electrode block B that is the target of the touch detection drive ((H) in FIG. 37).

In the display device with the touch detection function 1R according to Comparative Example 2, as illustrated in FIG. 36, the drive-signal generation unit 15R mounted as the COG supplies the alternating-current drive signal VcomAC to the drive electrode driver 16 via the long wiring LAC. Unlike in the case of the display device with the touch detection function 1Q according to Comparative Example 1 (FIG. 34), the wiring LAC can have low wiring resistance because of being formed thick. However, the wiring LAC transmits the alternating-current drive signal VcomAC, so that the wiring capacity of the wiring LAC may cause increases in the transition times of the pulse signal.

Figure 38:
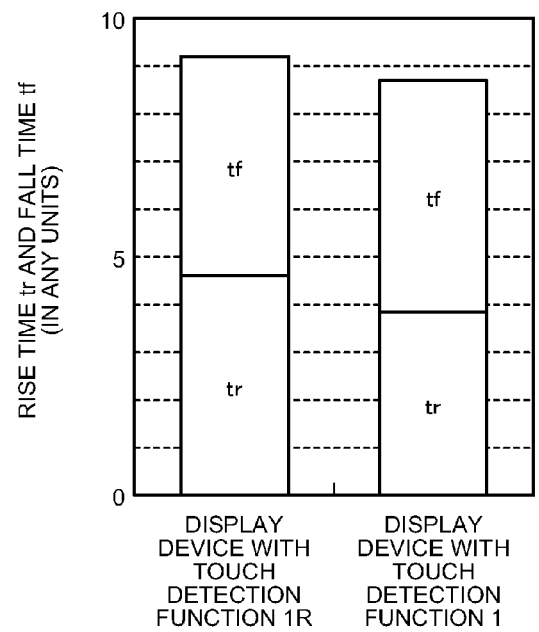
FIG. 38 is a diagram illustrating characteristic examples of rise times and fall times of drive signals in the display device with the touch detection function according to Comparative Example 2 and the display device with the touch detection function according to the first embodiment.

FIG. 38 is a diagram illustrating characteristic examples of rise times and fall times of drive signals in the display device with the touch detection function according to Comparative Example 2 and the display device with the touch detection function according to the first embodiment.

As illustrated in FIG. 38, in the display device with the touch detection function 1R according to Comparative Example 2, when the drive-signal generation unit 15R supplies the alternating-current drive signal VcomAC to the drive electrode block B that is the target of the touch detection operation, the drive-signal generation unit 15R needs to drive the wiring LAC in addition to the drive electrode block B, so that the rise time tr and the fall time tf may increase.

In the display device with the touch detection function 1, the drive-signal generation unit 15 supplies the direct-current drive signals VcomDC and VcomH to the drive electrode driver 16 via the wiring LDC and LH, and the drive electrode driver 16 generates the pulse signal based on these signals. Hence, for example, when the direct-current drive signal VcomH is supplied to the drive electrode block B that is the target of the touch detection operation, the drive-signal generation unit 15 needs to drive only the drive electrode block B because the potential VH has already been supplied to the wiring LH. As a result, the rise time tr can be shorter in the display device with the touch detection function 1.

In the display device with the touch detection function 1R, the signal through the wiring LAC formed thick is an alternating-current signal (the alternating-current drive signal VcomAC), so that the alternating-current component thereof may be transmitted as noise N1 to the outermost touch detection electrodes TDL of the touch detection electrodes TDL provided side by side in the display area Ad via, for example, parasitic capacitance (FIG. 36). The parasitic capacitance is increased by forming the wiring LAC thicker to reduce the wiring resistance. If the noise is transmitted to the touch detection electrodes TDL in this manner, the touch is detected based on the touch detection signals Vdet with the noise superimposed thereon, so that the accuracy of the touch detection may decrease.

In the display device with the touch detection function 1 according to the present embodiment, as illustrated in FIG. 19, the signals in the two pieces of wiring LDC and LH formed thick are both direct-current signals (the direct-current drive signals VcomDC and VcomH). This configuration can reduce the possibility of the signals through the wiring LDC and LH being transmitted to the touch detection electrodes TDL as noise via, for example, the parasitic capacitance. As a result, the display device with the touch detection function 1 can reduce the possibility of the decrease in the accuracy of the touch detection.

As described above, in the present embodiment, the drive-signal generation unit generates the two direct-current drive signals, and the drive electrode driver disposed near the drive electrode blocks generates the drive signals based on the two direct-current drive signals, so that the transition times of the drive signals can be shorter, and each of the drive electrode blocks can be driven in a shorter time.

In the present embodiment, the transition times of the drive signals are shorter, so that the pulse waveforms of the drive signals can be less likely to be deformed, whereby the decrease in the accuracy of the touch detection can be suppressed.

In the present embodiment, the drive-signal generation unit supplies the direct-current drive signals to the drive electrode driver via the wiring, so that the signals through the wiring can be less likely to be transmitted as noise, whereby the increase in the accuracy of the touch detection can be suppressed.

Modification 1-1

While the embodiment described above performs the touch detection each time a horizontal line is displayed, the touch detection is not limited to be performed in this manner, but may be performed each time a plurality of horizontal lines are displayed. Specifically, for example, the display surface may be sectioned into a plurality of areas (partial display areas) in the same manner as the touch detection surface, and the touch detection operation may be performed each time the display operation is performed in each of the partial display areas. The following describes in detail an example in which the display surface is sectioned into 20 partial display areas A1 to A20.

Figure 39:
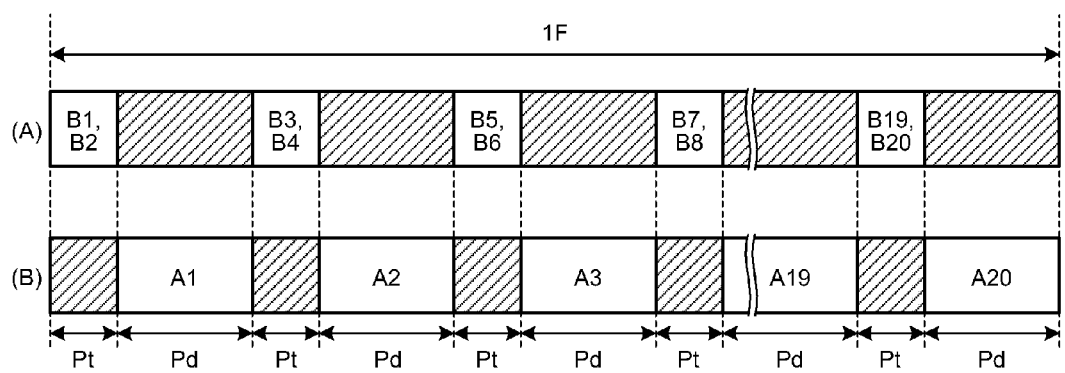
FIG. 39 is a diagram schematically illustrating operations of a display device with a touch detection function according to Modification 1-1.

FIG. 39 is a diagram schematically illustrating the operations of a display device with a touch detection function according to Modification 1-1, where (A) representing the touch detection operation, and (B) representing the display operation. In this example, 20 touch detection periods Pt and 20 display periods Pd are alternately arranged in one frame period (1F).

First, the touch detection operation for the drive electrode blocks B1 and B2 is performed in the first touch detection period Pt, and the display operation (writing operation) for the horizontal lines in the partial display area A1 is performed in the subsequent display period Pd. Then, the touch detection operation for the drive electrode blocks B3 and B4 is performed in the next touch detection period Pt, and the display operation (writing operation) for the horizontal lines in the partial display area A2 is performed in the subsequent display period Pd. Thereafter, the touch detection operation and the display operation are alternately performed in the same manner as the above.

Figure 40:
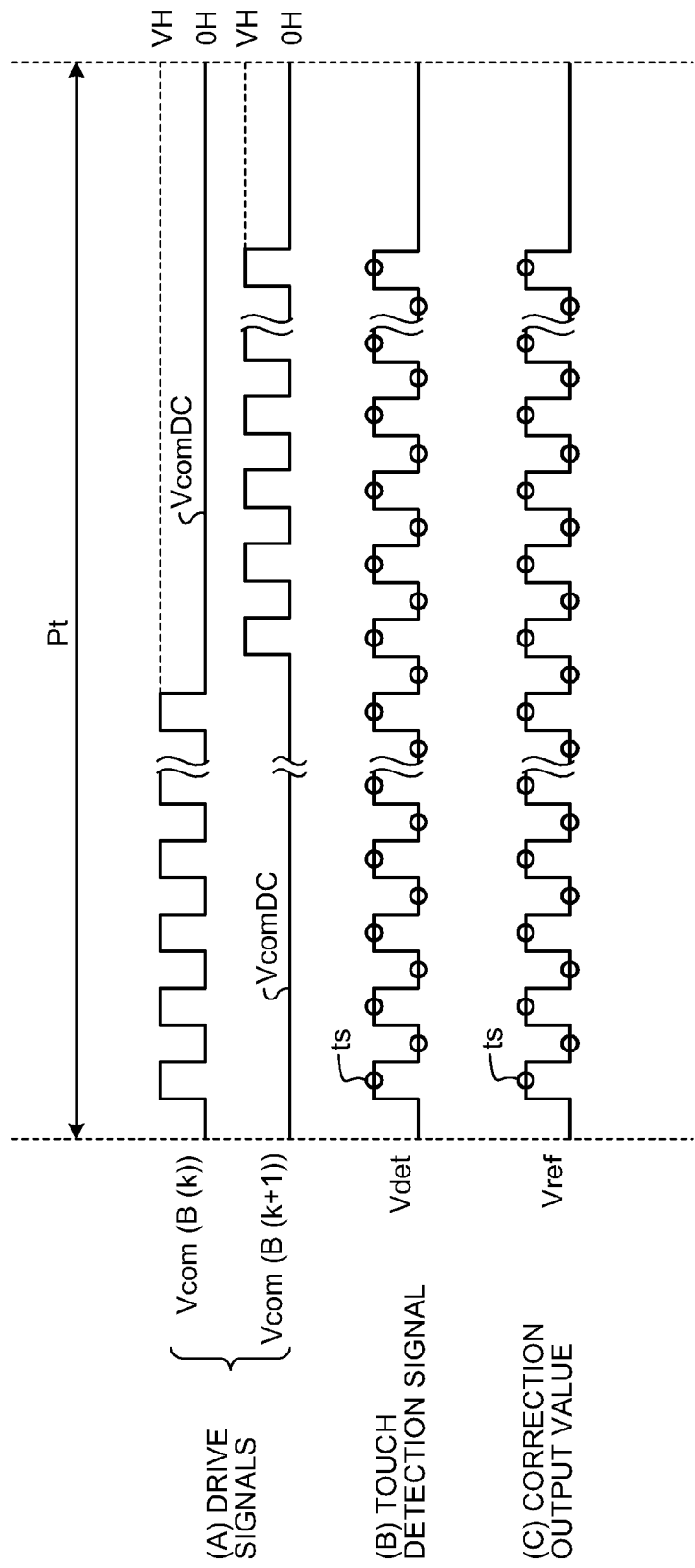
FIG. 40 is a diagram illustrating a touch detection operation of the display device with the touch detection function according to Modification 1-1 in a touch detection period.

FIG. 40 is a diagram illustrating the touch detection operation of the display device with the touch detection function according to Modification 1-1 in the touch detection period, the drive electrode driver 16 alternately supplies the direct-current drive signals VcomDC and VcomH a predetermined number of times to the drive electrode block B(k) during the touch detection period Pt ((A) in FIG. 40). The drive signals Vcom thus supplied are transmitted to the touch detection electrode TDL via the electrostatic capacitance, and the touch detection signal Vdet changes ((B) in FIG. 40). Drive signals at the same phase as and in synchronization with the drive signals Vcom are supplied to the capacitor Cref, and the correction output value Vref changes ((C) in FIG. 40). The A/D converter 43 of the touch detection unit 40 A/D-converts the output signals of the analog LPF unit 42 that receives the touch detection signal Vdet and the correction output value Vref at the sampling times is synchronized with these pulse signals ((B) and (C) in FIG. 40). Based on these results of the A/D conversion, the signal processing unit 44 performs the touch detection in the drive electrode block B(k).

Thereafter, the drive electrode driver 16 alternately supplies the direct-current drive signals VcomDC and VcomH the predetermined number of times to the drive electrode block B(k+1) in the same manner as the above ((A) in FIG. 40), and the touch detection unit 40 performs the touch detection in the drive electrode block B(k+1) based on the touch detection signal Vdet and the correction output value Vref. In the Modification 1-1, each display period includes a plurality of writing periods Pw. One writing period Pw is present in one horizontal scanning period (1H). Therefore, one touch detection period Pd is provided every plurality of writing periods Pw.

In the example illustrated in FIG. 40, the drive electrode driver 16 supplies the direct-current drive signal VcomDC to the drive electrode blocks B(k) and B(k+1) during the last predetermined period of the touch detection period Pt. This supplying can secure time until the drive signals Vcom converge to the voltage level (0 V) of the direct-current drive signal VcomDC even when a phenomenon, such as that represented by the waveform portions W1 illustrated in FIG. 32, occurs.

Figure 41:
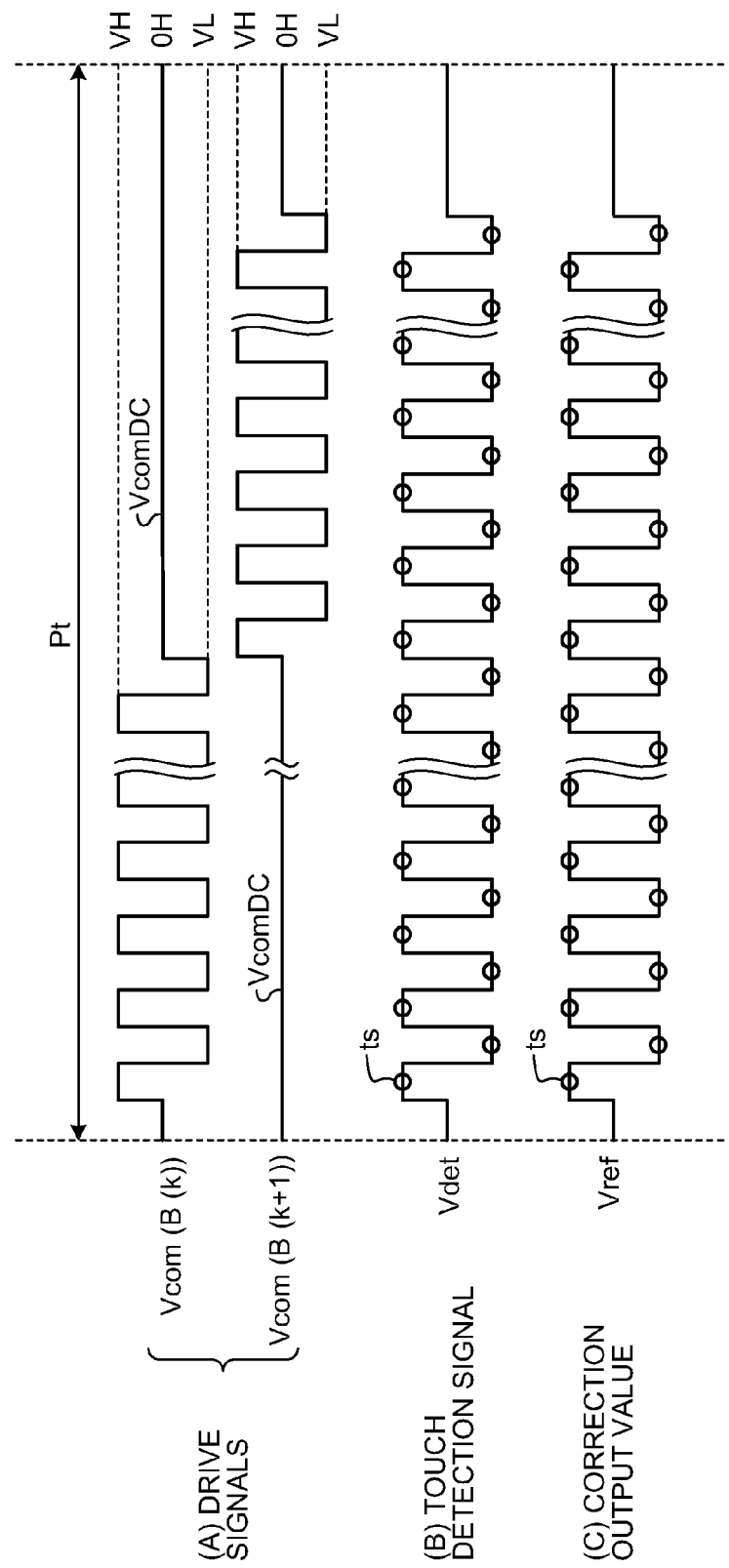
FIG. 41 is a diagram illustrating another touch detection operation of the display device with the touch detection function according to Modification 1-1 in the touch detection period.

While, in the embodiment described above, the drive-signal generation unit 15 generates the two direct-current drive signals VcomDC and VcomH, and the drive electrode driver 16 selectively supplies them to the drive electrode block B, the embodiment is not limited to this configuration. Instead of this configuration, for example, the drive-signal generation unit may generate three direct-current drive signals VcomDC, VcomH, and VcomL; the drive electrode driver may selectively supply these signals to the drive electrode block B; and the switching circuit may selectively supply these signals to the capacitor Cref. The direct-current drive signal VcomL is a direct-current signal having a potential VL lower than 0 V. In this case, a display panel according to the present modification can perform the touch detection operation, for example, as illustrated in FIG. 41. FIG. 41 is a diagram illustrating the touch detection operation of the display device with the touch detection function according to Modification 1-1 in the touch detection period.

Modification 1-2

While, in the embodiment described above, the touch detection scanning unit 52 of the drive electrode driver 16 is configured by using the shift register, the embodiment is not limited to have this configuration, but may instead have a configuration using a decoder. The following describes the configuration in detail.

Figure 42:
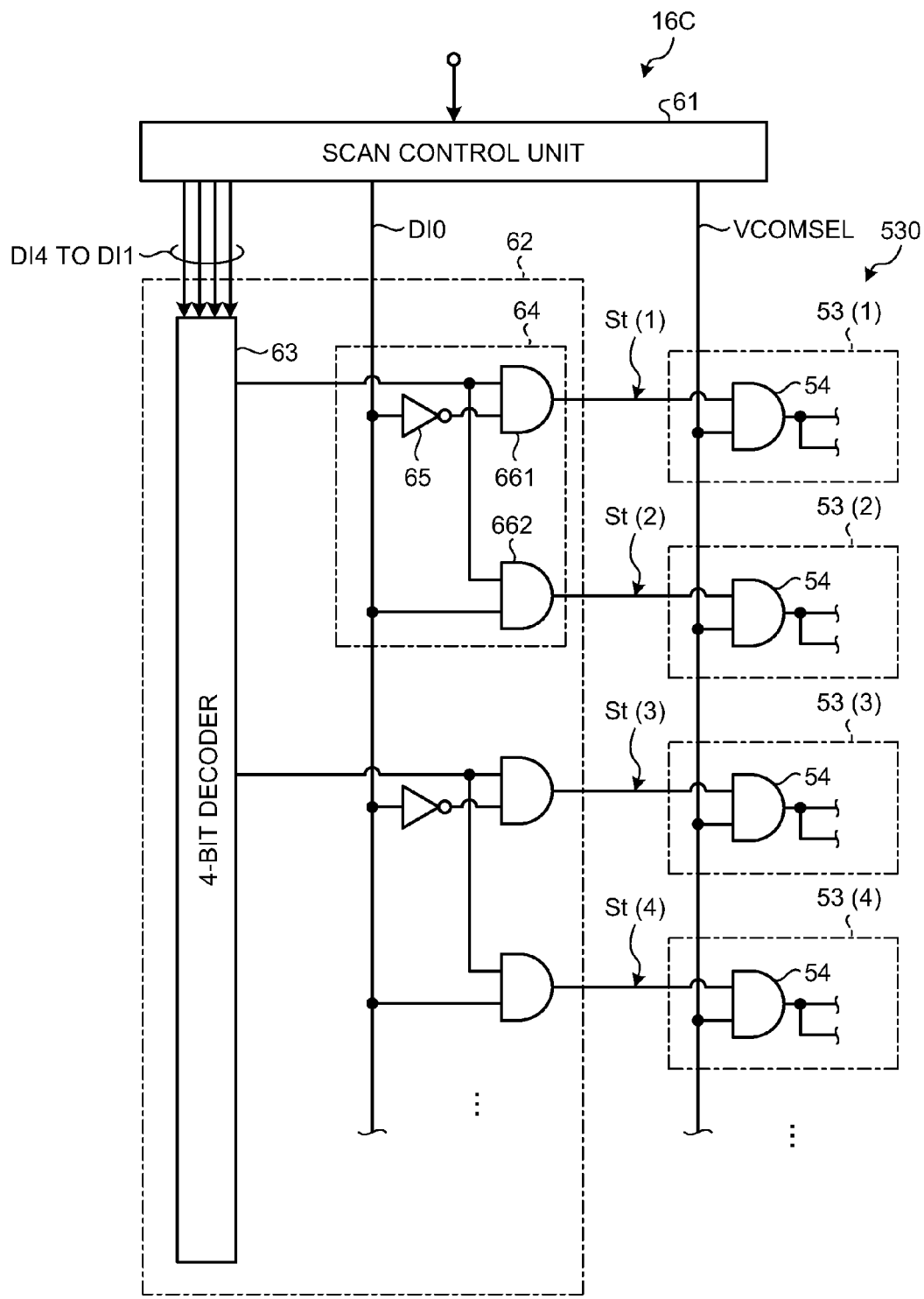
FIG. 42 is a diagram illustrating a configuration example of a drive electrode driver according to Modification 1-2.

FIG. 42 is a diagram illustrating a configuration example of a drive electrode driver according to Modification 1-2. FIG. 43 is a diagram illustrating a truth table of a decoder of FIG. 42. A drive electrode driver 16C includes a scan control unit 61 and a decoder 62. The decoder 62 is a 5-bit decoder, and, as illustrated using the truth table in FIG. 43, can select one of the 20 drive electrode blocks B1 to B20 based on a 5-bit input code DI (DI4 [most significant bit (MSB)] to DI0 [least significant bit (LSB)]). Based on the control signal supplied from the control unit 11, the scan control unit 61 supplies the 5-bit code DI to the decoder 62, and supplies the Vcom-selection signal VCOMSEL to the drive unit 530.

The decoder 62 includes a 4-bit decoder 63 and a plurality of logic circuits 64. The 4-bit decoder 63 decodes four higher-order bits (DI4 to DI1) of the input code DI to select one logic circuit from the logic circuits 64, and outputs thereto a high-level control signal. Each of the logic circuits 64 includes an inverter 65 and AND circuits 661 and 662. The inverter 65 inverts and outputs the least significant bit (DI0) of the input code DI supplied from the scan control unit 61. The AND circuit 661 produces a logical product of the control signal from the 4-bit decoder 63 and the output of the inverter 65, and outputs the result to a driver 53 associated with the AND circuit 661. The AND circuit 662 produces a logical product of the control signal from the 4-bit decoder 63 and the least significant bit (DI0) of the input code DI, and outputs the result to a driver 53 associated with the AND circuit 662.

Configuring the drive electrode driver 16C using the decoder 62 in this manner allows sequential drive of the drive electrode blocks B in any order during the touch detection scanning. Specifically, for example, the touch detection scanning can be performed by driving the drive electrode blocks B in a skipping manner, such as in the order of drive electrode blocks B1, B3, B5, . . . , and B19.

Figure 44:
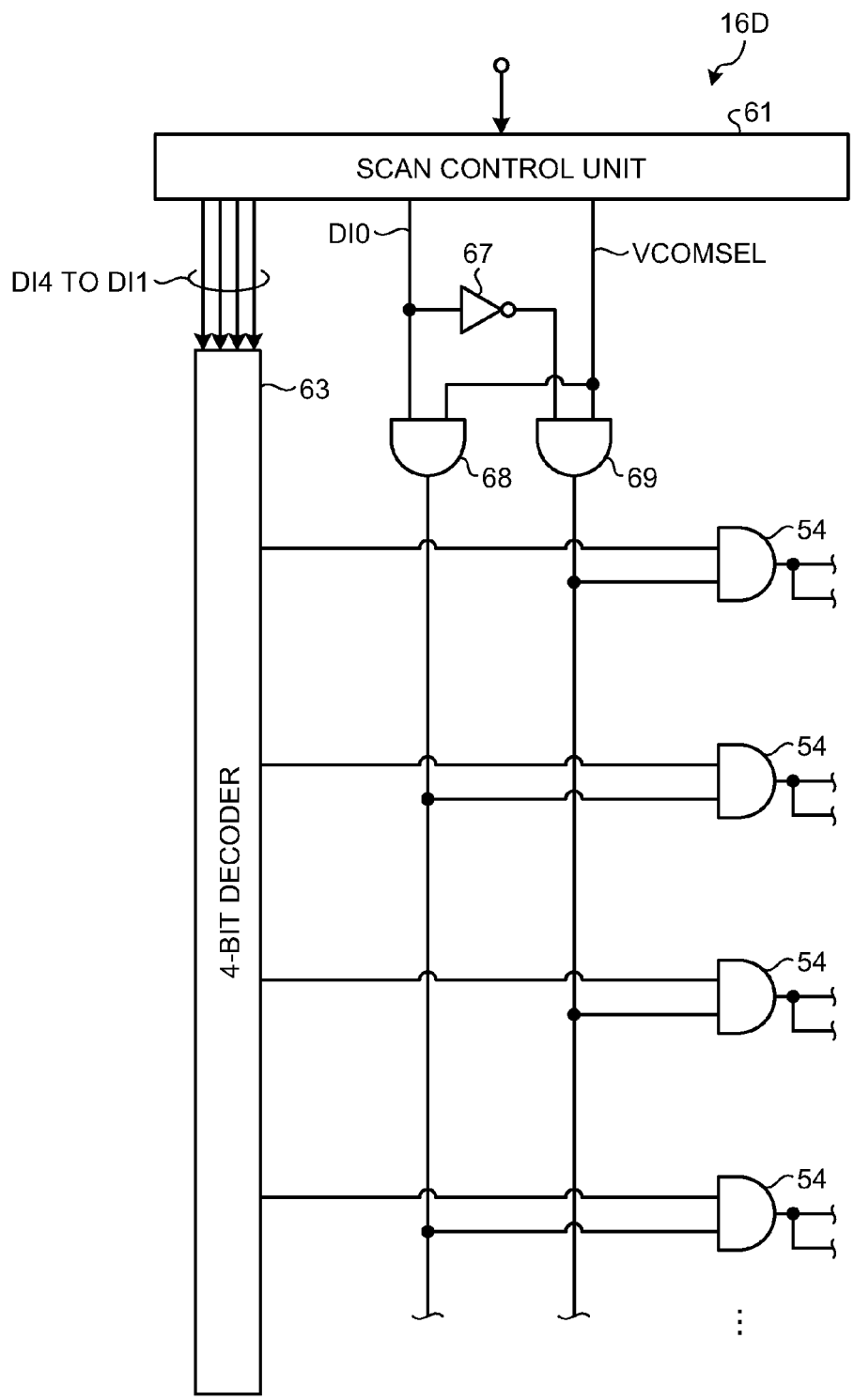
FIG. 44 is a diagram illustrating another configuration example of the drive electrode driver according to Modification 1-2.

The drive electrode driver according to the present modification is not limited to have the configuration of FIG. 42, but may instead have a configuration, such as that of FIG. 44. FIG. 44 is a diagram illustrating another configuration example of the drive electrode driver according to Modification 1-2. Specifically, the drive electrode driver may be reconfigured to be simpler by combining the last-stage circuits 64 of the decoder 62 illustrated in FIG. 42 with the AND circuits 54 of the drivers 53. This example can eliminate all the last-stage circuits 64 by providing an inverter 67 and AND circuits 68 and 69, and thus can have a smaller circuit scale.

While, in the description above, the drive electrode driver is configured to select one of the 20 drive electrode blocks B1 to B20 based on the input code DI, the drive electrode driver is not limited to this configuration, but may also have a function of simultaneously selecting more than one of the drive electrode blocks B. The following describes an example of this case in detail.

Figure 45:
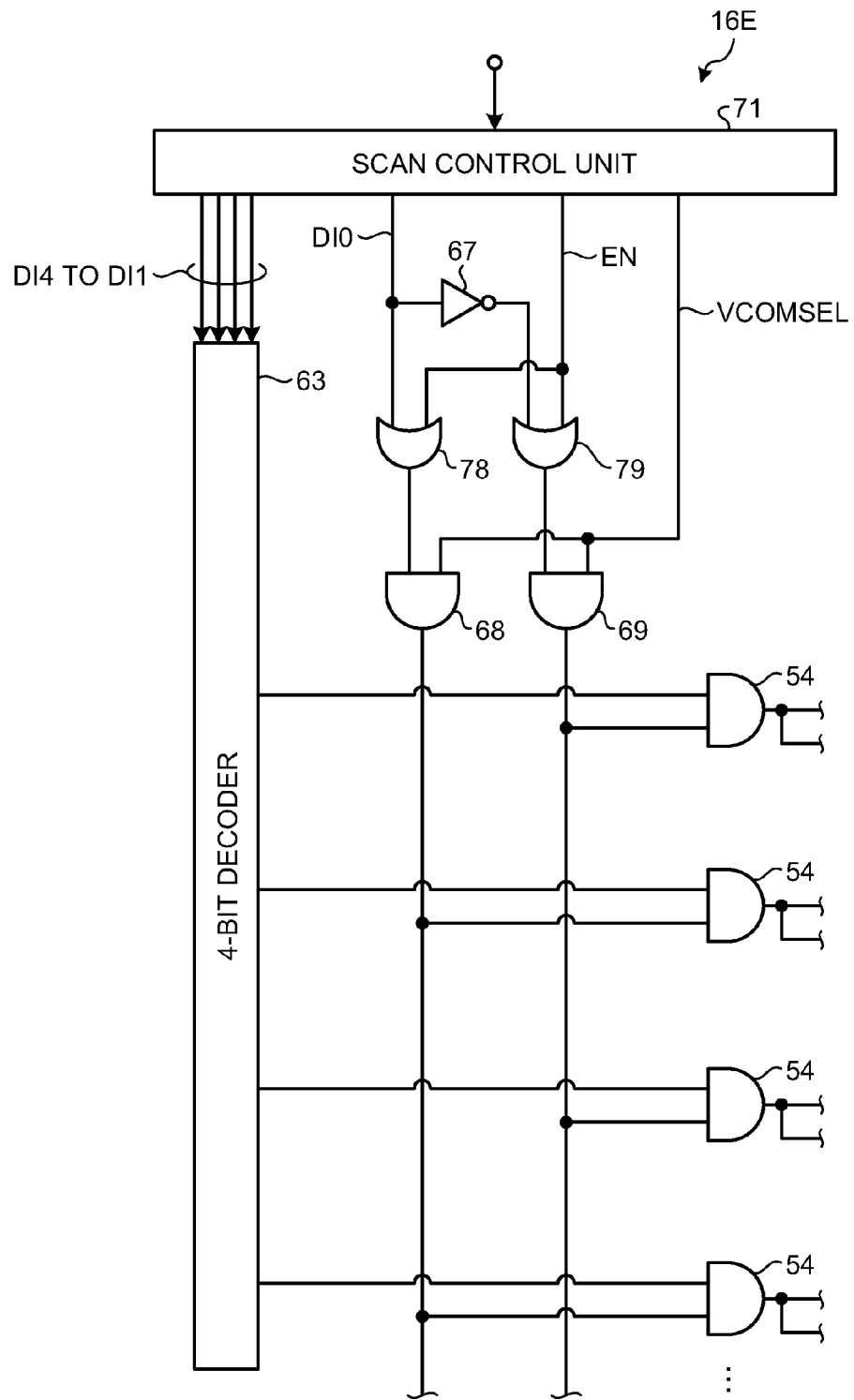
FIG. 45 is a diagram illustrating still another configuration example of the drive electrode driver according to Modification 1-2.

FIG. 45 is a diagram illustrating still another configuration example of the drive electrode driver according to Modification 1-2. FIG. 46 is a diagram illustrating a truth table of a decoder of FIG. 45. A drive electrode driver 16E has two operation modes including an operation mode M1 of selecting one of the 20 drive electrode blocks B1 to B20, and an operation mode M2 of simultaneously selecting two of them.

The drive electrode driver 16E includes a scan control unit 71 and OR circuits 78 and 79. The scan control unit 71 has a function of outputting a mode-selection signal EN, in addition to the function provided by the scan control unit 61. If the mode-selection signal EN is at a low level, the drive electrode driver 16E operates in the operation mode M1. Specifically, in this case, the OR circuits 78 and 79 each supplied, at one end thereof, with the low-level signal have no effect in terms of a logical operation, so that the configuration of the drive electrode driver 16E is the same as that of the drive electrode driver (referenced by 16D) illustrated n FIG. 44. If the mode-selection signal EN is at a high level, the outputs of the OR circuits 78 and 79 are forced to be at a high level, so that the setting of the bit DI0 that is the LSB of the input code DI is ignored. As a result, as illustrated in FIG. 46 using the truth table, the drive electrode blocks B can be selected two by two by using the four higher-order bits (DI4 to DI1) of the 5-bit input code DI.

2. Second Embodiment

The following describes a display device with a touch detection function 7 according to a second embodiment. In the present embodiment, electrode blocks B that are not the target of the touch detection operation during the touch detection period Pt are made to be in a floating state. Specifically, the display device with the touch detection function 7 is configured by using a drive electrode driver 18 that includes drivers 73 capable of making the drive electrode blocks B be in a floating state. The other configurations are the same as those of the first embodiment described above (FIG. 1). The same numerals will be given to component parts substantially identical to those of the display device with the touch detection function 1 according to the first embodiment, and detailed description thereof will be omitted as appropriate.

Figure 47:
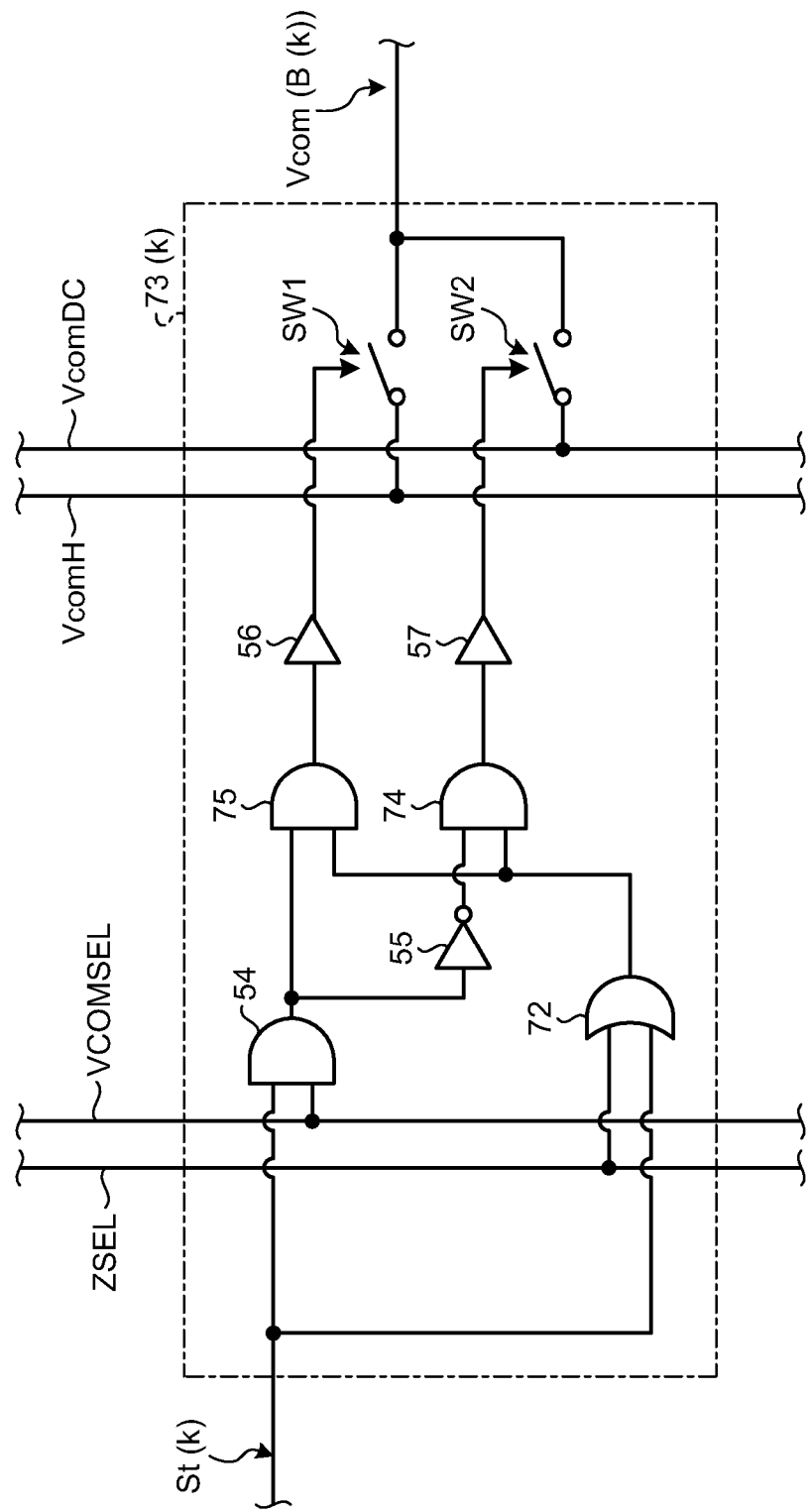
FIG. 47 is a diagram illustrating a configuration example of a driver according to a second embodiment.

FIG. 47 is a diagram illustrating a configuration example of one of the drivers according to the second embodiment. While the description will be given of a k-th driver 73($k$), the other drivers have the same configuration.

The driver 73 includes an OR circuit 72 and AND circuits 74 and 75. The OR circuit 72 produces and outputs a logical sum of the scan signal St supplied from the touch detection scanning unit 52 and an impedance control signal ZSEL. The impedance control signal ZSEL is a logical signal that is at a low level only during the touch detection period Pt, and at a high level during the other period, as will be described later. The impedance control signal ZSEL may be generated, for example, by the scan control unit 51, or by another circuit. The AND circuit 75 produces a logical product of the outputs of the AND circuit 54 and the OR circuit 72, and supplies the result to the buffer 56. The AND circuit 74 produces a logical product of the outputs of the inverter 55 and the OR circuit 72, and supplies the result to the buffer 57.

With this configuration, if both the scan signal St and the impedance control signal ZSEL are at the respective low levels, the driver 73 makes the drive electrode blocks B coupled with the driver 73 be in a floating state by turning off both the switches SW1 and SW2. If at least one of the scan signal St and the impedance control signal ZSEL is at the high level, the driver 73 performs the same operation as that of the driver 53 according to the first embodiment described above.

Figure 48:
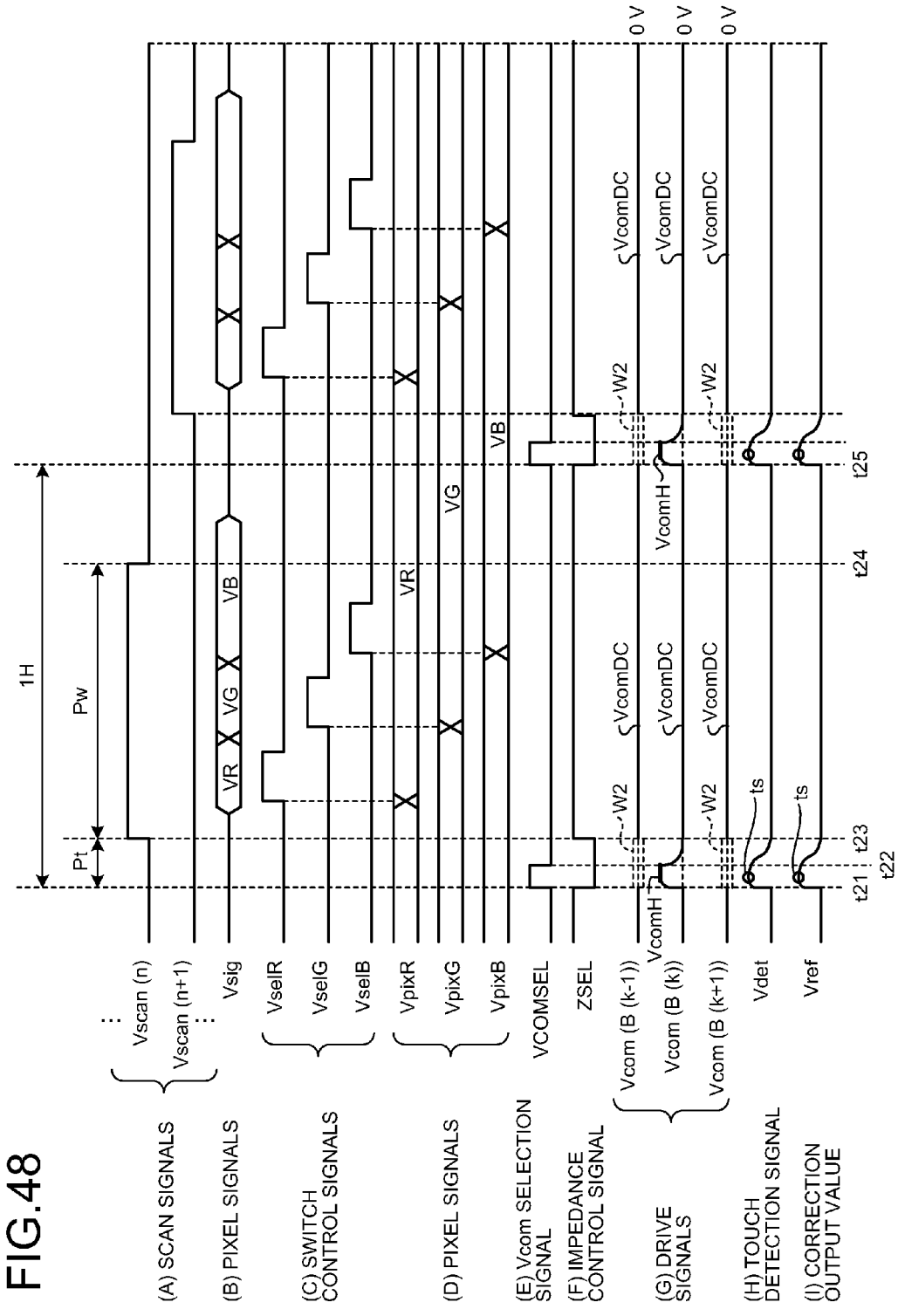
FIG. 48 is a diagram illustrating a timing waveform example of a display device with a touch detection function according to the second embodiment.

FIG. 48 is a diagram illustrating a timing waveform example of the display device with the touch detection function according to the second embodiment, where (A) representing waveforms of some of the scan signals Vscan, (B) representing waveforms of the pixel signals Vsig, (C) representing waveforms of the switch control signals Vsel, (D) representing waveforms of the pixel signals Vpix, (E) representing a waveform of the Vcom-selection signal VCOMSEL, (F) representing a waveform of the impedance control signal ZSEL, (G) representing waveforms of some of the drive signals Vcom, (H) representing a waveform of the touch detection signal Vdet, and (I) representing a waveform of the correction output value Vref.

As illustrated in FIG. 48, the impedance control signal ZSEL is at the low level during a period from time t21 to time t23 (touch detection period Pt) ((F) in FIG. 48). At this time, the drive electrode block B($k$) that is the target of the touch detection operation is supplied with the pulse signal generated from the direct-current drive signals VcomDC and VcomH in the same manner as in the case of the first embodiment ((G) in FIG. 48). The drive electrode blocks B($k$−1) and B($k$+1) that are not the target of the touch detection operation are made to be in a floating state (refer to waveform portions W2) because both the switches SW1 and SW2 in each of the drivers 73($k$−1) and 73($k$+1) coupled with these drive electrode blocks are turned off.

As a result of this operation, in the display device with the touch detection function 7, unlike in the case of the display device with the touch detection function 1 according to the first embodiment (refer to waveform portions W1 of FIG. 32), the drive signal Vcom converges to 0 V in a short time because the electric charges charged in the drive electrodes COML of the drive electrode block B($k$) do not move to other drive electrode blocks B after time 22. Thus, the display device with the touch detection function 7 causes the voltage of the drive signal Vcom to converge to 0 V in a short time in the writing period Pw, so that the quality of displayed images can be less likely to be affected.

In the display device with the touch detection function 7, the drive electrode driver 18 makes the drive electrode blocks B that are not the target of the touch detection operation be in a floating state during the touch detection period Pt. Specifically, the load of the drive-signal generation unit 15 is caused by only the drive electrode block B of the 20 drive electrode blocks B1 to B20 that is the target of the touch detection operation. As a result, the display device with the touch detection function 7 can have shorter transition times of the drive signal Vcom.

Figure 49:
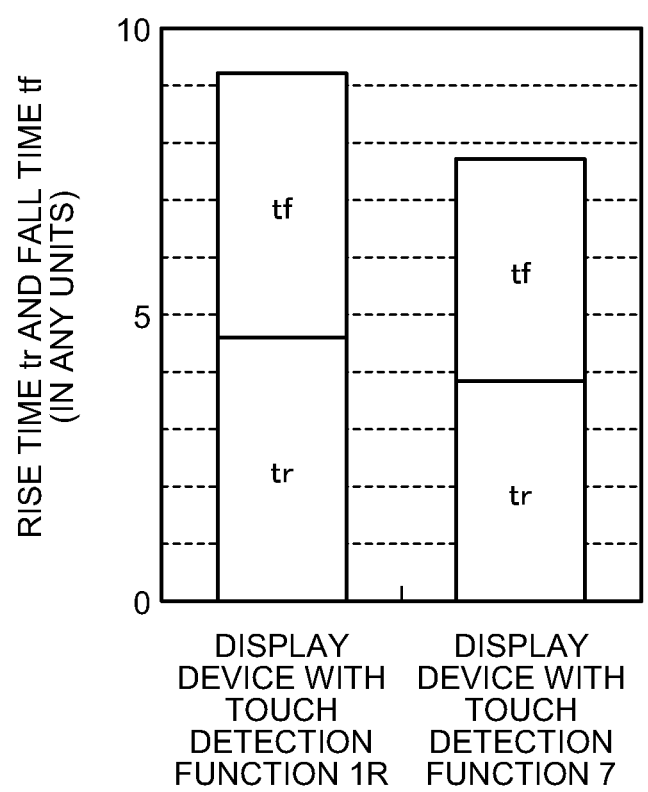
FIG. 49 is a diagram illustrating characteristic examples of the rise times and the fall times of the drive signals in the display device with the touch detection function according to Comparative Example 2 and the display device with the touch detection function according to the second embodiment.

FIG. 49 is a diagram illustrating characteristic examples of the rise times and the fall times of the drive signals in the display device with the touch detection function according to Comparative Example 2 and the display device with the touch detection function according to the second embodiment. In the display device with the touch detection function 7, the drive electrode blocks B that are not the target of the touch detection operation are made to be in a floating state, so that the load of the drive-signal generation unit 15 can be smaller, resulting in shorter transition times (the rise and the fall times tr and tf) of the drive signal Vcom, as illustrated in FIG. 49.

In the display device with the touch detection function 7, the switch control signals Vsel is set to the low levels to turn off all the switches SWR, SWG, and SWB of the selection switch unit 14 during the touch detection period Pt ((C) in FIG. 48). In other words, the pixel signal lines SGL are in a floating state during the touch detection period Pt. This operation can make the capacitance of the drive electrodes COML and the touch detection electrode TDL lower than that of when the pixel signal lines SGL are supplied with voltages (in Modification 2-1 to be described later), and can thereby make a time Ttotal required for touch detection shorter.

As described above, in the present embodiment, the drive electrode blocks that are not the target of the touch detection operation are made to be in a floating state, so that the quality of displayed images can be less likely to be affected.

In the present embodiment, only the drive electrode block B that is the target of the touch detection operation serves as the load of the drive-signal generation unit during the touch detection period, so that the load of the drive-signal generation unit is lower, whereby the transition times of the drive signals can be shorter.

In the present embodiment, the pixel signal lines are made to be in a floating state during the touch detection period, so that the time required for touch detection is shorter.

The other advantages are the same as those in the case of the first embodiment described above.

Modification 2-1

While the embodiments described above are provided with the selection switch unit 14, the present disclosure is not limited to this configuration, but, instead, the source driver may directly generate the pixel signals Vpix. The following describes Modification 2-1 in detail.

Figure 50:
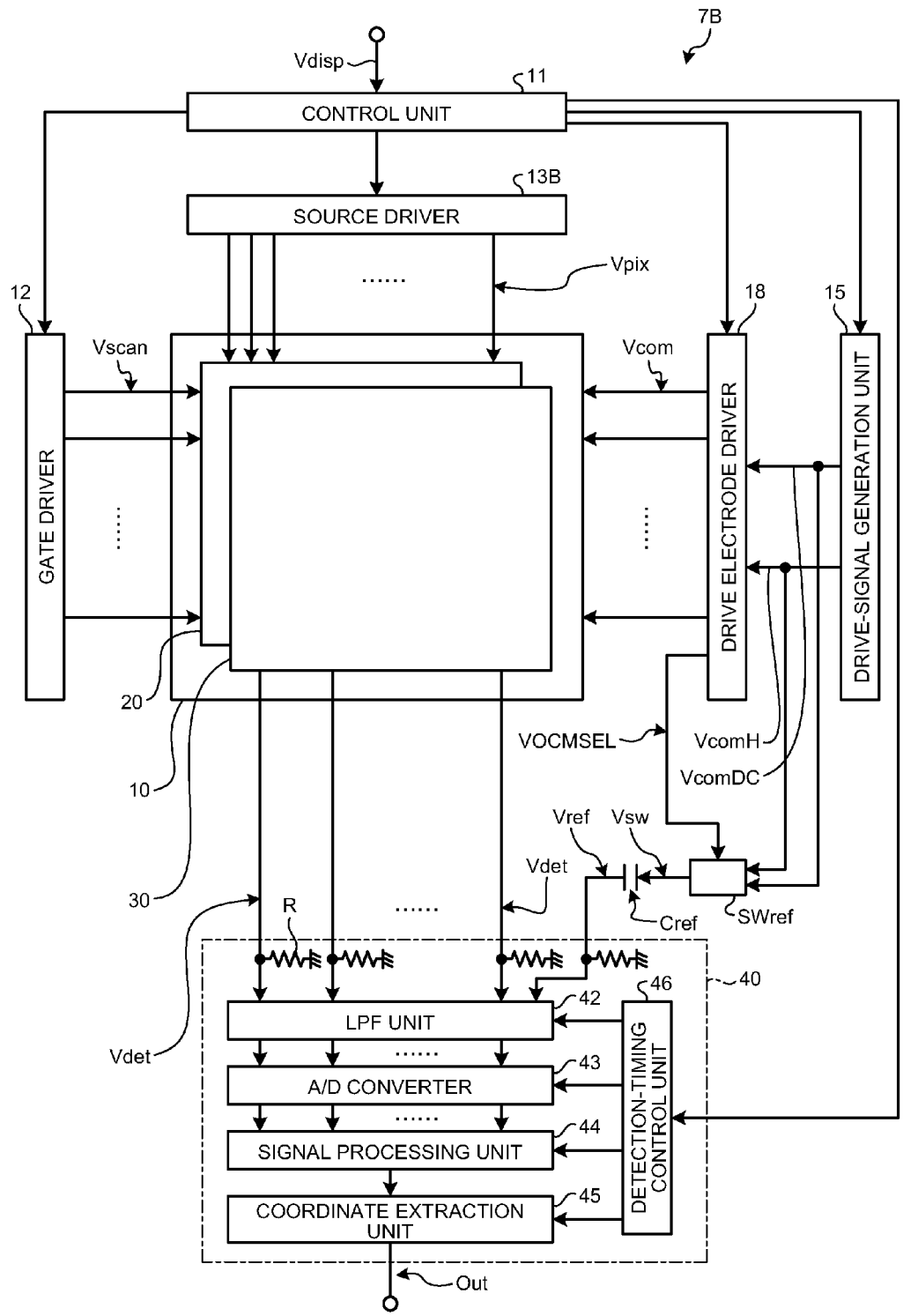
FIG. 50 is a diagram illustrating a configuration example of a display device with a touch detection function according to Modification 2-1.
Figure 51:
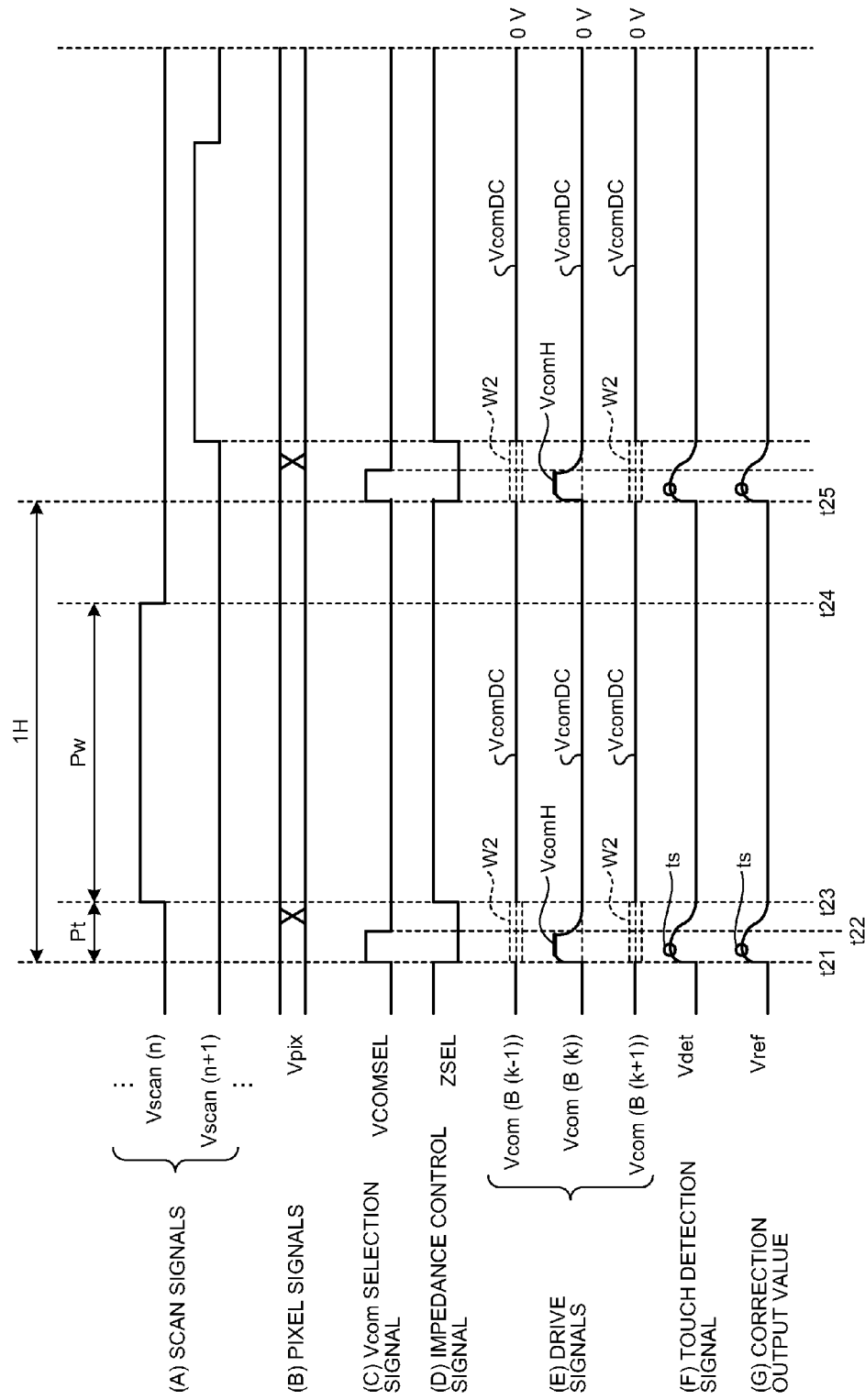
FIG. 51 is a diagram illustrating a timing waveform example of the display device with the touch detection function according to Modification 2-1.

FIG. 50 is a diagram illustrating a configuration example of a display device with a touch detection function according to Modification 2-1. FIG. 51 is a diagram illustrating a timing waveform example of the display device with the touch detection function according to Modification 2-1, where (A) representing waveforms of some of the scan signals Vscan, (B) representing waveforms of the pixel signals Vpix, (C) representing a waveform of the Vcom-selection signal VCOMSEL, (D) representing a waveform of the impedance control signal ZSEL, (E) representing waveforms of some of the drive signals Vcom, (F) representing a waveform of the touch detection signal Vdet, and (G) representing a waveform of the correction output value Vref.

As illustrated in FIG. 50, a display device with a touch detection function 7B includes a source driver 13B. The source driver 13B generates and outputs the pixel signals Vpix (VpixR, VpixG, and VpixB) based on video signals and source driver control signals supplied from the control unit 11. Specifically, unlike the source driver 13 according to the embodiments described above, the source driver 13B directly generates the pixel signals Vpix, instead of generating the pixel signals Vsig, and supplies the pixel signals Vpix to the liquid crystal display unit 20 of the display unit with the touch detection function 10. At that time, as illustrated in FIG. 51, the source driver 13B constantly supplies the pixel signals Vpix to the pixel signal lines SGL without making any of the pixel signal lines SGL be in a floating state.

In this case, in the same manner as in the case of the display device with the touch detection function 7 according to the embodiment described above, only the drive electrode block B that is the target of the touch detection operation serves as the load of the drive-signal generation unit, so that the transition times of the drive signals can be shorter.

Unlike the display device with the touch detection function 7B according to the present modification, in the display device with the touch detection function 7 according to the embodiment described above, the pixel signal lines SGL are made to be in a floating state during the touch detection period Pt. This operation can make the capacitance of the touch detection electrode TDL lower. Specifically, while a drive electrode COML is in a floating state, the capacitance of the touch detection electrode TDL results in series capacitance of the capacitance between the touch detection electrode TDL and the floating drive electrode COML and the capacitance between the floating drive electrode COML and the pixel signal line SGL provided thereunder. In other words, the series connection of the capacitance can make the capacitance of the touch detection electrode TDL lower.

Thus, in the display device with the touch detection function 7, the touch detection electrode TDL has a small time constant, so that the transition times (the rise and the fall times tr and tf) of the touch detection signal Vdet can be smaller, whereby the time Ttotal required for touch detection can be shorter over the entire display panel.

Figure 52:
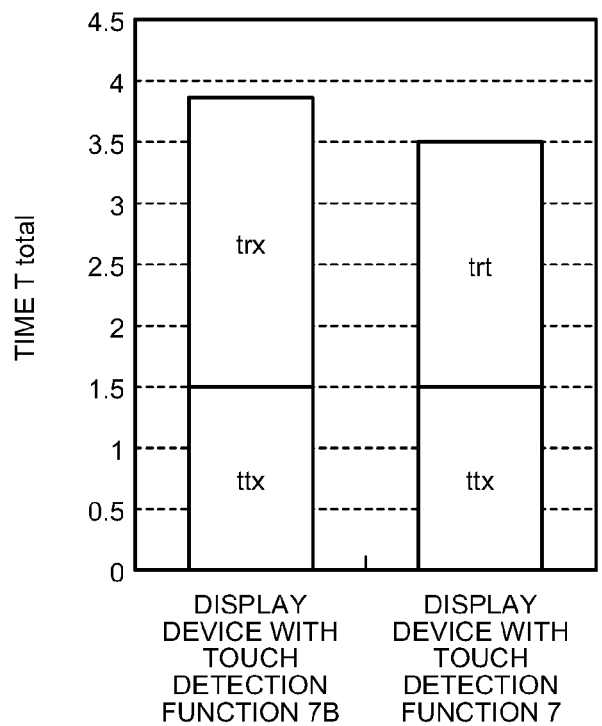
FIG. 52 is a diagram illustrating times required for touch detection in the display devices with the touch detection function.

FIG. 52 is a diagram illustrating times required for touch detection in the display devices with the touch detection function. Of the time Ttotal required for touch detection, a time ttx represents the time attributable to the drive electrode COML, and a time trx represents the time attributable to the touch detection electrode TDL.

In this manner, in the display device with the touch detection function 7, the touch detection electrode TDL can have a small time constant, so that the time trx attributable to the touch detection electrode TDL can be shorter, whereby the time Ttotal required for touch detection can be shorter over the entire display panel.

Modification 2-2

Modification 1-1 or 1-2 of the first embodiment may be applied to the display device with the touch detection function 7 according to the above-described embodiment.

While the present disclosure has been described above by way of the embodiments and the modifications thereof, the present disclosure is not limited to the embodiments and the like, but various modifications can be made.

For example, in the embodiments and the like described above, as illustrated in FIG. 2, the drive electrodes COML are provided on the TFT substrate 21, and the pixel electrodes 22 are provided on the drive electrodes COML via the insulation layer 23. The present disclosure is, however, not limited to this arrangement, but, for example, the pixel electrodes 22 may be provided on the TFT substrate 21, and the drive electrodes COML may be provided on the pixel electrodes 22 via the insulation layer 23.

Figure 53:
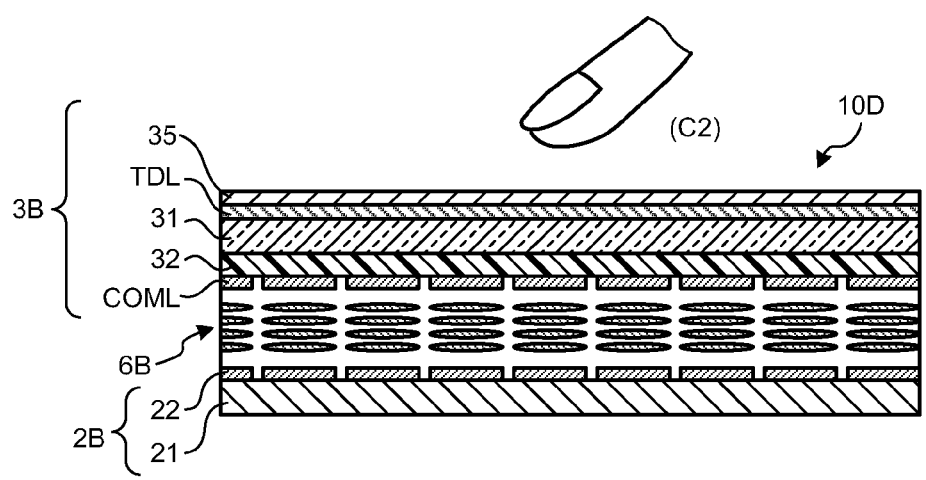
FIG. 53 is a diagram illustrating another example of the cross-sectional structure of the essential part of the display unit with the touch detection function.

For example, in the embodiments and the like described above, the touch detection device is integrated with the liquid crystal display unit including the liquid crystals of the horizontal electric field mode, such as the FFS mode or the IPS mode. However, the touch detection device may instead be integrated with a liquid crystal display unit including liquid crystals of one of various modes, such as a twisted nematic (TN) mode, a vertical alignment (VA) mode, and an electrically controlled birefringence (ECB) mode. Employing such liquid crystals allows the display unit with the touch detection function to be configured as illustrated in FIG. 53. FIG. 53 is a diagram illustrating an example of the cross-sectional structure of the essential part of the display unit with the touch detection function. FIG. 53 illustrates a state in which this display unit with a touch detection function 10D include a liquid crystal layer 6B sandwiched between a pixel substrate 2B and a counter substrate 3B. The other parts have the same names and functions as those in FIG. 2, and descriptions thereof are omitted. In this example, unlike that of FIG. 2, the drive electrodes COML used both for display and touch detection are provided on the counter substrate 3B.

For example, each of the embodiments described above is of a type in which the liquid crystal display unit is integrated with the electrostatic capacitance touch detection device. The present disclosure is, however, not limited to this type, but, may instead be of a type in which the electrostatic capacitance touch detection device is provided on a surface of the liquid crystal display unit, for example. In this type, for example, when noise by the display drive propagates from the liquid crystal display unit to the touch detection device, the noise can be reduced by driving the drive electrodes as described in the embodiments, so that a decrease in the accuracy of the touch detection can be suppressed.

While, in each of the embodiments described above, the cases of the liquid crystal display device have been illustrated as disclosed examples, other application examples include, but are not limited to, all flat-panel display devices, such as light-emitting display devices, including organic electro-luminescence display devices and others, and electronic paper display devices that include, for example, electrophoretic elements. The embodiments can naturally be used in display devices of unlimited size ranging from small, medium, to large size.

Various altered examples and modified examples can be conceived by those skilled in the art within the scope of the idea of the present invention, so that the altered examples and the modified examples are considered to belong to the scope of the present invention. For example, the scope of the present invention includes alterations or modifications obtained by those skilled in the art by appropriately adding or removing a component or applying a design change to the component, or adding or omitting a process or changing a condition of the process with respect to either of the above-described embodiments, provided that the alterations or modifications include the gist of the present invention.

3. Application Examples

With reference to FIGS. 54 to 66, the following describes application examples of the display device with the touch detection function described in the embodiments and the modifications thereof. FIGS. 54 to 66 are diagrams each illustrating an example of the electronic apparatus in which the display device with the touch detection function according to any of the embodiments and the modifications thereof is used. The display device with the touch detection function according to any of the embodiments and the modifications thereof can be used in electronic apparatuses in all fields, such as television devices, digital cameras, laptop computers, portable electronic apparatuses including mobile phones, and video cameras. In other words, display device with the touch detection function according to any of the embodiments and the modifications thereof can be used in electronic apparatuses in all fields that display externally received video signals or internally generated video signals as images or video pictures.

Application Example 1

Figure 54:
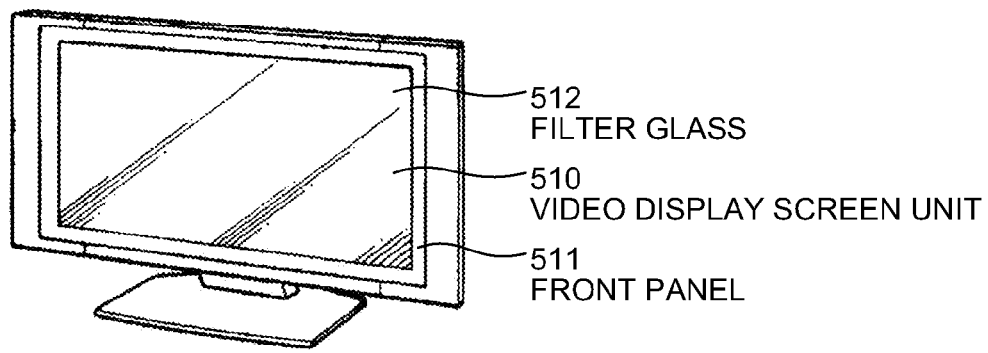
FIG. 54 is a diagram illustrating an example of an electronic apparatus in which the display device with the touch detection function according to either of the embodiments is used.

The electronic apparatus illustrated in FIG. 54 is a television device in which the display device with the touch detection function according to any of the embodiments and the modifications thereof is used. This television device includes, for example, a video display screen unit 510 that includes a front panel 511 and filter glass 512. The video display screen unit 510 corresponds to the display device with the touch detection function according to any of the embodiments and the modifications thereof.

Application Example 2

Figure 55:
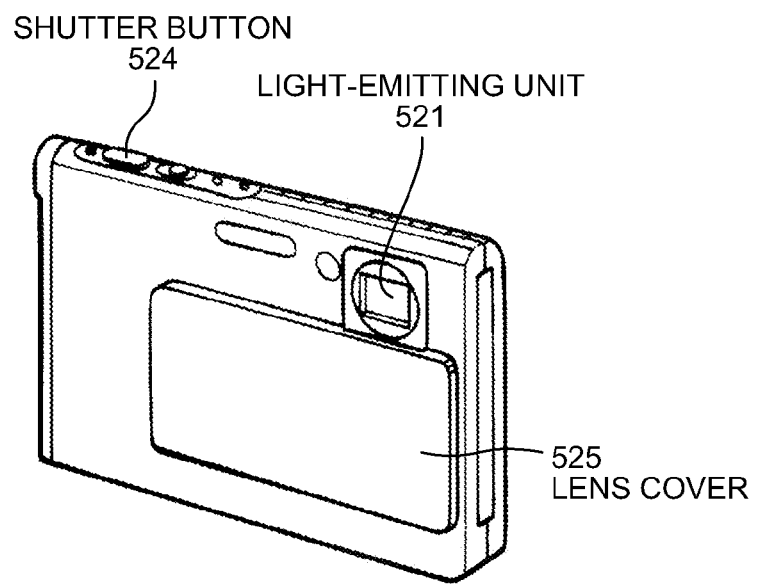
FIG. 55 is a diagram illustrating an example of an electronic apparatus in which the display device with the touch detection function according to either of the embodiments is used.
Figure 56:
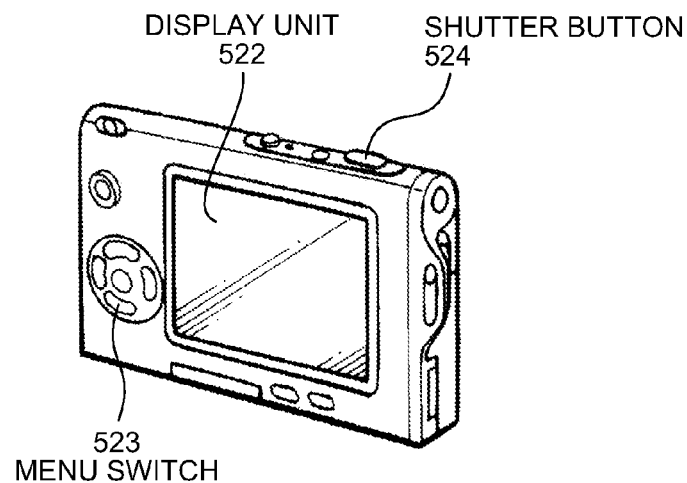
FIG. 56 is a diagram illustrating the example of the electronic apparatus in which the display device with the touch detection function according to either of the embodiments is used.

The electronic apparatus illustrated in FIGS. 55 and 56 is a digital camera in which the display device with the touch detection function according to any of the embodiments and the modifications thereof is used. This digital camera includes, for example, a light-emitting unit 521 for flash, a display unit 522, a menu switch 523, and a shutter button 524. The display unit 522 corresponds to the display device with the touch detection function according to any of the embodiments and the modifications thereof. As illustrated in FIG. 55, the digital camera includes a lens cover 525, which slides to expose a photographing lens. The digital camera can take a digital photograph by imaging light coming through the photographing lens.

Application Example 3

Figure 57:
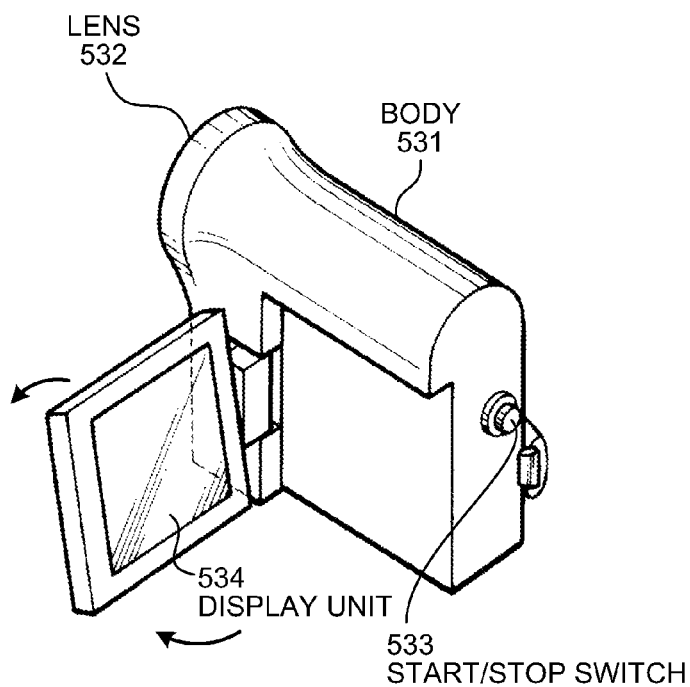
FIG. 57 is a diagram illustrating an example of an electronic apparatus in which the display device with the touch detection function according to either of the embodiments is used.

FIG. 57 illustrates an external appearance of a video camera, as the electronic apparatus, in which the display device with the touch detection function according to any of the embodiments and the modifications thereof is used. This video camera includes, for example, a body 531, a lens 532 for photographing a subject provided on the front side face of the body 531, and a start/stop switch 533 for photographing, and a display unit 534. The display unit 534 corresponds to the display device with the touch detection function according to any of the embodiments and the modifications thereof.

Application Example 4

Figure 58:
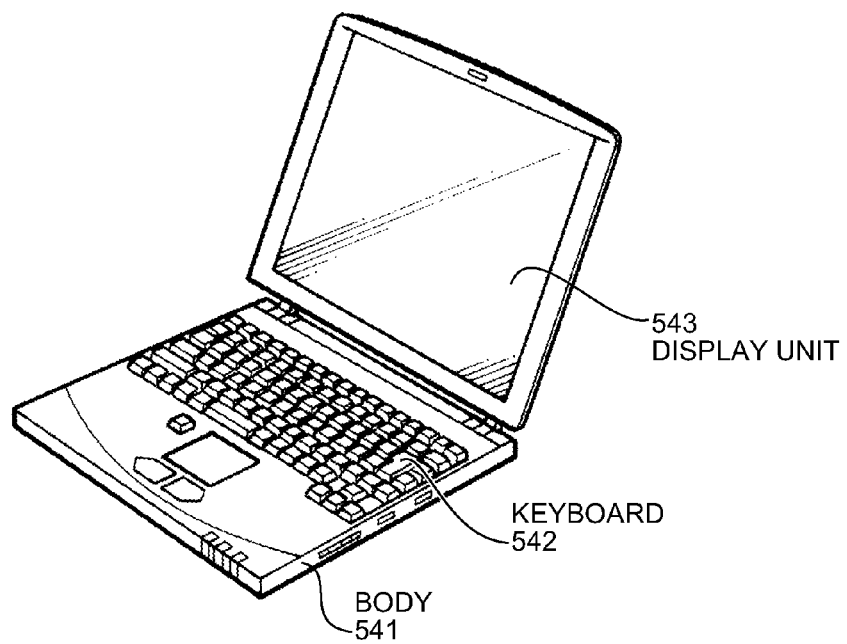
FIG. 58 is a diagram illustrating an example of an electronic apparatus in which the display device with the touch detection function according to either of the embodiments is used.
Figure 59:
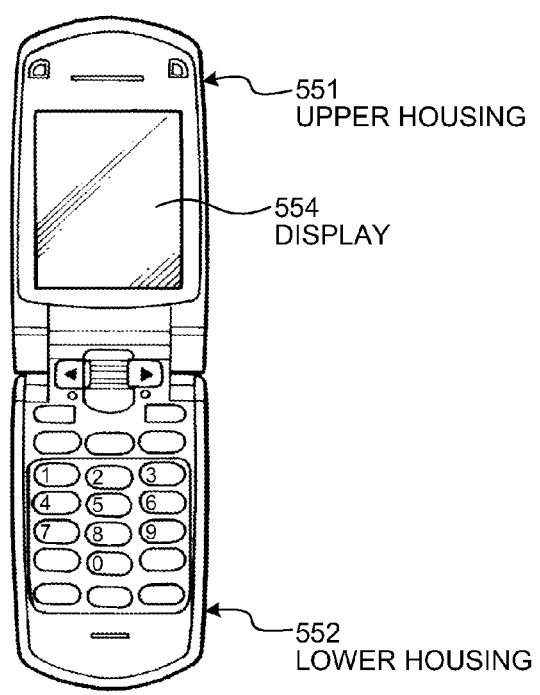
FIG. 59 is a diagram illustrating an example of an electronic apparatus in which the display device with the touch detection function according to either of the embodiments is used.
Figure 60:
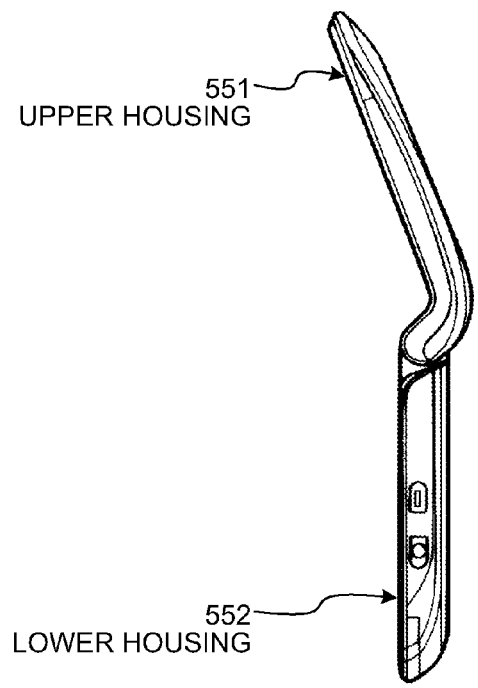
FIG. 60 is a diagram illustrating the example of the electronic apparatus in which the display device with the touch detection function according to either of the embodiments is used.
Figure 61:
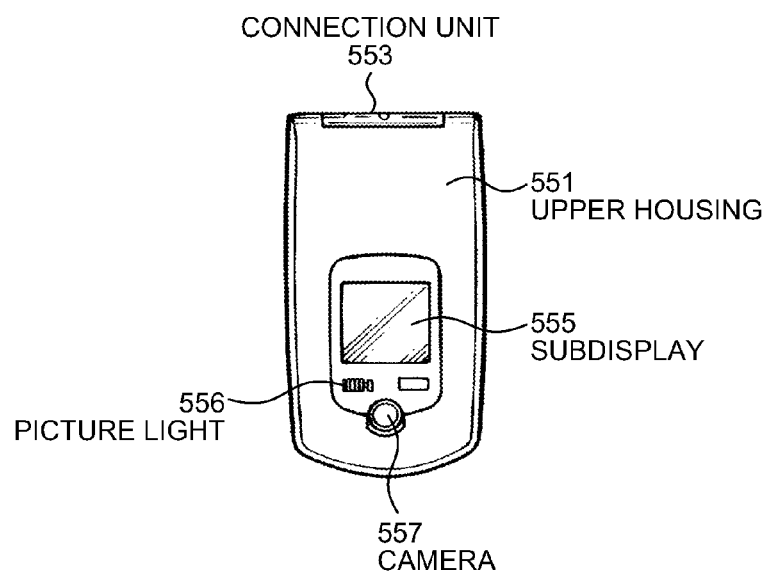
FIG. 61 is a diagram illustrating the example of the electronic apparatus in which the display device with the touch detection function according to either of the embodiments is used.
Figure 62:
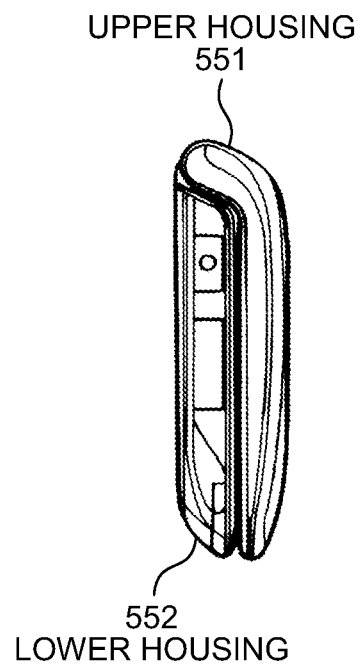
FIG. 62 is a diagram illustrating the example of the electronic apparatus in which the display device with the touch detection function according to either of the embodiments is used.
Figure 63:
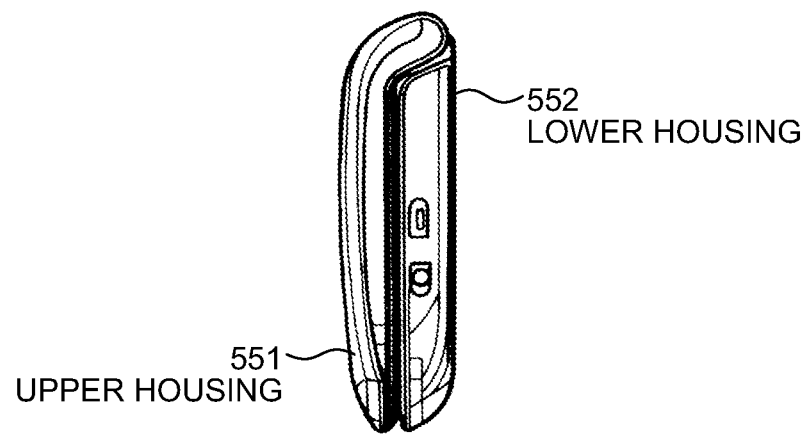
FIG. 63 is a diagram illustrating the example of the electronic apparatus in which the display device with the touch detection function according to either of the embodiments is used.
Figure 64:
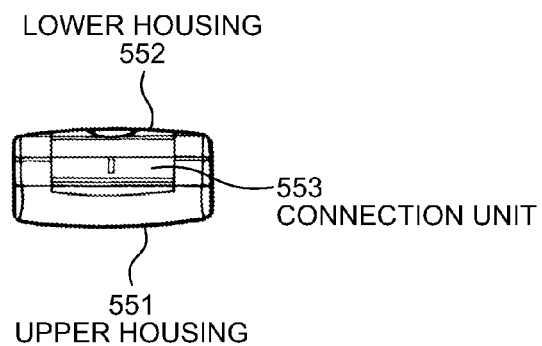
FIG. 64 is a diagram illustrating the example of the electronic apparatus in which the display device with the touch detection function according to either of the embodiments is used.
Figure 65:
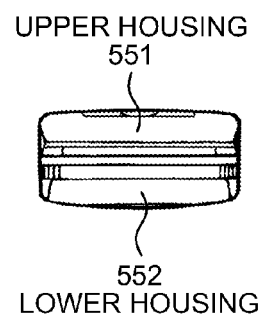
FIG. 65 is a diagram illustrating the example of the electronic apparatus in which the display device with the touch detection function according to either of the embodiments is used.

The electronic apparatus illustrated in FIG. 58 is a laptop computer in which the display device with the touch detection function according to any of the embodiments and the modifications thereof is used. This laptop computer includes, for example, a body 541, a keyboard 542 for input operation of characters and the like, and a display unit 543 that displays images. The display unit 543 corresponds to the display device with the touch detection function according to any of the embodiments and the modifications thereof.

Application Example 5

The electronic apparatus illustrated in FIGS. 59 to 65 is a mobile phone in which the display device with the touch detection function according to any of the embodiments and the modifications thereof is used. This mobile phone is a device made by, for example, connecting an upper housing 551 to a lower housing 552 with a connection unit (hinge unit) 553, and includes a display 554, a subdisplay 555, a picture light 556, and a camera 557. The display 554 or the subdisplay 555 corresponds to the display device with the touch detection function according to any of the embodiments and the modifications thereof.

Application Example 6

Figure 66:
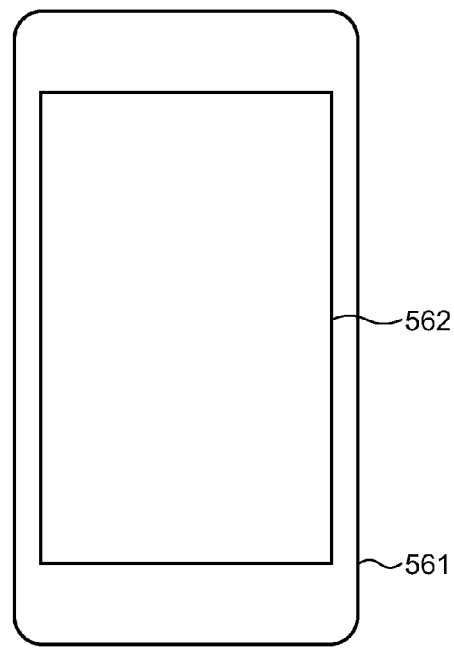
FIG. 66 is a diagram illustrating an example of an electronic apparatus in which the display device with the touch detection function according to either of the embodiments is used.

The electronic apparatus illustrated in FIG. 66 is a portable information terminal that operates as a portable computer, a multifunctional mobile phone, a portable computer with voice call capability, or a portable computer with communication capability, and that is sometimes called a smartphone or a tablet. This portable information terminal includes, for example, a display unit 562 on a surface of a housing 561. The display unit 562 corresponds to the display device with the touch detection function according to any of the embodiments and the modifications thereof.

As described above, examples of the electronic apparatus of the present disclosure include, but are not limited to, television devices, digital cameras, personal computers, video cameras, and portable electronic apparatuses such as mobile phones.

What is claimed is:

1. A touch detection device comprising:
  a touch surface;
  a plurality of drive electrodes;
  a plurality of touch detection electrodes disposed to respectively form an electrostatic capacitance at each intersection of the touch detection electrodes and the drive electrodes, wherein the electrostatic capacitance has a value in an absence of a touch operation;
  a signal generation unit that generates a plurality of direct-current signals having voltages different from one another;
  a first drive unit that selectively supplies one of the direct-current signals to the drive electrodes;
  a capacitor having a predetermined electrostatic capacitance;
  a second drive unit that selectively supplies one of the direct-current signals to one end of the capacitor in synchronization with the first drive unit; and
  a detection unit configured to
    acquire electrode output values, which are output values from the touch detection electrodes, and a capacitor output value, which is an output value from the capacitor, the capacitor output value being acquired simultaneously with at least one of the electrode output values,
    obtain corrected output values from the electrode output values using the capacitor output value, and
    detect proximity or contact of a target object to the touch surface based on the corrected output values,
  wherein a value of the electrostatic capacitance of the capacitor is substantially equal to the value of the electrostatic capacitance respectively formed at each intersection of the touch detection electrodes and the drive electrodes.

2. The touch detection device according to claim 1, wherein
  the second drive unit supplies a signal having the phase opposite to that of the signal supplied from the first drive unit to the drive electrodes; and
  the detection unit obtains the corrected output values by adding the electrode output values to the capacitor output value.

3. The touch detection device according to claim 1, wherein
  the second drive unit supplies a signal having the same phase as that of the signal supplied from the first drive unit to the drive electrodes, to the capacitor; and
  the detection unit temporarily stores therein an electric charge charged in the capacitor and electric charges from the touch detection electrodes, and then obtains differences between the electric charge and the electric charges as the corrected output values.

4. The touch detection device according to claim 1, wherein the first drive unit drives the drive electrodes in units of electrode blocks each consisting of a predetermined number of the drive electrodes.

5. The touch detection device according to claim 4, wherein
  the second drive unit selectively supplies the one of the direct-current signals, which is a signal having a same phase as a phase of a drive signal supplied from the first drive unit to the drive electrodes, to the one end of the capacitor at a timing same as the drive signal is supplied to the drive electrodes of one of the electrode blocks, and
  the capacitor output value is determined according to the one of the direct-current signals.

6. The touch detection device according to claim 1, wherein the element is mounted on a substrate on which the detection unit is mounted.

7. The touch detection device according to claim 1, wherein
  the capacitor is disposed in an area other than a touch detection area in which the touch detection electrodes and the drive electrodes are disposed and which faces the touch surface, and
  wiring that electrically couples the capacitor with the second drive unit is longer than wiring that electrically couples the capacitor with the detection unit to dispose the capacitor closer to the detection unit than to the second drive unit.

8. A display device with a touch detection function comprising:
  the touch detection device according to claim 1; and
  a plurality of display elements, wherein
  the signal generation unit generates a first direct-current signal and a second direct-current signal; and
  the first drive unit supplies the first direct-current signal to the drive electrodes during a writing period in which pixel signals are written to the display elements, and supplies the second direct-current signal to one or more target drive electrodes of the drive electrodes during at least a part of a touch detection period that differs from the writing period, the one or more target drive electrodes serving as a target of touch detection.

9. The display device with the touch detection function according to claim 8, wherein the first drive unit electrically makes drive electrodes other than the one or more target drive electrodes of the drive electrodes be in a floating state during the touch detection period.

10. The display device with the touch detection function according to claim 8, wherein the first drive unit supplies the first direct-current signal to drive electrodes other than the one or more target drive electrodes of the drive electrodes during the touch detection period.

11. The display device with the touch detection function according to claim 8, further comprising:
   a pixel-signal generation unit that generates the pixel signals; and
   a plurality of signal lines that transmit the pixel signals, wherein
   the pixel-signal generation unit supplies the pixel signals to the signal lines in the writing period, and makes the signal lines be in a floating state during the touch detection period.

12. The display device with the touch detection function according to claim 8, wherein
   one writing period is present in one horizontal scanning period; and
   one touch detection period is provided every plurality of writing periods.

13. The display device with the touch detection function according to claim 8, wherein
   the display elements include:
      a liquid crystal layer; and
      pixel electrodes that are arranged so as to face the drive electrodes with the liquid crystal layer interposed therebetween.

14. A display device comprising:
   the touch detection device according to claim 1, and
   a plurality of display elements, wherein
   the display elements include:
      a liquid crystal layer; and
      pixel electrodes that are provided between the liquid crystal layer and the drive electrodes, or provided with the drive electrodes interposed between the liquid crystal layer and the pixel electrodes.

15. An electronic apparatus comprising a display device that includes the touch detection device according to claim 1.

* * * * *